(12) United States Patent
Matsumoto et al.

(10) Patent No.: US 7,280,034 B2
(45) Date of Patent: Oct. 9, 2007

(54) ANTITHEFT SYSTEM FOR VEHICLE

(75) Inventors: Atsushi Matsumoto, Sakai (JP); Keisuke Miura, Sakai (JP); Eiji Nishi, Sakai (JP)

(73) Assignee: Kubota Corporation, Osaka-shi (JP)

( * ) Notice: Subject to any disclaimer, the term of this patent is extended or adjusted under 35 U.S.C. 154(b) by 219 days.

(21) Appl. No.: 10/545,014

(22) PCT Filed: Mar. 26, 2004

(86) PCT No.: PCT/JP2004/004365

§ 371 (c)(1),
(2), (4) Date: Aug. 10, 2005

(87) PCT Pub. No.: WO2004/085214

PCT Pub. Date: Oct. 7, 2004

(65) Prior Publication Data

US 2006/0082435 A1   Apr. 20, 2006

(30) Foreign Application Priority Data

| Mar. 27, 2003 | (JP) | ............................. 2003-088965 |
| Mar. 27, 2003 | (JP) | ............................. 2003-088966 |
| Mar. 27, 2003 | (JP) | ............................. 2003-088967 |
| Mar. 27, 2003 | (JP) | ............................. 2003-088968 |
| Mar. 27, 2003 | (JP) | ............................. 2003-088970 |
| Mar. 27, 2003 | (JP) | ............................. 2003-088971 |
| Mar. 22, 2004 | (JP) | ............................. 2004-083625 |

(51) Int. Cl.
*B60R 25/10* (2006.01)

(52) U.S. Cl. ............................. 340/426.35; 340/426.1; 340/426.11; 307/10.6

(58) Field of Classification Search ........... 340/426.35, 340/425.5, 426.1, 426.11, 426.14; 307/10.2, 307/10.5, 10.6
See application file for complete search history.

(56) References Cited

U.S. PATENT DOCUMENTS

| 5,598,898 | A  | * | 2/1997  | Mutoh et al. ............... 180/287 |
| 5,912,512 | A  | * | 6/1999  | Hayashi et al. ............ 307/10.5 |
| 6,154,694 | A  | * | 11/2000 | Aoki et al. .................. 701/35 |
| 6,650,224 | B1 | * | 11/2003 | Weigl et al. ............... 340/5.61 |

(Continued)

FOREIGN PATENT DOCUMENTS

JP   8-48214 A   2/1996

(Continued)

*Primary Examiner*—Toan N. Pham
(74) *Attorney, Agent, or Firm*—Birch, Stewart, Kolasch & Birch, LLP

(57) ABSTRACT

It is possible to start engine economically and easily without deteriorating the theft prevention function even when an engine start key is lost. A vehicle theft prevention system includes permission tools (5C, 5D) for permitting rewrite or write-in of an ID code. The system has a start key registration function for corresponding the ID code of an engine key (5) to the ID code of an immobilizer control section (17), so that the engine key (5) functions as an engine start key (5A, 5B) when the ID code of the permission tools (5C, 5D) is correlated with the ID code recorded in the immobilizer control section (17) and matching is established. Accordingly, when the engine start key is lost or the like, a new engine start key is created for starting the engine economically and easily without requiring replacement of the entire theft prevention device.

17 Claims, 52 Drawing Sheets

U.S. PATENT DOCUMENTS 6,683,391 B1 * 1/2004 Enoyoshi et al. .......... 307/10.5
7,151,325 B2 * 12/2006 Matsubara et al. ........ 307/10.6
2003/0090154 A1 * 5/2003 Takezaki et al. ........... 307/10.2

FOREIGN PATENT DOCUMENTS

| | | | |
|---|---|---|---|
| JP | 10-82223 A | 3/1998 | |
| JP | 10-129421 A | 5/1998 | |
| JP | 2000-335370 A | 12/2000 | |
| JP | 2001-146148 A | 5/2001 | |

* cited by examiner

FIG. 4

DATA OF EEPROM OF EACH KEY

| KIND OF KEY | CRYPTOGRAPHIC CODE | DISCRIMINATION CODE |
|---|---|---|
| BLUE KEY 1 | a | — |
| BLUE KEY 2 | b | — |
| BLUE KEY 3 | c | — |
| BLUE KEY 4 | d | — |
| BLUE KEY 5 | e | — |
| YELLOW KEY (MASTER) | f | t |
| YELLOW KEY (SLAVE) | — | — |
| RED KEY | g | v |
| GREEN KEY (MASTER) | h | w |
| GREEN KEY (SLAVE) | — | — |

FIG. 5

INITIAL DATA OF EEPROM OF IMMOBILIZER CONTROL UNIT (IMMOBILIZER)

| AREA CORRESPONDING TO EACH KEY | CRYPTOGRAPHIC CODE |
|---|---|
| BLUE KEY 1 | — |
| BLUE KEY 2 | — |
| BLUE KEY 3 | — |
| BLUE KEY 4 | — |
| BLUE KEY 5 | — |
| YELLOW KEY (MASTER) | — |
| YELLOW KEY (SLAVE) | — |
| RED KEY | g |
| GREEN KEY (MASTER) | — |
| GREEN KEY (SLAVE) | — |

FIG. 6

DATA OF ROM OF IMMOBILIZER CONTROL UNIT (IMMOBILIZER)

| AREA CORRESPONDING TO EACH KEY | DISCRIMINATION CODE |
|---|---|
| BLUE KEY 1 | o |
| BLUE KEY 2 | p |
| BLUE KEY 3 | q |
| BLUE KEY 4 | r |
| BLUE KEY 5 | s |
| YELLOW KEY (MASTER) | t |
| YELLOW KEY (SLAVE) | u |
| RED KEY | v |
| GREEN KEY (MASTER) | w |
| GREEN KEY (SLAVE) | x |

FIG. 7

KIND OF EACH KEY AND ITS FUNCTION

| KIND OF KEY | COLOR | COLOR OF STICKER | FUNCTION | RELATION TO WORK MACHINE (VEHICLE) |
|---|---|---|---|---|
| BLUE KEY | BLACK | — | ENGINE START KEY | STARTS ENGINE OF ONE SPECIFIC WORK MACHINE |
| YELLOW KEY (MASTER) | BLACK | YELLOW | ENGINE START KEY | STARTS ENGINES OF PLURAL WORK MACHINES |
| YELLOW KEY (SLAVE) | BLACK | YELLOW | ENGINE START KEY | STARTS ENGINES OF PLURAL WORK MACHINES |
| RED KEY | RED | — | USED IN KEY REGISTRATION. INCAPABLE OF STARTING ENGINE | |
| GREEN KEY (MASTER) | BLACK | GREEN | USED IN KEY REGISTRATION. INCAPABLE OF STARTING ENGINE | |
| GREEN KEY (SLAVE) | BLACK | GREEN | USED IN KEY REGISTRATION. INCAPABLE OF STARTING ENGINE | |

FIG. 10

DATA OF EEPROM OF IMMOBILIZER BEFORE
REGISTRATION OF BLUE KEY

| AREA CORRESPONDING TO EACH KEY | CRYPTOGRAPHIC CODE |
|---|---|
| BLUE KEY 1 | a |
| BLUE KEY 2 | b |
| BLUE KEY 3 | c |
| BLUE KEY 4 | d |
| BLUE KEY 5 | e |
| YELLOW KEY (MASTER) | — |
| YELLOW KEY (SLAVE) | — |
| RED KEY | g |
| GREEN KEY (MASTER) | — |
| GREEN KEY (SLAVE) | — |

KEY TO BE NEWLY REGISTERED AS BLUE KEY 1, 2

| KIND OF KEY | CRYPTOGRAPHIC CODE | DISCRIMINATION CODE |
|---|---|---|
| BLUE KEY 1 | — | — |
| BLUE KEY 2 | — | — |

FIG. 11

AREA OF BLUE KEY IS CLEARED

DATA OF EEPROM OF CLEARED IMMOBILIZER

| AREA CORRESPONDING TO EACH KEY | CRYPTOGRAPHIC CODE |
|---|---|
| BLUE KEY 1 | — |
| BLUE KEY 2 | — |
| BLUE KEY 3 | — |
| BLUE KEY 4 | — |
| BLUE KEY 5 | — |
| YELLOW KEY (MASTER) | — |
| YELLOW KEY (SLAVE) | — |
| RED KEY | g |
| GREEN KEY (MASTER) | — |
| GREEN KEY (SLAVE) | — |

FIG. 12

AFTER REGISTRATION

DATA OF EEPROM OF IMMOBILIZER AFTER REGISTRATION OF BLUE KEY

| AREA CORRESPONDING TO EACH KEY | CRYPTOGRAPHIC CODE |
|---|---|
| BLUE KEY 1 | i |
| BLUE KEY 2 | j |
| BLUE KEY 3 | — |
| BLUE KEY 4 | — |
| BLUE KEY 5 | — |
| YELLOW KEY (MASTER) | — |
| YELLOW KEY (SLAVE) | — |
| RED KEY | g |
| GREEN KEY (MASTER) | — |
| GREEN KEY (SLAVE) | — |

KEY REGISTERED AS BLUE KEY 1, 2

| KIND OF KEY | CRYPTOGRAPHIC CODE | DISCRIMINATION CODE |
|---|---|---|
| BLUE KEY 1 | i | o |
| BLUE KEY 2 | j | p |

FIG. 14

DATA OF EEPROM OF IMMOBILIZER BEFORE
REGISTRATION OF YELLOW KEY

| AREA CORRESPONDING TO EACH KEY | CRYPTOGRAPHIC CODE |
|---|---|
| BLUE KEY 1 | — |
| BLUE KEY 2 | — |
| BLUE KEY 3 | — |
| BLUE KEY 4 | — |
| BLUE KEY 5 | — |
| YELLOW KEY (MASTER) | — |
| YELLOW KEY (SLAVE) | — |
| RED KEY | g |
| GREEN KEY (MASTER) | — |
| GREEN KEY (SLAVE) | — |

KEY TO BE REGISTERED AS YELLOW KEY (MASTER), YELLOW KEY (SLAVE)

| KIND OF KEY | CRYPTOGRAPHIC CODE | DISCRIMINATION CODE |
|---|---|---|
| YELLOW KEY (MASTER) | f | t |
| YELLOW KEY (SLAVE) | f | u |

FIG. 15    AFTER REGISTRATION

DATA OF EEPROM OF IMMOBILIZER AFTER
REGISTRATION OF YELLOW KEY

| AREA CORRESPONDING TO EACH KEY | CRYPTOGRAPHIC CODE |
|---|---|
| BLUE KEY 1 | — |
| BLUE KEY 2 | — |
| BLUE KEY 3 | — |
| BLUE KEY 4 | — |
| BLUE KEY 5 | — |
| YELLOW KEY (MASTER) | f |
| YELLOW KEY (SLAVE) | f |
| RED KEY | g |
| GREEN KEY (MASTER) | — |
| GREEN KEY (SLAVE) | — |

KEY REGISTERED AS YELLOW KEY (MASTER), YELLOW KEY (SLAVE)

| KIND OF KEY | CRYPTOGRAPHIC CODE | DISCRIMINATION CODE |
|---|---|---|
| YELLOW KEY (MASTER) | f | t |
| YELLOW KEY (SLAVE) | f | u |

FIG. 17

DATA OF EEPROM OF IMMOBILIZER BEFORE
REGISTRATION OF GREEN KEY

| AREA CORRESPONDING TO EACH KEY | CRYPTOGRAPHIC CODE |
|---|---|
| BLUE KEY 1 | — |
| BLUE KEY 2 | — |
| BLUE KEY 3 | — |
| BLUE KEY 4 | — |
| BLUE KEY 5 | — |
| YELLOW KEY (MASTER) | — |
| YELLOW KEY (SLAVE) | — |
| RED KEY | g |
| GREEN KEY (MASTER) | — |
| GREEN KEY (SLAVE) | — |

KEY TO BE REGISTERED AS GREEN KEY (MASTER), GREEN KEY (SLAVE)

| KIND OF KEY | CRYPTOGRAPHIC CODE | DISCRIMINATION CODE |
|---|---|---|
| GREEN KEY (MASTER) | k | w |
| GREEN KEY (SLAVE) | k | x |

F I G. 1 8

AFTER REGISTRATION

DATA OF EEPROM OF IMMOBILIZER AFTER
REGISTRATION OF GREEN KEY

| AREA CORRESPONDING TO EACH KEY | CRYPTOGRAPHIC CODE |
|---|---|
| BLUE KEY 1 | i |
| BLUE KEY 2 | j |
| BLUE KEY 3 | — |
| BLUE KEY 4 | — |
| BLUE KEY 5 | — |
| YELLOW KEY (MASTER) | — |
| YELLOW KEY (SLAVE) | — |
| RED KEY | g |
| GREEN KEY (MASTER) | k |
| GREEN KEY (SLAVE) | k |

KEY REGISTERED AS GREEN KEY (MASTER), GREEN KEY (SLAVE)

| KIND OF KEY | CRYPTOGRAPHIC CODE | DISCRIMINATION CODE |
|---|---|---|
| GREEN KEY (MASTER) | k | w |
| GREEN KEY (SLAVE) | k | x |

FIG. 20

DATA OF EEPROM OF YELLOW KEY AS ORIGIN OF COPY

| KIND OF KEY | CRYPTOGRAPHIC CODE | DISCRIMINATION CODE |
|---|---|---|
| YELLOW KEY (MASTER) | f | t |

DATA OF EEPROM OF KEY AS DESTINATION OF COPY

| KIND OF KEY | CRYPTOGRAPHIC CODE | DISCRIMINATION CODE |
|---|---|---|
| BLANK KEY | — | — |

IN THE CASE OF BLANK KEY

→

AFTER COPY

DATA OF EEPROM OF YELLOW KEY AS ORIGIN OF COPY

| KIND OF KEY | CRYPTOGRAPHIC CODE | DISCRIMINATION CODE |
|---|---|---|
| YELLOW KEY (MASTER) | f | t |

DATA OF EEPROM OF COPIED KEY

| KIND OF KEY | CRYPTOGRAPHIC CODE | DISCRIMINATION CODE |
|---|---|---|
| YELLOW KEY (SLAVE) | f | u |

FIG. 21

DATA OF EEPROM OF YELLOW KEY AS ORIGIN OF COPY

| KIND OF KEY | CRYPTOGRAPHIC CODE | DISCRIMINATION CODE |
|---|---|---|
| YELLOW KEY (MASTER) | f | t |

DATA OF EEPROM OF KEY AS DESTINATION OF COPY

| KIND OF KEY | CRYPTOGRAPHIC CODE | DISCRIMINATION CODE |
|---|---|---|
| ENGINE KEY | — | — |

IN THE CASE OF ENGINE KEY
IN WHICH ONLY CRYPTOGRAPHIC
CODE IS RECORDED

AFTER COPY →

DATA OF EEPROM OF YELLOW KEY AS ORIGIN OF COPY

| KIND OF KEY | CRYPTOGRAPHIC CODE | DISCRIMINATION CODE |
|---|---|---|
| YELLOW KEY (MASTER) | f | t |

DATA OF EEPROM OF COPIED KEY

| KIND OF KEY | CRYPTOGRAPHIC CODE | DISCRIMINATION CODE |
|---|---|---|
| YELLOW KEY (SLAVE) | f | u |

FIG. 24

DATA OF EEPROM OF GREEN KEY AS ORIGIN OF COPY

| KIND OF KEY | CRYPTOGRAPHIC CODE | DISCRIMINATION CODE |
|---|---|---|
| GREEN KEY (MASTER) | k | w |

DATA OF EEPROM OF KEY AS DESTINATION OF COPY

| KIND OF KEY | CRYPTOGRAPHIC CODE | DISCRIMINATION CODE |
|---|---|---|
| ENGINE KEY | — | — |

IN THE CASE OF ENGINE KEY IN WHICH ONLY CRYPTOGRAPHIC CODE IS RECORDED

AFTER COPY

DATA OF EEPROM OF GREEN KEY AS ORIGIN OF COPY

| KIND OF KEY | CRYPTOGRAPHIC CODE | DISCRIMINATION CODE |
|---|---|---|
| GREEN KEY (MASTER) | k | w |

DATA OF EEPROM OF COPIED KEY

| KIND OF KEY | CRYPTOGRAPHIC CODE | DISCRIMINATION CODE |
|---|---|---|
| GREEN KEY (SLAVE) | k | x |

FIG. 29

DATA OF EEPROM OF IMMOBILIZER BEFORE EXECUTION OF RESALE MODE

| AREA CORRESPONDING TO EACH KEY | CRYPTOGRAPHIC CODE |
|---|---|
| BLUE KEY 1 | i |
| BLUE KEY 2 | j |
| BLUE KEY 3 | — |
| BLUE KEY 4 | — |
| BLUE KEY 5 | — |
| YELLOW KEY (MASTER) | f |
| YELLOW KEY (SLAVE) | f |
| RED KEY | g |
| GREEN KEY (MASTER) | k |
| GREEN KEY (SLAVE) | k |

FIG. 30

AFTER EXECUTION

DATA OF EEPROM OF IMMOBILIZER AFTER RESALE MODE EXECUTION

| AREA CORRESPONDING TO EACH KEY | CRYPTOGRAPHIC CODE |
|---|---|
| BLUE KEY 1 | i |
| BLUE KEY 2 | j |
| BLUE KEY 3 | — |
| BLUE KEY 4 | — |
| BLUE KEY 5 | — |
| YELLOW KEY (MASTER) | — |
| YELLOW KEY (SLAVE) | — |
| RED KEY | g |
| GREEN KEY (MASTER) | — |
| GREEN KEY (SLAVE) | — |

FIG. 37

DATA OF EEPROM OF IMMOBILIZER BEFORE
EXECUTION OF INITIALIZATION MODE

| AREA CORRESPONDING TO EACH KEY | CRYPTOGRAPHIC CODE |
|---|---|
| BLUE KEY 1 | — |
| BLUE KEY 2 | — |
| BLUE KEY 3 | — |
| BLUE KEY 4 | — |
| BLUE KEY 5 | f |
| YELLOW KEY (MASTER) | f |
| YELLOW KEY (SLAVE) | g |
| RED KEY | k |
| GREEN KEY (MASTER) | k |
| GREEN KEY (SLAVE) | |

KEY TO BE NEWLY REGISTERED AS RED KEY

| KIND OF KEY | CRYPTOGRAPHIC CODE | DISCRIMINATION CODE |
|---|---|---|
| ENGINE KEY | m | — |

FIG. 38

AFTER EXECUTION

DATA OF EEPROM OF IMMOBILIZER AFTER
EXECUTION OF INITIALIZATION MODE

| AREA CORRESPONDING TO EACH KEY | CRYPTOGRAPHIC CODE |
|---|---|
| BLUE KEY 1 | — |
| BLUE KEY 2 | — |
| BLUE KEY 3 | — |
| BLUE KEY 4 | — |
| BLUE KEY 5 | — |
| YELLOW KEY (MASTER) | — |
| YELLOW KEY (SLAVE) | — |
| RED KEY | m |
| GREEN KEY (MASTER) | — |
| GREEN KEY (SLAVE) | — |

KEY NEWLY REGISTERED AS RED KEY

| KIND OF KEY | CRYPTOGRAPHIC CODE | DISCRIMINATION CODE |
|---|---|---|
| RED KEY | m | v |

# ANTITHEFT SYSTEM FOR VEHICLE

TECHNICAL FIELD

The present invention relates to an antitheft system for a work machine such as a backhoe or other vehicles.

BACKGROUND ART

A conventional antitheft system for a vehicle employs a technique to disable an engine from being started by an invalid engine start key, in which only when an ID code recorded in an engine start key coincides with an ID code recorded on a vehicle side (immobilizer control unit), the starting of the engine is allowed (see, for example, JP-A-2001-146148, JP-A-10-82223, JP-A-10-129421, JP-A-2000-335370). In this system, even if a duplicate key is formed, since the ID codes do not coincide with each other, it becomes impossible to start the engine of the vehicle.

Incidentally, some work machines (vehicles) such as backhoes exemplified as rotary work machines are provided with engines as power sources to cause the work machines run. Also in this type of work machine, it is conceivable that an antitheft device similar to the case of an automobile is incorporated, and also in this case, when the engine is started by a valid engine start key, the starting of the engine is allowed, and when the engine is started by an invalid start key, the starting of the engine can be prevented. Further, different from the automobile, in the case of the work machine such as the backhoe, a common engine key is generally used as an engine key to start engines of plural work machines, so that one engine key can start the engines of plural work machines. Accordingly, it is important to protect the work machines from theft by ID codes.

However, in the conventional system, in the case where an engine start key registered in an immobilizer control unit is lost, since it is impossible to newly form an engine start key for enabling the starting of the engine of the vehicle with using a commercially available engine key, the whole antitheft device must be replaced, and this is not economical and inconvenient. On the other hand, if an engine start key for enabling the starting of the engine of the vehicle can be newly easily formed with using a commercially available engine key, there arises a problem that the antitheft function is impaired.

In view of the above problems, the present invention has an object to provide an antitheft system for a vehicle in which even in the case where an engine start key is lost, the engine can be started economically and conveniently without ruining the antitheft function.

DISCLOSURE OF THE INVENTION

According to technical means of the invention to solve the above technical problem, in an antitheft system for a vehicle configured to collaet an ID code of an engine start key with an ID code recorded in an immobilizer control unit, and to allow starting of an engine by the engine start key when the result of the collation is affirmative, an allowance tool for allowing rewriting or writing of an ID code is provided separately from the engine start key, and a start key registration function is provided for collating an ID code of the allowance tool with the ID code recorded in the immobilizer control unit, and rendering an ID code of an engine key corresponding to the ID code of the immobilizer control unit when the result of the collation is affirmative, so that the engine key serves as the engine start key.

According to another technical means of the invention, in an antitheft system for a vehicle configured to collate an ID code of an engine start key with an ID code recorded in an immobilizer control unit, and to allow starting of an engine by the engine start key when the result of the collation is affirmative, or to prevent starting of the engine by the engine start key when the result of the collatin is negative, an allowance key for allowing rewriting or writing of an ID code is provided separately from the engine start key, and a start key registration function is provided for collating an ID code of the allowance key with the ID code recorded in the immobilizer control unit, and rendering an ID code of an engine key corresponding to the ID code of the immobilizer control unit when the result of collation is affirmative, so that the engine key serves as the engine start key.

According to yet another technical means of the invention, in an antitheft system for a vehicle configured to collate an ID code of an engine start key with an ID code recorded in an immobilizer control unit, and to allow starting of an engine by the engine start key when the result of the collation is affirmative, or to prevent starting of the engine by the engine start key when the result of the collation is negative, an allowance key for allowing rewriting or writing of an ID code is provided, a start key registration function is provided for collating an ID code of the allowance key with the ID code recorded in the immobilizer control unit, and rendering an ID code of an engine key corresponding to the ID code of the immobilizer control unit when the result of the collation is affirmative, so that the engine key sereves as the engine start key, and a cryptographic code for specifying the engine key and an discrimination code for distinguishing the kind of the engine key are recorded as ID codes in the engine key and the immobilizer control unit, and the discrimination code enables the system to distinguish the engine start key for starting the engine and the allowance key for allowing the rewriting or writing of the ID codes.

Further, according to another technical means of the invention, in the start key registration function, after the allowance key is inserted into a key cylinder, when the engine key is inserted into the key cylinder, the ID code of the engine key is rendered corresponding to the ID code of the immobilizer control unit, so that the engine key serves as the engine start key.

Further, according to another technical means of the invention, there is provided a copy function in which the ID code of the allowance tool recorded in the immobilizer control unit is written into another member to cause the member to serve as an allowance tool.

Further, according to another technical means of the invention, there is provided an allowance key copy function in which the ID code of the allowance key is written into another engine key to cause the engine key to serve as an allowance key.

Further, according to another technical means of the invention, in the allowance key copy function of the immobilizer control unit, after the allowance key is inserted into a key cylinder, when another engine key is inserted into the key cylinder, the ID code of the allowance key is written into the another engine key to cause it to serve as an allowance key.

Further, according to another technical means of the invention, the ID code of the engine start key registered by the start key registration function can be recorded as an engine start key in an immobilizer control unit of another vehicle.

Further, according to another technical means of the invention, there is provided a start key copy function in which the ID code of the engine start key is written into another engine key to cause the engine key to serve as an engine start key.

Further, according to another technical means of the invention, in the start key copy function of the immobilizer control unit, after the engine start key is inserted into a key cylinder, when another engine key is inserted into the key cylinder, the ID code of the engine start key is written into the another engine key to cause the engine key to serve as an engine start key.

Further, according to another technical means of the invention, there is provided a delete function in which the ID code of the engine start key recorded in the immobilizer control unit is deleted from the immobilizer control unit.

Further, according to another technical means of the invention, there is provided an engine start function with a special manipulation in which when an engine key is inserted into a key cylinder and a special manipulation is performed, the starting of the engine is allowed.

Further, according to another technical means of the invention, there is provided an initialization function in which an ID code memory portion of the immobilizer control unit is initialized.

Further, according to another technical means of the invention, when the allowance key is inserted into a key cylinder, the ID code of the allowance key is collated with the ID code recorded in the immobilizer control unit, and when the result of the collation is affirmative, a control mode for rendering the start key registration function operable is actuated.

Further, according to another technical means of the invention, when a master key of the allowance key is inserted into the cylinder, a control mode for rendering the allowance key copy function operable is actuated.

Further, according to another technical means of the invention, when a master key of the engine start key is inserted into a key cylinder, a control mode for rendering the start key copy function operable is actuated.

Further, according to another technical means of the invention, a vehicle to which the antitheft system is applied is a work machine such as a backhoe.

BRIEF DESCRIPTION OF THE DRAWINGS

FIG. 4 is a schematic view showing information (initial information) recorded in an EEPROM of each key of the same embodiment.

FIG. 5 is a schematic view showing information (initial information) recorded in an EEPROM of an immobilizer control unit of the same embodiment.

FIG. 6 is a schematic view showing information recorded in a ROM of the immobilizer control unit of the same embodiment.

FIG. 7 is an explanatory view showing the kind and role of each key of the same embodiment.

FIG. 10 is a schematic view showing a recording state of a ROM and the like for explaining the registration operation procedure of the first start key of the same embodiment.

FIG. 11 is a schematic view showing the recording state of the ROM and the like for explaining the registration operation procedure of the first start key of the same embodiment.

FIG. 12 is a schematic view showing the recording state of the ROM and the like for explaining the registration operation procedure of the first start key of the same embodiment.

FIG. 14 is a schematic view showing the recording state of a ROM and the like for explaining the registration operation procedure of the second start key of the same embodiment.

FIG. 15 is a schematic view showing the recording state of the ROM and the like for explaining the registration operation procedure of the second start key of the same embodiment.

FIG. 17 is a schematic view showing the recording state of the ROM and the like for explaining the registration operation procedure of the second allowance key of the same embodiment.

FIG. 18 is a schematic view showing the recording state of the ROM and the like for explaining the registration operation procedure of the second allowance key of the same embodiment.

FIG. 20 is a schematic view showing a recording state of a ROM and the like for explaining the copying operation procedure of the second start key of the same embodiment.

FIG. 21 is a schematic view showing the recording state of the ROM and the like for explaining the copying operation procedure of the second start key of the same embodiment.

FIG. 24 is a schematic view showing the recording state of the ROM and the like for explaining the copying operation procedure of the second allowance key of the same embodiment.

FIG. 29 is a schematic view showing a recording state of a ROM and the like for explaining a vehicle resale operation procedure of the same embodiment.

FIG. 30 is a schematic view showing the recording state of the ROM and the like for explaining the vehicle resale operation procedure of the same embodiment.

FIG. 37 is a schematic view showing a recording state of a ROM and the like for explaining an initialization operation procedure of the same embodiment.

FIG. 38 is a schematic view showing the recording state of the ROM and the like for explaining the initialization operation procedure of the same embodiment.

BEST MODE FOR CARRYING OUT THE INVENTION

Figure 1:
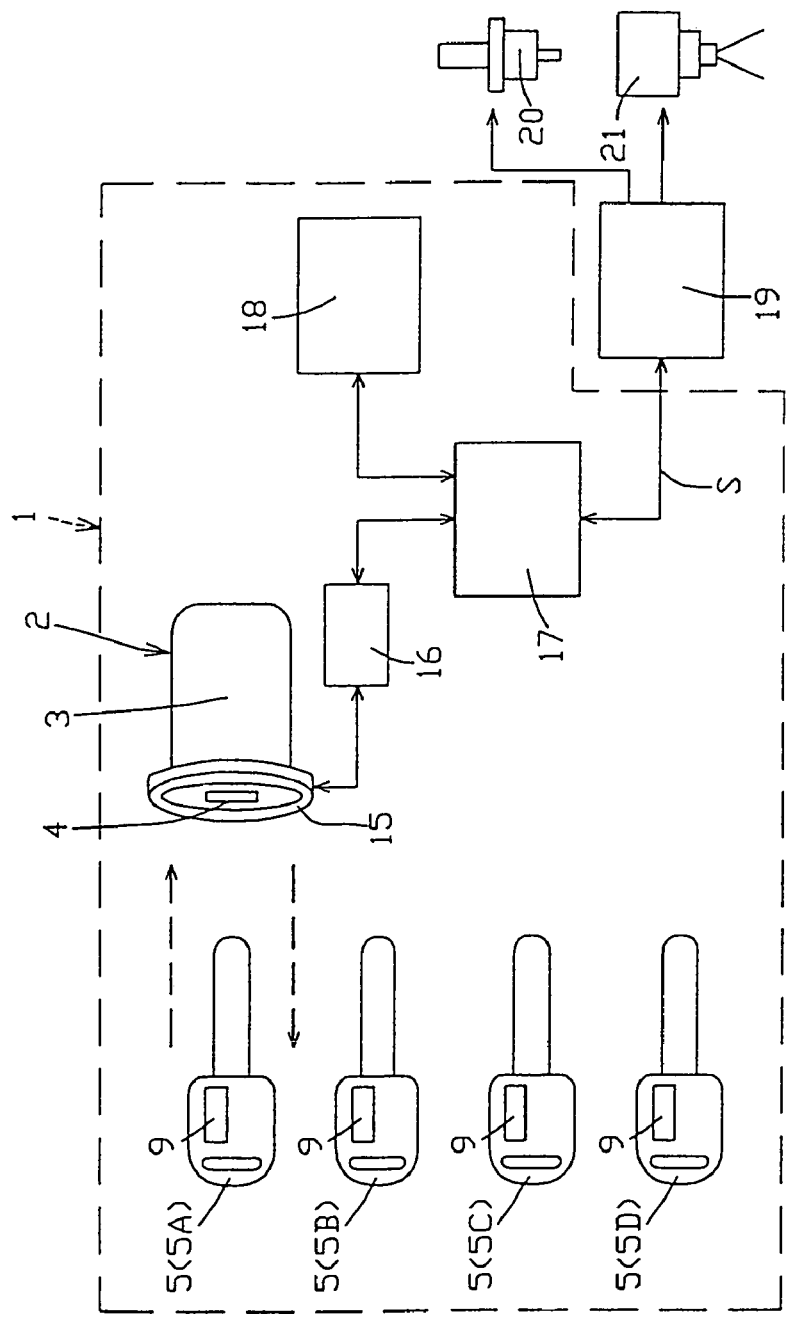
FIG. 1 is a block diagram of an antitheft device showing an embodiment of the invention.
Figure 2:
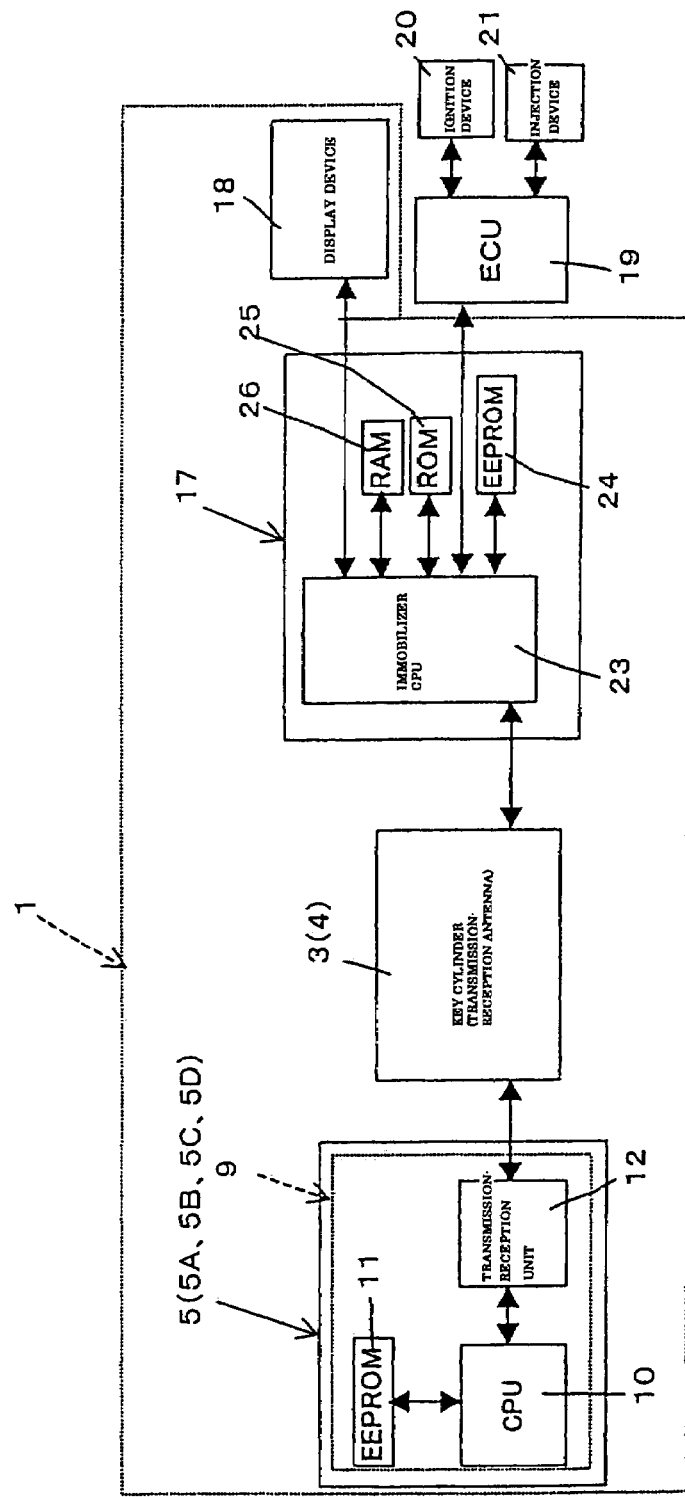
FIG. 2 is a block diagram of the antitheft device of the same embodiment.
Figure 3:
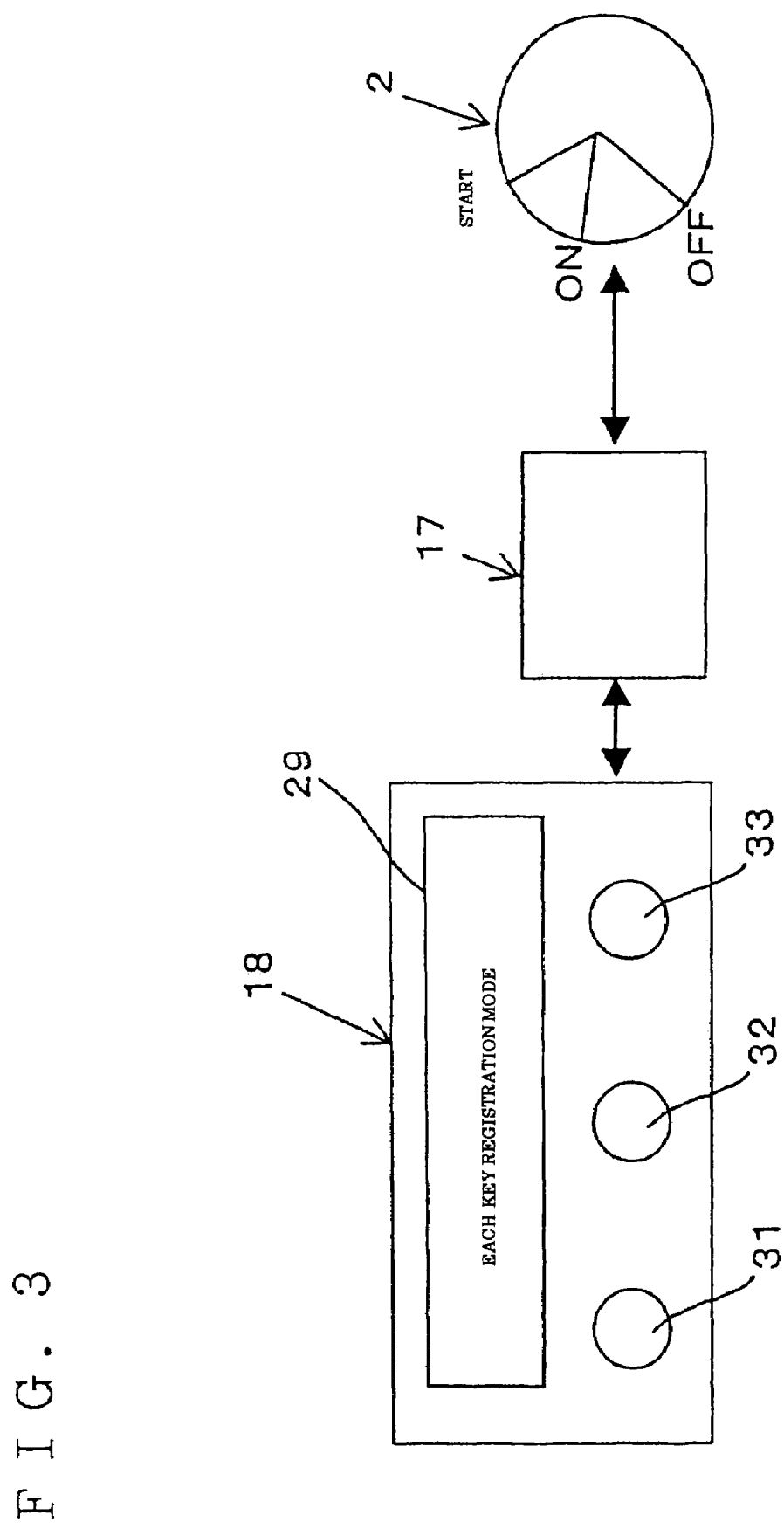
FIG. 3 is a structural view of a display device, a main switch and the like of the same embodiment.

Hereinafter, embodiments of the invention will be described with reference to the drawings. FIGS. 1 to 3 show a structure of an antitheft device 1 provided in a work machine (vehicle) such as a backhoe which is a rotary work machine. In FIGS. 1 to 3, reference numeral 2 denotes a main switch (ignition switch) including a key cylinder 3 defining a key hole 4 into which an engine key 5 is inserted for turning operation from an OFF position (OFF) to an ON position (ON) and a start position (START), and when the engine key 5 is inserted to set the main switch 2 to the start position and the engine key 5 is released, the main switch 2 is returned to the ON position by a force of a spring. Further, when the main switch 2 is set to the start position, a not-shown starter is connected to a battery through the main switch 2.

A transponder chip 9 is embedded in a head part of the engine key 5. As shown in FIG. 2, the transponder chip 9 of each engine key 5 includes a CPU 10, an EEPROM 11 and a transmission-reception unit 12, and an ID code is recorded in the EEPROM 11 of the engine key 5.

An antenna 15, an amplifier 16, an immobilizer control unit 17 and a display device 18 are provided on a body of the work machine (vehicle). An engine start signal S is outputted from the immobilizer control unit 17 to an engine control unit 19, whereby the engine control unit 19 ignites an engine ignition device 20, and fuel is engine-injected from a fuel injection device 21 to start the engine.

As shown in FIG. 2, the immobilizer control unit 17 includes an immobilizer CPU 23, an EEPROM 24, a ROM 25 and a RAM 26, and an ID code is recorded in the immobilizer control unit 17.

The antenna 15 is provided to be externally fitted to the key cylinder 3, and when the engine key 5 is inserted into the key cylinder 3 of the main switch 2 and is turned, the antenna 15 receives a signal of the ID code transmitted from the transponder chip 9 of the engine key 5, the amplifier 16 amplifies the signal received by the antenna 15, and the signal from the amplifier 16 is inputted to the immobilizer control unit 17.

As shown in FIG. 3, a display device 18 includes a display part 29 constructed of a liquid crystal or the like, and includes a first switch 31, a second switch 32 and a third switch 33 of a push button type. Incidentally, the first switch 31, the second switch 32 and the third switch 33 are used for, in addition to an operation to prevent theft, an operation to blink a display light, and the like.

Further, a code (personal identification code) can be inputted by input means of the first switch 31, the second switch 32 and the third switch 33.

Figure 27:
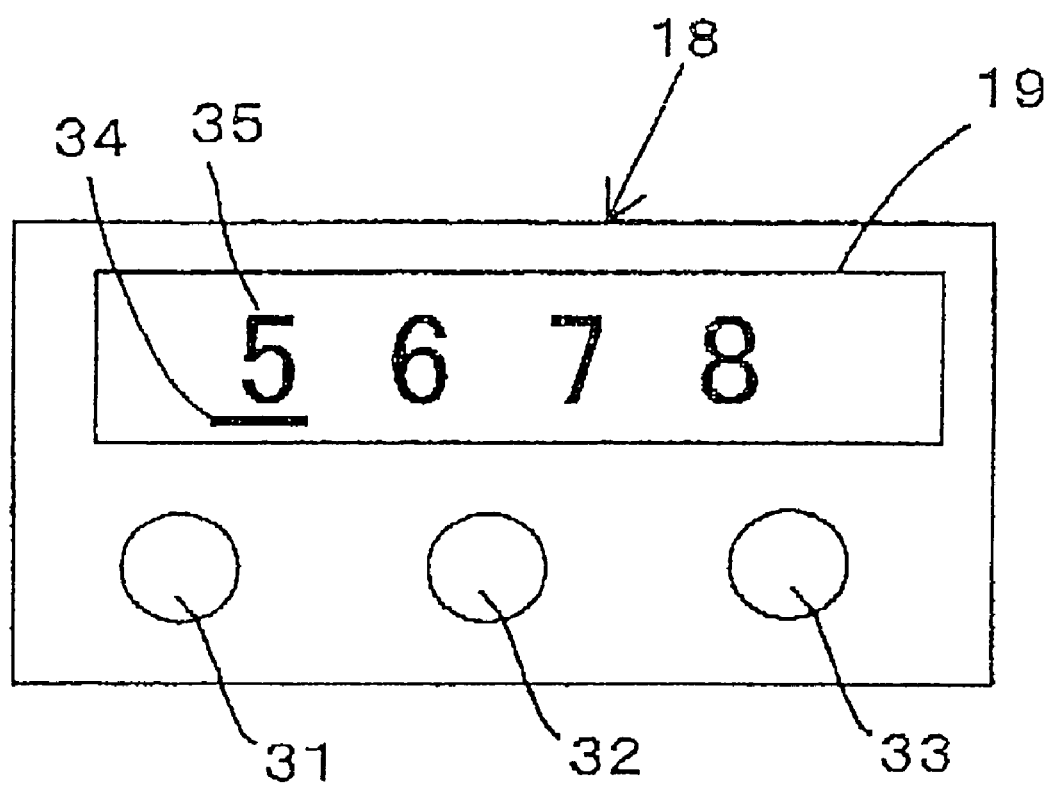
FIG. 27 is an explanatory view of a code input method by input means of the same embodiment.

As shown in FIG. 27, in order to input a code by the input means, for example, when the first switch 31 is pressed in a code input mode, a code 35 on a cursor 34 displayed on the display part 29 is changed, and each time the first switch 31 is pressed, the number increases like "0, 1, 2, . . . , 9". When the first switch 31 is further pressed, the number returns to 0, and each time the first switch 31 is pressed, the code 35 on the cursor 34 is changed from 0 to 9.

Further, each time the second switch 32 is pressed, the cursor 34 is sequentially moved from the right to the left, and the digit of the code 35 is changed, and when the second switch 32 is further pressed at the leftmost digit, the cursor is returned to the rightmost digit.

After the code 35 to be inputted is set by the first switch 31 and the second switch 32, when the third switch is pressed, the code 35 to be inputted is determined, and this code 35 is inputted to the immobilizer control unit 17.

Accordingly, the code 35 which can be expressed in a decimal number can be inputted by the input means.

Alternatively, the input means may be arranged to input a code expressed in a hexadecimal number, or a code expressed in another number system. As a matter of course, in the case where the input code is expressed in the hexadecimal number, each time the first switch 31 is pressed, the code 35 on the cursor 34 is changed from 0 to F.

The main switch 2, the display device 18, the immobilizer control unit 17 and the like are attached to an operation panel or the like in the vicinity of a driver's seat of a work machine.

As shown in FIGS. 4 to 7, each of the ID codes recorded in the immobilizer control unit 17 and the engine key 5 includes a cryptographic code for specifying the engine key 5, and a discrimination code for distinguishing the kind of the engine key 5. In each of the engine keys 5, both the cryptographic code and the discrimination code are recorded in the EEPROM 11 as shown in FIG. 4, while in the immobilizer control unit 17, the cryptographic code is recorded in the EEPROM 24 as shown in FIG. 5, and the discrimination code is recorded in the ROM 25 as shown in FIG. 6.

The engine keys 5 are distinguished by the discrimination code into a first engine start key 5A for starting the engine (hereinafter referred to as a blue key for convenience), a second engine start key 5B for starting the engine (hereinafter referred to as a yellow key for convenience), a first allowance key 5C for allowing rewriting or writing of the ID code (hereinafter referred to as a red key for convenience), and a second allowance key 5D for allowing rewriting or writing of the ID code (hereinafter referred to as a green key for convenience). The second engine start keys (yellow keys) 5B are further distinguished into a master key and a slave key by the discrimination code, and the second allowance keys (green keys) 5D are also distinguished into a master key and a slave key by the discrimination code.

Characters [a], [b], [c], [d], [e], [f], [g], [h], [i], [j], [k], [l], [m], [n], [o], [p], [q], [r], [s], [t], [u], [v], [w], and [x] shown in the columns of the cryptographic code and the discrimination code shown in FIGS. 4, 5, 6, 10, 11, 12, 14, 15, 17, 18, 20, 21, 23 and 24 are one-digit or multi-digit numerals and stand for, for example, a numerical value of [123], and the numerals include also a numerical value of [0], [00], [01] or the like. Further, identical characters, for example, [a] and [a] stand for an identical cryptographic code or an identical discrimination code, while different characters, for example, [a] and [b] stand for different cryptographic codes or different discrimination codes.

Incidentally, as shown in FIG. 6, the discrimination codes of [o to s] denote the blue keys 5A, the discrimination code of [t] denotes the master key of the yellow key 5B, the discrimination code of [u] denote the slave key of the yellow key 5B, the discrimination code of [v] denotes the red key 5C, the discrimination code of [w] denotes the master key of the green key 5D, and the discrimination code of [x] denotes the slave key of the green key 5D.

As shown in FIG. 7, the blue key 5A is a key used for starting an engine of a specific work machine, that is, one specific work machine is provided with only one blue key to be solely used for starting the engine of the specific work machine.

The yellow key 5B is a key used for starting the engine similarly to the blue key 5A, and one yellow key 5B, including the master key and the slave key, is used for starting engines of plural work machines.

The red key 5C is a key used for forming a new blue key 5A, a yellow key 5B or a green key 5D from a commercially available engine key 5, but engines can not be started by this red key 5C.

The green key 5D is a key used for forming a new blue key 5A or a yellow key 5B from a commercially available engine key 5 or the like similarly to the red key 5C, but engines can not be started by this green key 5D.

The engine key 5 is the key which is inserted into the key hole of the key cylinder 3 for turning operations of the main switch 2 from the OFF position (OFF) to the ON position (ON) and the start position (START), and includes the blue key 5A, the yellow key 5B, the red key 5C and the green key 5D.

Incidentally, in order to distinguish the respective keys, for example, as shown in FIG. 7, the head part of the blue key 5A is colored in black, and no sticker is stuck on the head part. The head part of the master key of the yellow key 5B is colored in black, and a yellow sticker is stuck on the head part. The head part of the slave key of the yellow key 5B is colored in black, and a yellow sticker is stuck on the head part. The head part of the red key 5C is colored in red, and no sticker is stuck on the head part. The head part of the master key of the green key 5D is colored in black, and a green sticker is stuck on the head part. The head part of the slave key of the green key 5D is colored in black, and a green sticker is stuck on the head part.

By the control of the immobilizer control unit 17 (or the CPU 10 of the engine key 5), the capability or incapability of rewriting of ID codes recorded in the respective keys 5 and the immobilizer control unit 17 is set as follows.

As shown in FIG. 4, both the cryptographic code and the discrimination code recorded in the blue key 5A can be rewritten. Both the cryptographic code and the discrimination code recorded in the master key of the yellow key 5B can not be rewritten, while both the cryptographic code and the discrimination code recorded in the slave key of the yellow key 5B can be rewritten. Both the cryptographic code and the discrimination code recorded in the red key 5C can not be rewritten. Both the cryptographic code and the discrimination code recorded in the master key of the green key 5D can not be rewritten, while both the cryptographic code and the discrimination code recorded in the slave key of the green key 5D can be rewritten.

As shown in FIG. 5, the cryptographic code of the blue key 5A recorded in the immobilizer control unit 17 can be rewritten. With respect to the cryptographic code of the yellow key 5B recorded in the immobilizer control unit 17, both the master key and the slave key can be rewritten. The cryptographic code of the red key 5C recorded in the immobilizer control unit 17 can not be rewritten in principle. However, only in an exceptional case, for example, when recording of the EEPROM 24 of the immobilizer control unit 17 is returned to an initial state, it can be rewritten. With respect to the cryptographic code of the green key 5D recorded in the immobilizer control unit 17, both the master key and the slave key can be rewritten.

As shown in FIG. 6, the discrimination codes recorded in the ROM 25 of the immobilizer control unit 17 can not be rewritten.

The immobilizer control unit 17 includes, in addition to an engine start allowance function to allow the starting of the engine, a start key registration function, an allowance key registration function, a start key copy function, and an allowance key copy function, which will be described below.

The engine start allowance function determines whether or not the starting of the engine should be allowed when the blue key 5A or the yellow key 5B is inserted into the key cylinder 3 to perform the engine starting operation, so that theft with an invalid key can be prevented. The ID code of the blue key 5A or the yellow key 5B is collated with the ID code recorded in the immobilizer control unit 17. When the result of the collation is affirmative, the starting of the engine with the blue key 5A or the yellow key 5B is allowed, an engine signal S is outputted from the immobilizer control unit 17 to the engine control unit 19, and the engine is started. When the result of the collation is negative, the engine start signal S is not outputted from the immobilizer control unit 17 to the engine control unit 19, and the starting of the engine is prevented.

Figure 8:
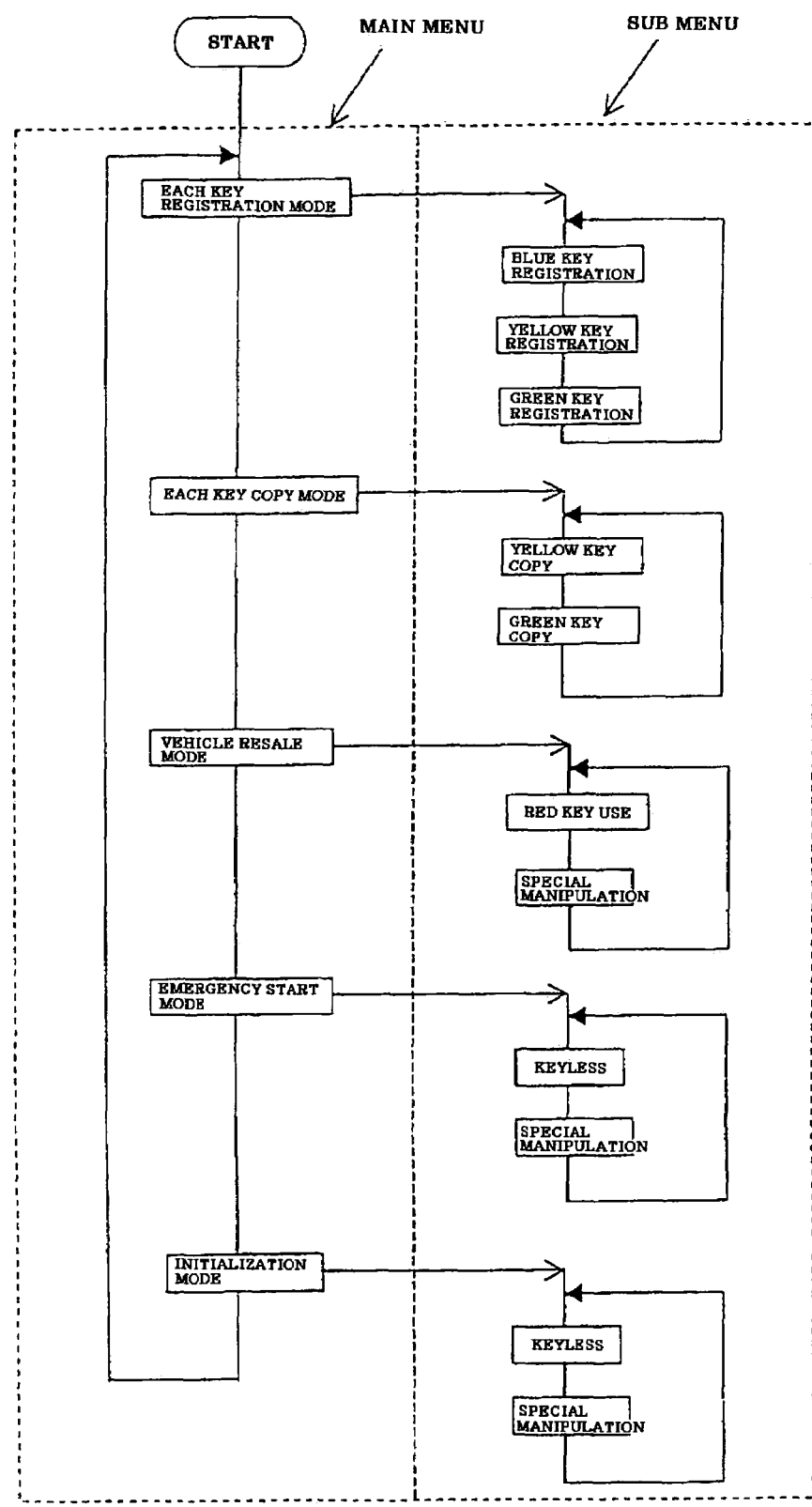
FIG. 8 is a flowchart showing the flow of a control mode of the same embodiment.

The control modes of the immobilizer control unit 17 are changed as follows. When the engine key 5 is inserted into the key cylinder 3 with the third switch 33 of the display device 18 pressed, and the main switch 2 is turned from the OFF position (OFF) to the ON position (ON), control modes for preventing theft starts, as shown in FIG. 8, and "each key registration mode" of a main menu initially starts. Each time the third switch 33 is pressed, the control mode of the main menu is sequentially changed from "each key registration mode" to "each key copy mode", "vehicle resale mode", "emergency start mode", and "initialization mode", and by further pressing the third switch 33, the mode is returned to "each key registration mode", and hereafter, each time the third switch 33 is pressed, the changeover of the control mode of the main menu is repeated.

When the second switch 32 is pressed in the "each key registration mode", the changeover of control modes of submenu starts, and each time the second switch 32 is pressed, the control mode of the submenu is sequentially changed to "blue key registration", "yellow key registration" and "green key registration", and each time the second switch 32 is pressed, the same changeover of the control mode of the submenu is repeated.

When the second switch 32 is pressed in the "each key copy mode", the changeover of control modes of submenu starts, and each time the second switch 32 is pressed, the control mode of the submenu is sequentially changed to "yellow key copy" and "green key copy", and each time the second switch 32 is pressed, the same changeover of the control mode of the submenu is repeated.

When the second switch 32 is pressed in the "vehicle resale mode", the changeover of control modes of submenu starts, and each time the second switch 32 is pressed, the control mode of the submenu is sequentially changed to "red key use" and "special manipulation", and each time the second switch 32 is pressed, the same changeover of the control mode of the submenu is repeated.

When the second switch 32 is pressed in the "emergency start mode", the changeover of control modes of submenu starts, and each time the second switch 32 is pressed, the control mode of the submenu is sequentially changed to "special manipulation" and "keyless", and each time the second switch 32 is pressed, the same changeover of the control mode of the submenu is repeated.

When the second switch 32 is pressed in the "initialization mode", the changeover of control modes of submenu starts, and each time the second switch 32 is pressed, the control mode of the submenu is sequentially changed to "special manipulation" and "keyless", and each time the second switch 32 is pressed, the same changeover of the control mode of the submenu is repeated.

In the control mode of "blue key registration" of "each key registration mode", the blue key 5A is formed from a commercially available engine key 5 through the start key registration function provided in the immobilizer control unit 17. In this start key registration function, the ID code of the red key 5C or the green key 5D is collated with the ID code recorded in the immobilizer control unit 17, and when the result of the collation is affirmative, the ID code of the engine key 5 is rendered corresponding to the ID code of the immobilizer control unit 17 so that the engine key 5 serves as the blue key 5A.

More specifically, in the control mode of "blue key registration" of "each key registration mode", when the red key 5C or the green key 5D is inserted into the key cylinder 3, and then the engine key 5 is inserted into the key cylinder 3, the memory area of the EEPROM 24 of the immobilizer control unit 17 corresponding to the discrimination code of the blue key 5A is cleared, and the cryptographic code of the engine key 5 is written into this area, while the discrimination code of the blue key recorded in the ROM 25 of the immobilizer control unit 17 is written into the engine key 5, so that identical pairs of cryptographic code and discrimination code are recorded in the engine key 5 and the immobilizer controller 17. As a result, the ID code of the engine key 5 is rendered corresponding to the ID code of the immobilizer control unit 17, so that the engine key 5 serves as the blue key 5A. Further, at this time, overwriting of the discrimination code of the registered blue key 5A is rendered impossible, and registration of the cryptographic code of the blue key 5A is rendered impossible so that this blue key 5A can not be registered as the blue key into an immobilizer control unit of another work machine.

In the control mode of "yellow key registration" of "each key registration mode", the yellow key 5B having a function as an engine start key is formed from an engine key 5 (yellow key 5B) which does not serve as the engine start key through the start key registration function provided in the immobilizer control unit 17. In this start key registration function, the ID code of the red key 5C or the green key 5D is collated with the ID code recorded in the immobilizer control unit 17, and when the result of the collation is affirmative, the ID code of the engine key 5 is rendered corresponding to the ID code of the immobilizer control unit 17 so that the engine key 5 serves as the yellow key 5B.

More specifically, in the control mode of "yellow key registration" of "each key registration mode", when the red key 5C or the green key 5D is inserted into the key cylinder 3, and then the engine key 5 (the yellow key 5B in which the cryptographic code and the discrimination code are recorded, but which does not serve as the engine start key) is inserted into the key cylinder 3, the cryptographic code of this engine key 5 is written into the memory area of the EEPROM 24 of the immobilizer control unit 17 corresponding to the discrimination code of the yellow key 5B, so that identical pairs of cryptographic code and discrimination code are recorded in the engine key 5 and the immobilizer control unit 17. As a result, the ID code of the engine key 5 is rendered corresponding to the ID code of the immobilizer control unit 17, so that the engine key 5 serves as the yellow key 5B. Further, at this time, in order that the registered yellow key 5B can be registered as the yellow key into an immobilizer control unit of another work machine, the registration of the cryptographic code of the yellow key 5B is not rendered impossible, but is made to remain possible.

In the control mode of "green key registration" of "each key registration mode", the green key 5D having a function as an allowance key is formed from an engine key 5 (green key 5D) which does not serve as the allowance key through the allowance key registration function provided in the immobilizer control unit 17. In this allowance key registration function, the ID code of the red key 5C is collated with the ID code recorded in the immobilizer control unit 17, and when the result of the collation is affirmative, the ID code of the engine key 5 is rendered corresponding to the ID code of the immobilizer control unit 17 so that the engine key 5 serves as the green key 5D.

More specifically, in the control mode of "green key registration" of "each key registration mode", when the red key 5C is inserted into the key cylinder 3, and then the engine key 5 (green key 5D in which the cryptographic code and the discrimination code are recorded, but which does not function as the allowance key) is inserted into the key cylinder 3, the cryptographic code of this engine key 5 is written into the memory area of the EEPROM 24 of the immobilizer control unit 17 corresponding to the discrimination code of the green key 5D, so that identical pairs of cryptographic code and discrimination code are recorded in the engine key 5 and the immobilizer control unit 17. As a result, the ID code of the engine key 5 is rendered corresponding to the ID code of the immobilizer control unit 17, so that the engine key 5 serves as the green key 5D. Further, at this time, in order that the registered green key 5D can be registered as the green key into an immobilizer control unit of another work machine, the registration of the cryptographic code of the green key 5D is not rendered impossible, but is made to remain possible.

In the control mode of "yellow key copy" of "each key copy mode", the slave key of the yellow key 5B is formed from a commercially available engine key 5 (or unregistered blue key 5A) with using the master key of the yellow key 5B through the start key copy function provided in the immobilizer control unit 17. In the start key copy function, the ID code of the master key of the yellow key 5B is written into another engine key 5 so that the engine key serves as an engine start key.

More specifically, in the control mode of "yellow key copy" of "each key copy mode", when the master key of the yellow key 5B is inserted into the key cylinder 3, the ID code (only the cryptographic code) of the master key is written into the RAM 26 of the immobilizer control unit 17, and then, when another engine key 5 is inserted into the key cylinder 3, the cryptographic code of the master key written in the immobilizer control unit 17 and the discrimination code denoting the slave key of the yellow key 5B are written into the EEPROM 11 of the engine key 5. As a result, identical pairs of cryptographic code and discrimination code are recorded in the engine key 5 and the immobilizer control unit 17, whereby the ID code of the engine key 5 is rendered corresponding to the ID code of the immobilizer control unit 17, and the master key of the yellow key 5B is copied into the engine key 5 as the slave key of the yellow key 5B.

In the control mode of "green key copy" of "each key copy mode", the slave key of the green key 5D is formed from a commercially available engine key 5 (or unregistered blue key 5A) with using the master key of the green key 5D through the allowance key copy function provided in the immobilizer control unit 17. In the allowance key copy function, the ID code of the master key of the green key 5D is written into another engine key 5 so that the engine key serves as an allowance key.

More specifically, in the control mode of "green key copy" of "each key copy mode", when the master key of the green key 5D is inserted into the key cylinder 3, the ID code (only the cryptographic code) of the master key is written into the RAM 26 of the immobilizer control unit 17, and then, when another engine key 5 is inserted into the key cylinder 3, the cryptographic code of the master key written in the immobilizer control unit 17 and the discrimination code denoting the slave key of the green key 5D are written into the EEPROM 11 of the engine key 5. As a result, pairs of identical cryptographic codes and discrimination codes are recorded in the engine key 5 and the immobilizer control unit 17, so that the ID code of the engine key 5 is rendered corresponding to the ID code of the immobilizer control unit 17, and the master key of the green key 5D is copied into the engine key 5 as the slave key of the green key 5D.

In the control mode of "vehicle resale mode", the ID code of the yellow key 5B recorded in the EEPROM 24 of the immobilizer control unit 17 is deleted from the immobilizer control unit 24 for preventing the engine from being started by the yellow key 5B before the resale, since if, for example, a work machine whose engine can be started by plural yellow keys 5B is resold, the engine of the work machine after the resale can be started by the plural yellow keys 5B recorded in the EEPROM 24 of the immobilizer control unit 17 before the resale.

Further, in the control mode of "vehicle resale mode", the ID code of the green key 5D recorded in the EEPROM 24 of the immobilizer control unit 17 is also deleted from the immobilizer control unit 17, since if the ID code of the green key 5D recorded in the EEPROM 24 of the immobilizer control unit 17 before the resale remains recorded in the EEPROM 24 of the immobilizer control unit 17 after the resale, a commercially available engine key 5 can be registered as the engine start key 5A, 5B with using the green key 5D before the resale. The control mode of "vehicle resale mode" is performed by a delete function provided in the immobilizer control unit 17.

This delete function includes a delete function using a red key in which when a valid red key 5C is inserted into the key cylinder 3, the ID code of the yellow key 5B or the green key 5D recorded in the EEPROM 24 of the immobilizer control unit 17 is deleted from the EEPROM 24 of the immobilizer control unit 17, and a delete function using a special manipulation in which when the engine key 5 is inserted into the key cylinder 3 and a special manipulation is performed, the ID code of the yellow key 5B or the green key 5D recorded in the EEPROM 24 of the immobilizer control unit 17 is deleted from the EEPROM 24 of the immobilizer control unit 17.

In the delete function using the red key in the control mode of "red key use" of "vehicle resale mode", after the red key 5C is inserted into the key cylinder 3, the discrimination code of the red key 5C is collated with the discrimination code of the immobilizer control unit 17 corresponding thereto, and the cryptographic code of the red key 5C is collated with the cryptographic code of the immobilizer control unit 17 corresponding thereto. When the results of respective collations are affirmative, the cryptographic code of the yellow key 5B recorded in the EEPROM 24 of the immobilizer control unit 17 is deleted from the EEPROM 24 of the immobilizer control unit 17, and the cryptographic code of the green key 5D recorded in the EEPROM 24 of the immobilizer control unit 17 is deleted from the EEPROM 24 of the immobilizer control unit 17.

In the delete function using the special manipulation in the control mode of "special manipulation" of "vehicle resale mode", after the ignition switch 2 is ON-OFF rotated by the engine key 5, the immobilizer control unit 17 receives the ON-OFF rotation signal of the key cylinder 3, the immobilizer CPU 23 of the immobilizer control unit 17 counts the number of times of ON-OFF rotation of the ignition switch 2, that is, how many times the ignition switch 2 is rotated from the OFF position to the ON position by the engine key 5. When the number of times of ON-OFF rotation of the ignition switch 2 after the lapse of a predetermined period of time from the start of the ON-OFF rotation coincides with a predetermined number of times, the cryptographic code of the yellow key 5B recorded in the EEPROM 24 of the immobilizer control unit 17 is deleted from the EEPROM 24 of the immobilizer control unit 17, and the cryptographic code of the green key 5D recorded in the EEPROM 24 of the immobilizer control unit 17 is deleted from the EEPROM 24 of the immobilizer control unit 17.

Incidentally, the engine key 5 used in the special manipulation may be any key as long as the ignition switch 2 can be rotated from the OFF position to the ON position.

The control mode of "keyless" of "emergency start mode" is for enabling the starting of the engine especially in the case where, for example, the blue key 5A and the yellow key 5B to start the engine are lost, and is performed by the engine start function through code input provided in the immobilizer control unit 17.

In the engine start function through the code input, when the code inputted by the input means coincides with the engine starting code recorded in the ROM 25 of the immobilizer control unit 17, the starting of the engine is allowed.

More specifically, in the control mode of "keyless" of "emergency start mode", the conversion function provided in the immobilizer control unit 17 is actuated for converting the engine starting code recorded in the immobilizer control unit 17 into a vehicle registration number (dummy engine starting code, conversion code) for specifying the work machine (antitheft device 1) which is displayed by the display means 19 so that a code can be inputted by the input means. In the case where the input code inputted by the input means coincides with the engine starting code, the engine starting is allowed.

The control mode of "special manipulation" of "emergency start mode" is, similarly to the control mode of "keyless" of "emergency start mode", for enabling the engine starting especially in the case where the blue key 5A and the yellow key 5B to start the engine are lost, and is performed by the engine start function through the special manipulation provided in the immobilizer control unit 17.

The engine start function through the special manipulation allows the starting of the engine when the engine key 5 is inserted into the key cylinder 3 and the special manipulation is performed.

More specifically, in the control mode of "special manipulation" of "emergency start mode", when the ignition switch 2 is ON-OFF rotated by the engine key 5, the immobilizer control unit 17 receives the ON-OFF rotation signal of the key cylinder 3, and the immobilizer CPU 23 of the immobilizer control unit 17 counts how many times the ignition switch 2 is rotated from the OFF position to the ON position by the engine key 5, that is, the number of times of ON-OFF rotation of the ignition switch 2. When the number of times of ON-OFF rotation of the ignition switch 2 after the lapse of a predetermined period of time from the start of the ON-OFF rotation is coincides with a predetermined number of times, the engine starting is allowed.

Incidentally, the engine key 5 used for this special manipulation may be any key as long as it can be fitted in the key hole of the key cylinder 3 and can rotate the ignition switch 2.

The control mode of "initialization mode" is for initializing the ID code recorded in the immobilizer control unit 17 of the work machine in the case where the yellow key 5B is recorded in plural immobilizer control units 17, or the plural blue keys 5A are recorded in one work machine, and when it becomes unclear which engine start key 5A, 5B corresponds to which work machine, and this mode is performed by the initialization function provided in the immobilizer control unit 17.

This initialization function includes an initialization function through code input in which the recording portion of the ID code of the immobilizer control unit 17 is initialized when a code inputted by the input means coincides with an initialization code to initialize the ID code recorded in the immobilizer control unit 17, and an initialization function through a special manipulation in which the recording portion of the ID code of the immobilizer control unit 17 is initialized when a key (engine key 5) capable of rotating the ignition switch 2 from the OFF position to the ON position is inserted into the key cylinder 3 and the special manipulation is performed.

In the initialization function through the code input in the control mode of "keyless" of "initialization mode", the conversion function provided in the immobilizer control unit 17 is actuated for converting the initialization code recorded in the immobilizer control unit 17 into a vehicle registration number (dummy initialization code, conversion code) for specifying the work machine which is displayed on the display means 19 so that a code can be inputted by the input means. When the input code inputted by the input means coincides with the initialization code, the engine key 5 is allowed to be recorded as the red key 5C into the immobilizer control unit 17, and after the engine key 5 is recorded as the red key 5C (the cryptographic code of the engine key 5 is written into the EEPROM 24 of the immobilizer control unit 17, and the discrimination code of the immobilizer control unit 17 corresponding to the red key 5C is written into the EEPROM 11 of the engine key 5), the cryptographic codes (blue key, yellow key, green key) other than the red key 5C recorded in the immobilizer control unit 17 are cleared.

In the initialization function through the special manipulation in the control mode of "keyless" of "initialization mode", when the ignition switch 2 is ON-OFF rotated by the engine key 5, the immobilizer control unit 17 receives the ON-OFF rotation signal of the key cylinder 3, and the immobilizer CPU 23 of the immobilizer control unit 17 counts how many times the ignition switch 2 is rotated by the engine key 5 from the OFF position to the ON position, that is, the number of times of ON-OFF rotation of the ignition switch 2. When the number of times of ON-OFF rotation of the ignition switch 2 after the lapse of a predetermined time from the start of the ON-OFF rotation coincides with a predetermined number of times, the engine key 5 is allowed to be recorded as the red key 5C into the immobilizer control unit 17, and after the engine key 5 is recorded as the red key 5C (the cryptographic code of the engine key 5 is written into the EEPROM 24 of the immobilizer control unit 17, and the discrimination code of the immobilizer control unit 17 corresponding to the red key 5C is written into the EEPROM 11 of the engine key 5), the cryptographic codes (blue key, yellow key, green key) other than the red key 5C recorded in the immobilizer control unit 17 are cleared.

Incidentally, the engine key 5 used for this special manipulation may be any key as long as it can be fitted in the key hole of the key cylinder 3 and can rotate the ignition switch 2.

Further, the immobilizer control unit 17 controls the display part 29, and the display part 29 sequentially variably displays the operation to perform the start key registration function, and each time the operation is performed, the operation to be performed next is sequentially variably displayed. Further, the display part 29 is controlled to sequentially variably display the control mode of the immobilizer control unit 17.

When a work machine such as a backhoe is sold, a dealer sells one work machine with four keys in total, as marked by double circles in FIG. 4, that is, one blue key 5A, a master key of one yellow key 5B, one red key 5C and a master key of one green key 5D to a user (a rental company of the work machine, a personal user).

At this time, as shown in FIG. 4, only the cryptographic code is recorded in the blue key 5A, and the discrimination code is not recorded therein, and the memory area of the discrimination code remains in a blank state. Accordingly, in this state, the blue key 5A does not have the function of the engine start key. The cryptographic code and the discrimination code are recorded in the yellow key 5B, the red key 5C and the green key 5D.

On the other hand, in the EEPROM 24 of the immobilizer control unit 17 of the work machine, only the cryptographic code of the red key 5C is recorded, and the memory areas of the cryptographic codes of the other keys remain in blank states. Further, in the ROM 25 of the immobilizer control unit 17, the discrimination codes of the blue keys 5A of Nos. 1 to 5, the discrimination code of the master key of the yellow key 5B, the discrimination code of the slave key of the yellow key 5B, the discrimination code of the red key 5C, the discrimination code of the master key of the green key 5D, and the discrimination code of the slave key of the green key 5D are recorded.

Figure 9:
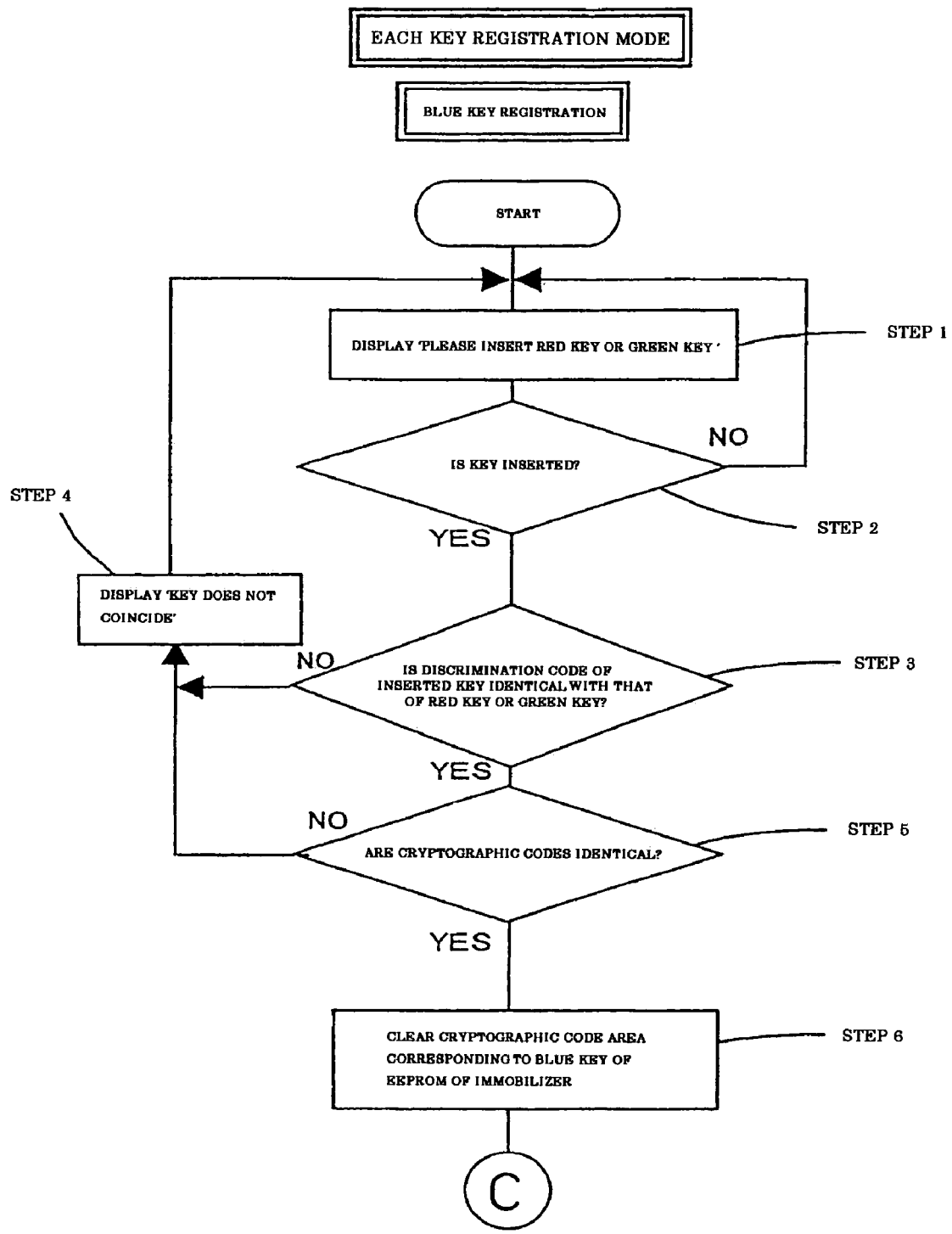
FIG. 9(a) is a flowchart showing a registration operation procedure of a first start key of the same embodiment.
FIG. 9(b) is a flowchart showing the registration operation procedure of the first start key of the same embodiment.
Figure 9:
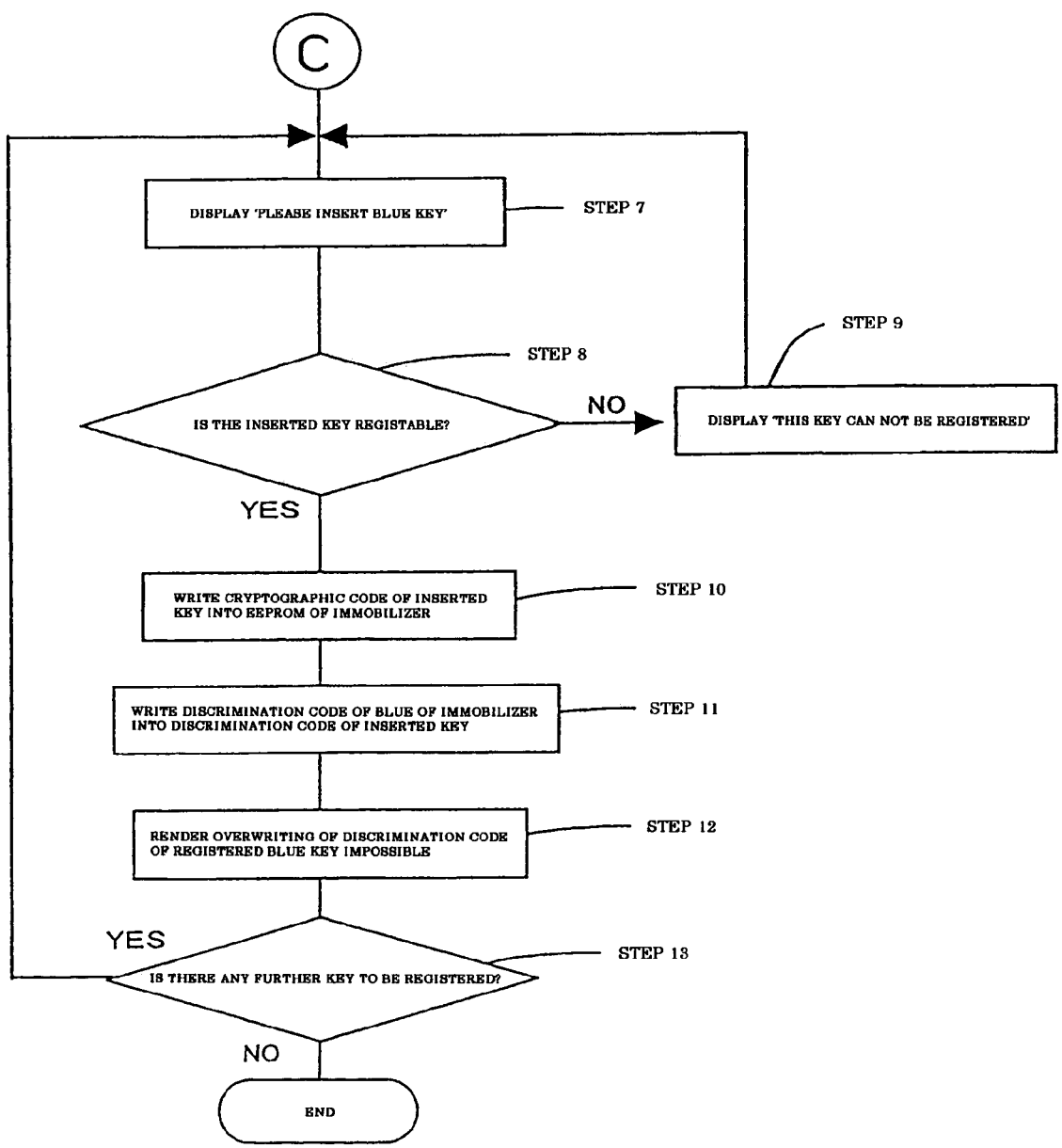

Next, the operation procedure of the control mode of "blue key registration" in "each key registration mode" will be described with reference to flowcharts of FIG. 9(a) and 9(b).

In step 1 of the control mode of "blue key registration" of "each key registration mode", the display part 29 displays "blue key registration" of "each key registration mode" and 'Please insert red key or green key', and then, the procedure advances to step 2.

In the step 2, it is judged whether or not the engine key 5 is inserted into the key cylinder 3. When it is judged that the engine key 5 is inserted, the procedure advances to step 3, and when it is judged that the engine key 5 is not inserted, the procedure returns to step 1.

Accordingly, when the control mode of "blue key registration" starts, the display of "blue key registration" of "each key registration mode" and 'Please insert red key 5C or green key 5D' on the display part 29 continues until the engine key 5 is inserted into the key cylinder 3 to urge the insertion of the red key 5C or the green key 5D into the key cylinder 3.

In the step 3, it is judged whether or not the discrimination code of the engine key 5 inserted into the key cylinder 3 is identical with the discrimination code of the red key 5C or the green key 5D. When it is identical with the discrimination code of the red key 5C or the green key 5D, the procedure advances to step 5, and when it is not identical with the discrimination code of the red key 5C or the green key 5D, the procedure advances to step 4 with displaying 'Key does not coincide' on the display part 29 for a predetermined period of time (several seconds), and the procedure returns to step 1.

In the step 5, it is judged whether or not the cryptographic code of the engine key 5 inserted into the key cylinder 3 is identical with the cryptographic code recorded in the immobilizer control unit 17. When the cryptographic codes are identical, the procedure advances to step 6, and when the cryptographic codes are not identical, the procedure advances to step 4 with displaying 'Key does not coincide' on the display part 29, and the procedure returns to step 1.

Accordingly, when the engine key 5 other than the registered red key 5C or the green key 5D is inserted into the key cylinder 3, after it is notified that the key different from the red key 5C or the green key 5D has been inserted into the key cylinder 3 by displaying 'Key does not coincide' on the display part 29, the insertion of the red key 5C or the green key 5D into the key cylinder 3 is urged again.

In the step 5, when the cryptographic codes are judged to be identical, the process advances to step 6 in which the memory area of the cryptographic code, corresponding to the blue key 5A, of the EEPROM 24 of the immobilizer control unit 17 is cleared (see FIG. 11), and then, the procedure advances to step 7. In the step 7, 'Please insert blue key 5A' is displayed on the display part 29 (until a new key is inserted into key cylinder 3), and the procedure advances to step 8.

In the step 8, it is judged whether or not the engine key 5 inserted into the key cylinder 3 can be registered. In this judgment, only when the cryptographic code is recorded in the inserted engine key 5, and the memory area of the discrimination code of the engine key 5 is blank or the discrimination code of the blue key is recorded in the memory area of the discrimination code, the engine key is judged to be registrable, and the procedure advances to step 10. When the engine key 5 inserted into the key cylinder 3 contains a discrimination code other than that of the blue key 5A, that is, the discrimination code of the master key of the yellow key 5B, the discrimination code of the slave key of the yellow key 5B, the discrimination code of the master key of the green key 5D, or the discrimination code of the slave of the green key 5D, or the engine key is a blank key (engine key 5 in which the cryptographic code is not recorded), the engine key is judged to be unregistrable, and the procedure advances to step 9. In the step 9, 'This key can not be registered' is displayed on the display part 29, and the procedure returns to step 8.

Accordingly, only the engine key 5 in which the cryptographic code is recorded and any discrimination code other than the blue key 5A is not recorded can be registered as the blue key, and the engine key 5 other than this can not be registered.

In the step 10, the cryptographic code of the engine key 5 inserted into the key cylinder 3 is written into the memory area, corresponding to the blue key, of the EEPROM 24, and in step 11, the discrimination code of the blue key is written into the EEPROM 11 of the inserted engine key 5. In step 12, overwriting of the discrimination code of the registered engine key 5 (blue key 5A) is rendered impossible, registration of the cryptographic code is rendered impossible, and then, the procedure advances to step 13.

Accordingly, among the engine keys 5, with respect to the engine key 5 in which only the cryptographic code is recorded and the discrimination code is not recorded, or the engine key 5 (unregistered blue key 5A) in which the cryptographic code is recorded and the discrimination code of the blue key is recorded, the ID code of the engine key 5 corresponds to the ID code of the immobilizer control unit 17 so that the blue key is registered to serve as the engine start key, a new blue key 5A is formed, and the engine can be started by this blue key 5A. In this operation, since the overwriting of the discrimination code of the blue key 5A is rendered impossible, this blue key 5A can not be changed to the yellow key 5B or the other key after this operation. Further, since the registration of the cryptographic code of the blue key 5A is rendered impossible, this blue key 5A can not be registered as the blue key in the immobilizer control unit 17 of another work machine after this operation, and accordingly, this blue key 5A can be used only for the starting of the engine of the work machine corresponding to this key.

In the step 12, the overwriting of the discrimination code of the registered engine key 5 (blue key 5A) is rendered impossible, and the registration of the cryptographic code is rendered impossible. Alternatively, in the step 12, the overwriting and the registration of the ID code (cryptographic code and discrimination code) of the registered engine key 5 (blue key 5A) may be rendered impossible.

In step 13, it is judged whether or not further engine key 5 is to be registered as the blue key 5A, and when it is judged that the engine key 5 is to be registered, the procedure returns to step 7, and the registration operation of the next engine key 5 is performed. The judgment of whether or not the registration is to be performed is made according to, for example, whether or not the first switch 31 is operated to be ON within a predetermined period of time. When the first switch 31 is operated to be ON, it is judged that the engine key 5 is registered as the blue key, and the procedure returns to step 7, and when the first switch 31 is not operated to be ON within the predetermined period of time, it is judged that the engine key 5 is not registered, and the registration operation of the blue key 5A ends. Accordingly, the registration of the blue key can be continuously performed with respect to plural engine keys 5.

Accordingly, for example, as shown in the left table of FIG. 10, in the case where the cryptographic code is recorded in the EEPROM 24 of the immobilizer control unit 17, for registering a newly purchased engine key 5 with a cryptographic code of [i] and an engine key 5 with a cryptographic code of [j] as shown in the right table of FIG. 10 as blue keys, the memory area of the cryptographic code, corresponding to the blue key, of the EEPROM 24 of the immobilizer control unit 17 is once cleared, as shown in FIG. 11 (step 6).

Thereafter, as shown in the left table of FIG. 12, the cryptographic code of [i] and the cryptographic code of [j] are recorded in the two memory areas of the cryptographic code, corresponding to the blue keys 5A, of the EEPROM 24 of the immobilizer control unit 17, and as shown in the right table of FIG. 12, the discrimination code of [o] and the discrimination code of [p] are recorded in the memory areas of the discrimination codes of the EEPROMs 11 of the two engine keys 5. As a result, two blue keys 5A are formed, and the engine can be started by these keys.

Figure 13:
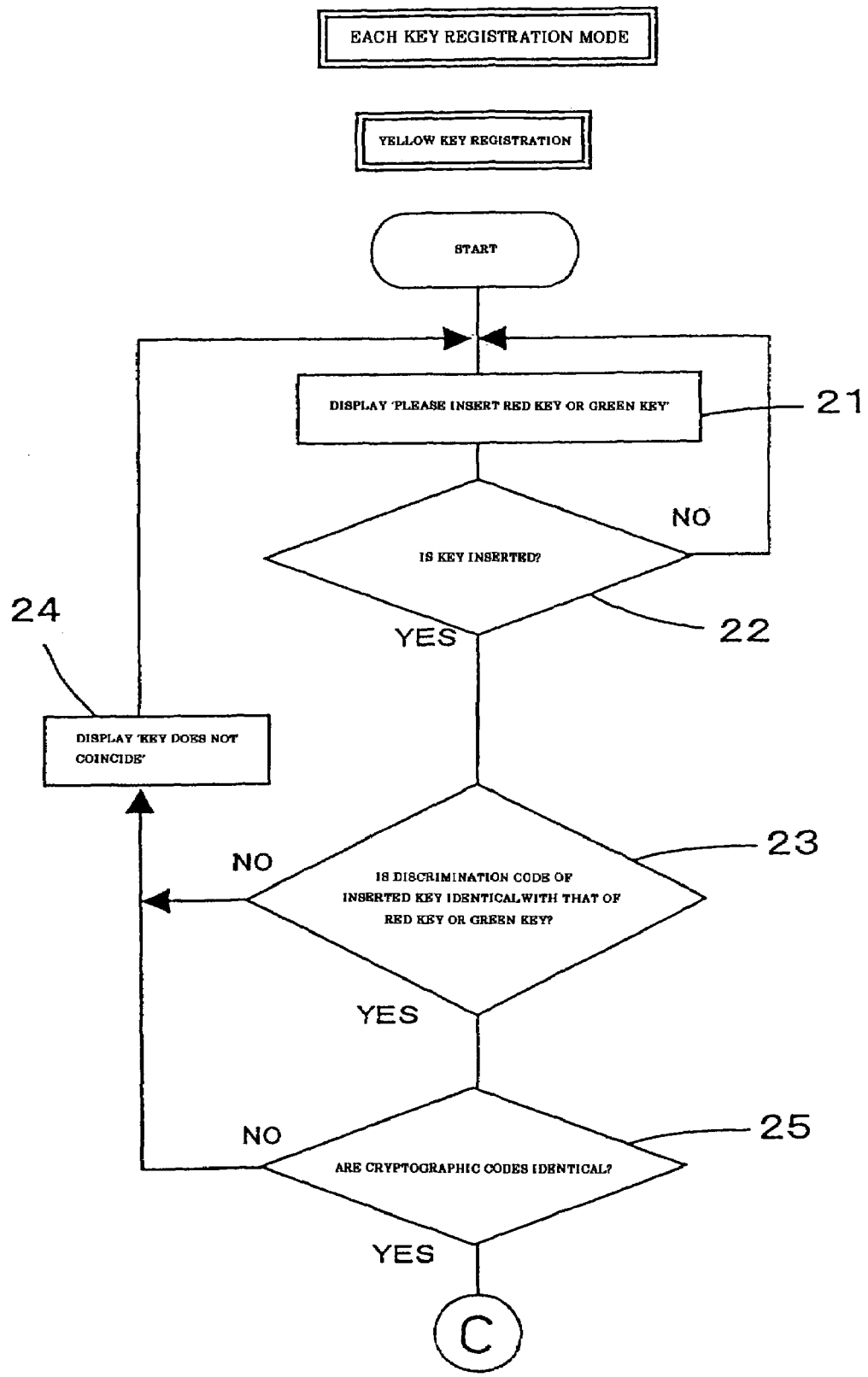
FIG. 13(a) is a flowchart showing a registration operation procedure of a second start key of the same embodiment.
FIG. 13(b) is a flowchart showing the registration operation procedure of the second start key of the same embodiment.
Figure 13:
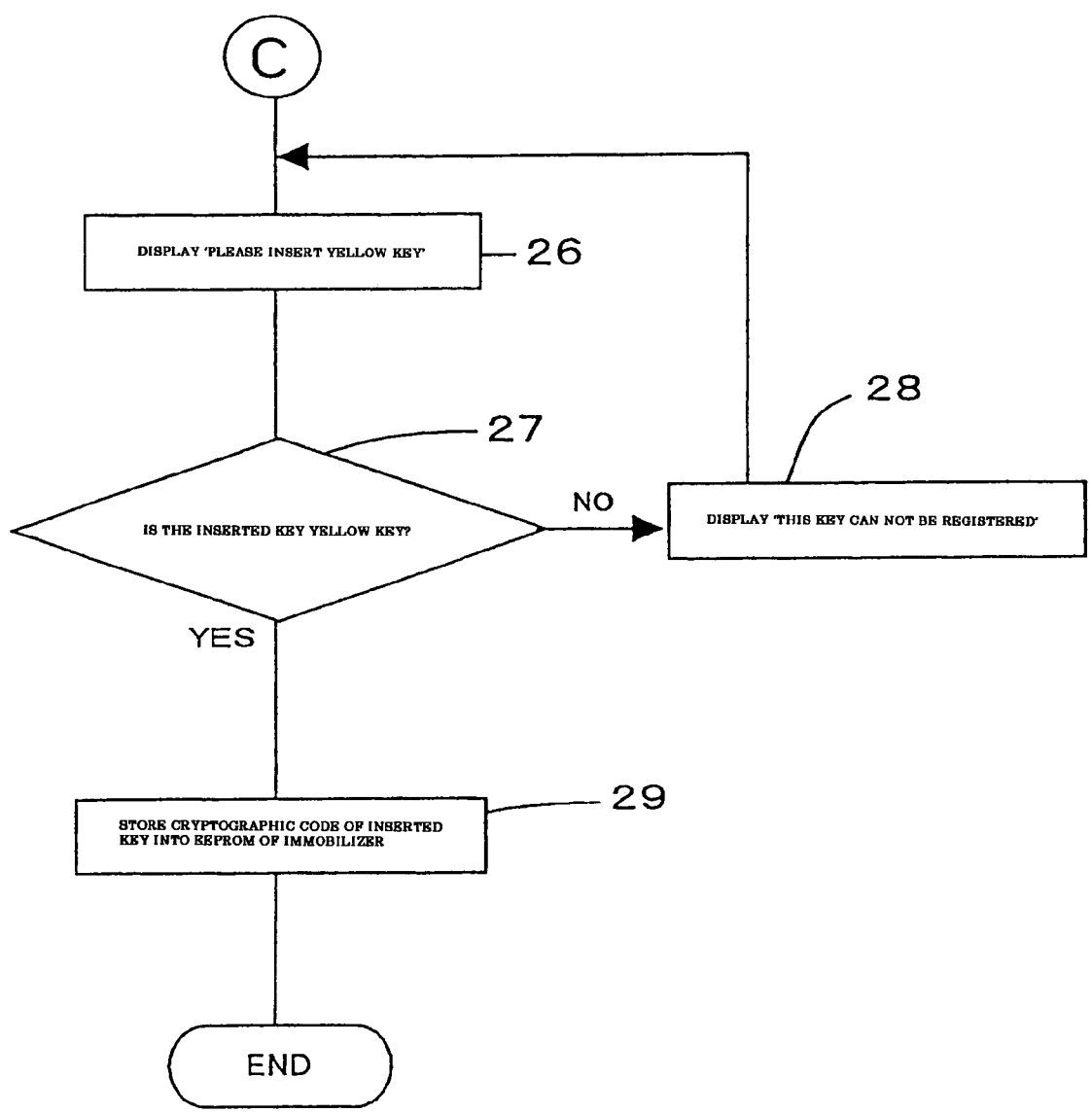

Next, the operation procedure of the control mode of "yellow key registration" in "each key registration mode" will be described with reference to flowcharts of FIG. 13(*a*) and FIG. 13(*b*).

In step 21 of the control mode of "yellow key registration" of "each key registration mode", the display part 29 displays "yellow key registration" of "each key registration mode" and 'Please insert red key or green key', and then, the procedure advances to step 22.

In the step 22, it is judged whether or not the engine key 5 is inserted into the key cylinder 3. When it is judged that the engine key 5 is inserted, the procedure advances to step 23, and when it is judged that the engine key 5 is not inserted, the procedure returns to step 21.

Accordingly, when the control mode of "yellow key registration" starts, the display of "yellow key registration" of "each key registration mode" and 'Please insert red key 5C or green key 5D' on the display part 29 continues until the engine key 5 is inserted into the key cylinder 3 to urge the insertion of the red key 5C or the green key 5D into the key cylinder 3.

In the step 23, it is judged whether or not the discrimination code of the engine key 5 inserted into the key cylinder 3 is identical with the discrimination code of the red key 5C or the green key 5D. When it is identical with the discrimination code of the red key 5C or the green key 5D, the procedure advances to step 25, and when it is not identical with the discrimination code of the red key 5C or the green key 5D, the procedure advances to step 24 with displaying 'Key does not coincide' on the display part 29 for a predetermined period of time (several seconds), and the procedure returns to step 21.

In the step 25, it is judged whether or not the cryptographic code of the engine key 5 inserted into the key cylinder 3 is identical with the cryptographic code recorded in the immobilizer control unit 17. When the cryptographic codes are identical, the procedure advances to step 26, and when the cryptographic codes are not identical, the procedure advances to step 24 with displaying 'Key does not coincide' on the display part 29, and the procedure returns to step 21.

Accordingly, when the engine key 5 other than the registered red key 5C or the green key 5D is inserted into the key cylinder 3, after it is notified that the erroneous key different from the red key 5C or the green key 5D has been inserted into the key cylinder 3 by displaying 'Key does not coincide' on the display part 29, the insertion of the red key 5C or the green key 5D into the key cylinder 3 is urged again.

In the step 25, when the cryptographic codes are judged to be identical, the procedure advances to step 26, and in the step 26, 'Please insert yellow key' is displayed on the display part 29 (until a new key is inserted into the key cylinder 3), and the procedure advances to step 27.

In the step 27, it is judged whether or not the engine key 5 inserted into the key cylinder 3 can be registered. In this step, when the inserted engine key 5 is the master key or the slave key of the yellow key, that is, the cryptographic code is recorded in the inserted engine key 5, and the discrimination code of the master key of the yellow key or the discrimination code of the slave key of the yellow key 5B is recorded in the memory area of the discrimination code of the engine key 5, the key is judged to be registrable, and the procedure advances to step 29. In the case where a discrimination code other than the discrimination code of the master key or the slave key of the yellow key is recorded in the engine key 5 inserted into the key cylinder 3, in the case where the discrimination code is not recorded, or in the case where the cryptographic code is not recorded, the key is judged to be unregistrable, and the procedure advances to step 28. In the step 28, 'This key can not be registered' is displayed on the display part 29, and the procedure returns to step 26.

Accordingly, in the case where the cryptographic code is recorded in the inserted engine key 5, and the discrimination code of the master key or the slave key of the yellow key is recorded in the memory area of the discrimination code of the engine key 5, the engine key 5 can be registered as the yellow key 5B (master key and slave key), and an engine key 5 other than this can not be registered.

In the step 29, the cryptographic code of the engine key 5 inserted into the key cylinder 3 is written into the memory area, corresponding to the master key of the yellow key 5B, in the EEPROM 24 of the immobilizer control unit 17, and at this time, the same cryptographic code is simultaneously written into the memory area, corresponding to the slave key of the yellow key, in the EEPROM 24, and the registration operation of the yellow key ends.

Accordingly, among the engine keys 5, with respect to the key in which the cryptographic code is recorded and the discrimination code of the master key or the slave key of the yellow key is recorded, the ID code of the engine key 5 corresponds to the ID code of the immobilizer control unit 17 so that the yellow key (master key and slave key) is registered to serve as the engine start key, and the engine can be started by this master key of the yellow key 5B or slave key of the yellow key 5B.

Accordingly, for example, as shown in the left table of FIG. 14, in the case where the memory areas of the cryptographic code, corresponding to the master key and the slave key of the yellow key, of the EEPROM 24 of the immobilizer control unit 17 are blank, and the yellow key 5B is not registered, the master key or the slave key of the yellow key in which the cryptographic code of [f] is recorded, as shown in the right table of FIG. 14, enables the cryptographic code of [f] to be recorded into the memory area corresponding to the master key of the yellow key and the memory area corresponding to the slave key of the yellow key of the EEPROM 24 of the immobilizer control unit 17, as shown in the left table of FIG. 15, whereby the yellow key 5B is registered, and the engine can be started by the master key of the yellow key 5B or the slave key of the yellow key 5B.

Further, in the registration operation of the yellow key, differently from the registration operation of the blue key, since the registration of the cryptographic code is not rendered impossible, the registered yellow key 5B can also be registered as the yellow key 5B into the immobilizer control unit 17 of another work machine.

Incidentally, in the operation procedure of the control mode of "yellow key registration", when one of the master key of the yellow key 5B and the slave key of the yellow key 5B is registered, the cryptographic code of the yellow key 5B is written into the memory area, corresponding to the master key of the yellow key 5B, in the EEPROM 24 of the immobilizer control unit 17, and simultaneously, the identical cryptographic code is written into the memory area corresponding to the slave key of the yellow key 5B, so that both the master key of the yellow key 5B and the slave key of the yellow key 5B are registered. Alternatively, the memory area of the cryptographic code, corresponding to the master key of the yellow key 5B, in the EEPROM 24 may be made in common with the memory area of the cryptographic code corresponding to the slave key of the yellow key 5B, so that the registration operation of one of the master key of the yellow key 5B and the slave key of the yellow key 5B can register both of the master key of the yellow key 5B and the slave key of the yellow key 5B. Alternatively, the master key of the yellow key 5B and the slave key of the yellow key 5B may be separately registered.

Figure 16:
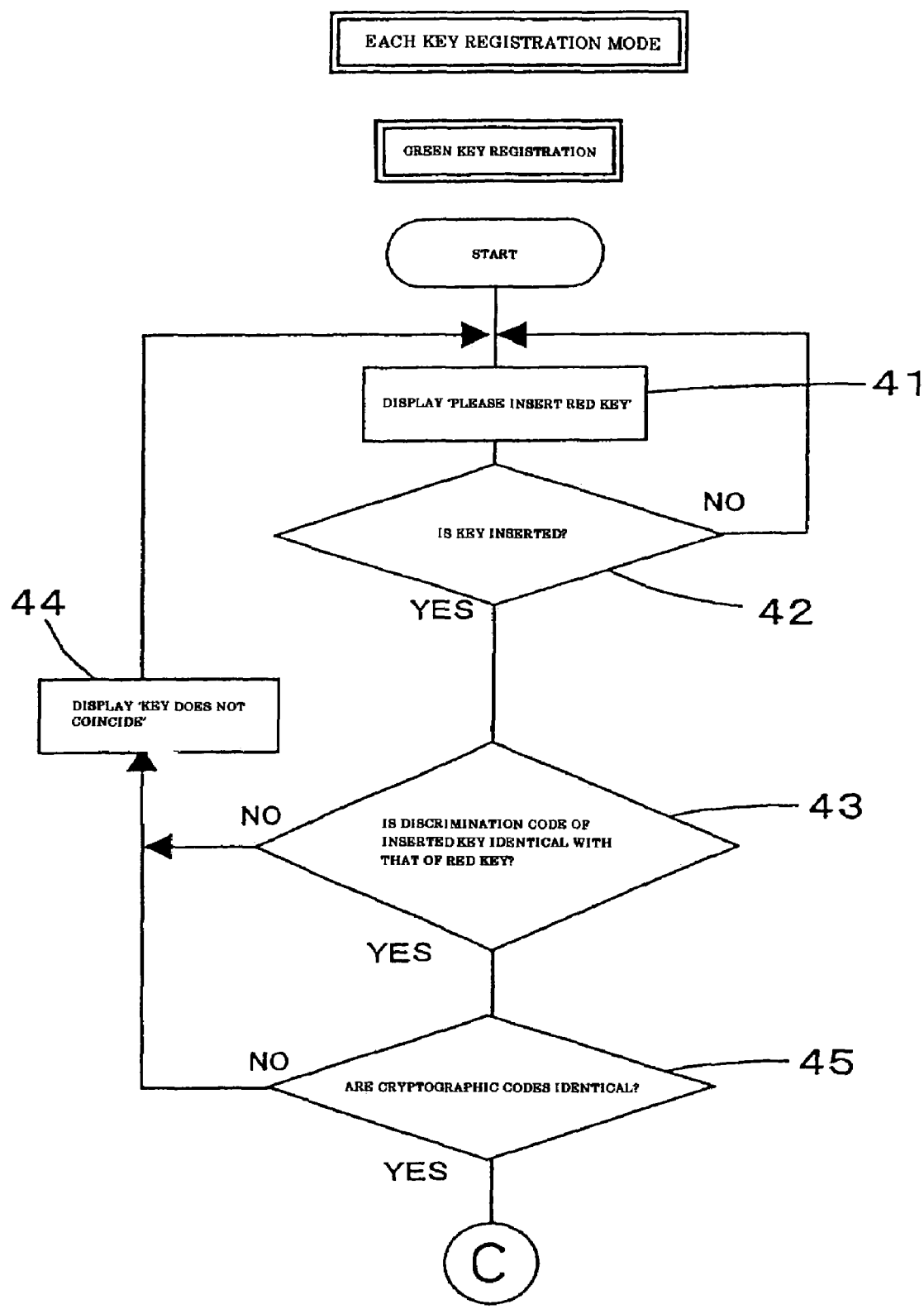
FIG. 16(a) is a flowchart showing a registration operation procedure of a second allowance key of the same embodiment.
FIG. 16(b) is a flowchart showing the registration operation procedure of the second allowance key of the same embodiment.
Figure 16:
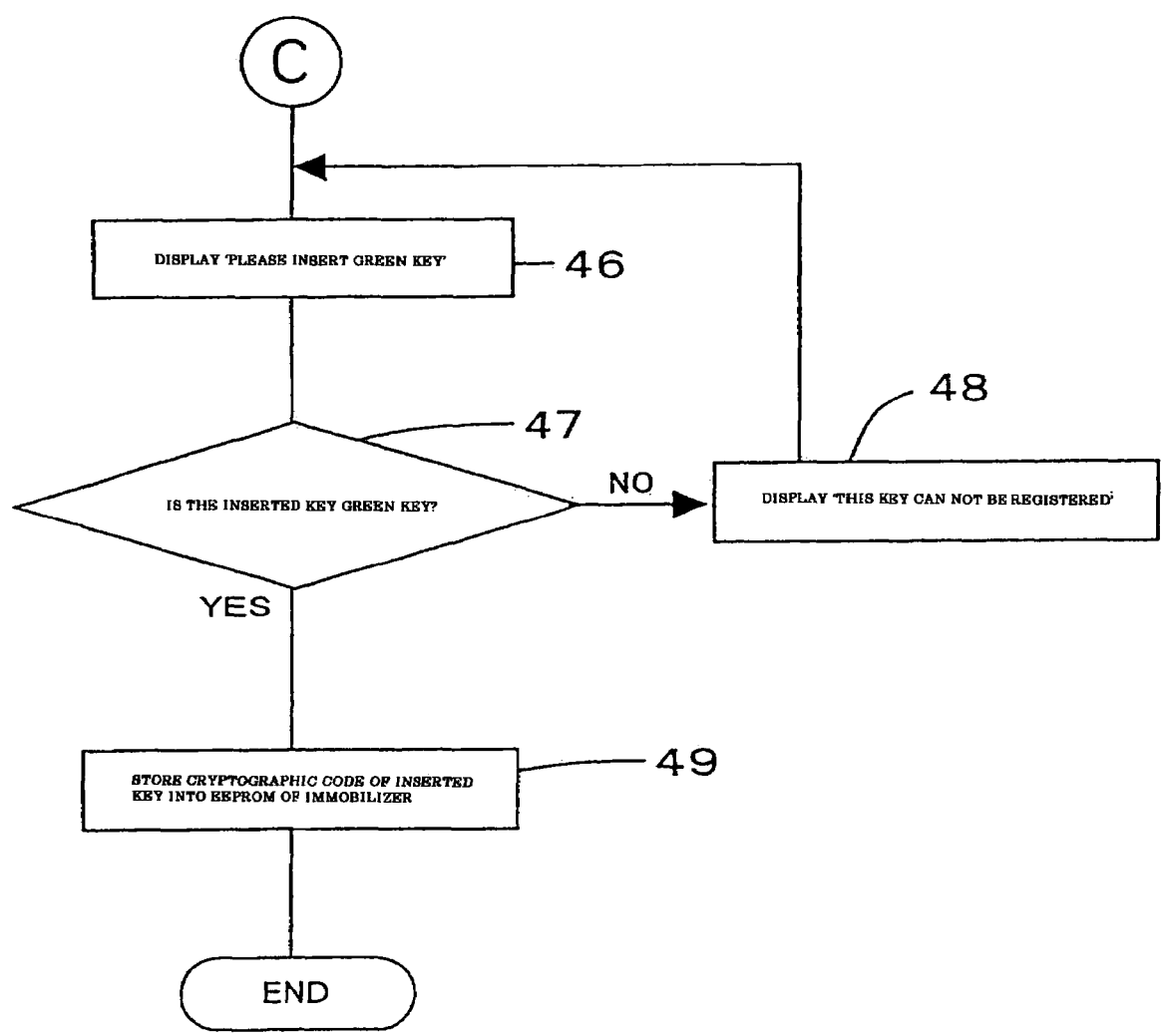

Next, the operation procedure of the control mode of "green key registration" in "each key registration mode" will be described with reference to flowcharts of FIG. 16(a) and FIG. 16(b).

In step 41 of the control mode of "green key registration" of "each key registration mode", the display part 29 displays "green key registration" of "each key registration mode" and 'Please insert red key', and the procedure advances to step 42.

In the step 42, it is judged whether or not the engine key 5 is inserted into the key cylinder 3. When it is judged that the engine key 5 is inserted, the procedure advances to step 43, and when it is judged that the engine key 5 is not inserted, the procedure returns to step 41.

Accordingly, when the control mode of "green key registration" starts, the display of "green key registration" of "each key registration mode" and 'Please insert red key' on the display part 29 continues until the engine key 5 is inserted into the key cylinder 3 to urge insertion of the red key 5C into the key cylinder 3.

In the step 43, it is judged whether or not the discrimination code of the engine key 5 inserted into the key cylinder 3 is identical with the discrimination code of the red key 5C. When it is identical with the discrimination code of the red key 5C, the procedure advances to step 45, and when it is not identical with the discrimination code of the red key 5C, the procedure advances to step 44 with displaying 'Key does not coincide' on the display part 29 for a predetermined period of time (several seconds), and the procedure returns to step 41.

In step 45, it is judged whether or not the cryptographic code of the engine key 5 inserted into the key cylinder 3 is identical with the cryptographic code recorded in the immobilizer control unit 17. When the cryptographic codes are identical, the procedure advances to step 46, and when the cryptographic codes are not identical, 'Key does not coincide' is displayed on the display part 29 in step 44, and the procedure returns to step 41.

Accordingly, when the engine key 5 other than the registered red key 5C is inserted into the key cylinder 3, after it is notified that the erroneous key different from the red key 5C has been inserted into the key cylinder 3 by displaying 'Key does not coincide' on the display part 29, the insertion of the red key 5C into the key cylinder 3 is urged again.

In the step 45, when the cryptographic codes are judged to be identical, the procedure advances to step 46, and in the step 46, 'Please insert green key' is displayed on the display part 29 (until a new key is inserted into the key cylinder 3) and the procedure advances to step 47.

In the step 47, it is judged whether or not the engine key 5 inserted into the key cylinder 3 can be registered. In this step, when the inserted engine key 5 is the master key or the slave key of the green key, that is, when the cryptographic code is recorded in the inserted engine key 5, and the discrimination code of the master key of the green key or the slave key of the green key is recorded in the memory area of the discrimination code of the engine key 5, the key is judged to be registrable, and the procedure advances to step 49. In the case where the discrimination code of the engine key 5 inserted into the key cylinder 3 is the discrimination code other than the discrimination code of the master key or the slave key of the green key, in the case where the discrimination code is not recorded, or in the case where the cryptographic code is not recorded, the key is judged to be unregistrable, and the procedure advances to step 48. In the step 48, 'This key can not be registered' is displayed on the display part 29, and the procedure returns to step 46.

Accordingly, in the case where the cryptographic code is recorded in the inserted engine key 5 and the discrimination code of the master key or the slave key of the green key is recorded in the memory area of the discrimination code of the engine key 5, the key can be registered as the green key 5D (master key or slave key), and the engine key 5 other than this can not be registered.

In the step 49, the cryptographic code of the engine key 5 inserted into the key cylinder 3 is written into the memory area, corresponding to the master key of the green key, in the EEPROM 24 of the immobilizer control unit 17, and at this time, the same cryptographic code is simultaneously written into the memory area, corresponding to the slave key of the green key, in the EEPROM 24, and the registration operation of the green key ends.

Accordingly, among the engine keys 5, with respect to the key in which the cryptographic code is recorded and the discrimination code of the master key or the slave key of the green key is recorded, the ID code of the engine key 5 corresponds to the ID code of the immobilizer control unit 17 so that the green key is registered to serve as the allowance key, and this master key of the green key 5D or slave key of the green key 5D can allow the rewriting or writing of the ID code.

Accordingly, for example, as shown in the left table of FIG. 17, in order to register the green key 5D, in the case where the memory areas of the cryptographic codes of the master key and the slave key of the green key of the EEPROM 24 of the immobilizer control unit 17 are blank, and the green key is not registered, the master key or the slave key of the green key in which the cryptographic code of [k] is recorded, as shown in the right table of FIG. 17, enables the cryptographic code of [k] to be recorded into the memory area corresponding to the master key of the green key and the memory area corresponding to the slave key of the green key of the EEPROM 24 of the immobilizer control unit 17, as shown in the left table of FIG. 18, whereby the green key 5D is registered, and the master key of the green key 5D or the slave key of the green key 5D can allow the rewriting or writing of the ID code similarly to the red key 5C.

Further, in the registration operation of the green key, differently from the registration operation of the blue key, since the registration of the cryptographic code is not rendered impossible, the registered green key 5D can also be registered as the green key 5D into the immobilizer control unit 17 of another work machine.

Incidentally, in the operation procedure of the control mode of "green key registration", when one of the master key of the green key 5D and the slave key of the green key 5D is registered, the cryptographic code of the green key 5D is written into the memory area, corresponding to the master key of the green key 5D, in the EEPROM 24 of the immobilizer control unit 17, and simultaneously, the identical cryptographic code is written into the memory area corresponding to the slave key of the green key 5D, so that both the master key of the green key 5D and the slave key of the green key 5D are registered. Alternatively, the memory area of the cryptographic code, corresponding to the master key of the yellow key 5B, in the EEPROM 24 may be made in common with the memory area of the cryptographic code corresponding to the slave key of the green key 5D, so that the registration operation of one of the master key of the green key 5D and the slave key of the green key 5D can register both of the master key of the green key 5D and the slave key of the green key 5D. Alternatively, the master key of the green key 5D and the slave key of the green key 5D may be separately registered.

Next, the operation procedure of the control mode of "yellow key copy" in "each key copy mode" will be described with reference to flowcharts of FIG. 19(*a*) and FIG. 19(*b*).

When the control mode of "yellow key copy" of "each key copy mode" starts, in step 61, the display part 29 displays "yellow key copy" of "each key copy" and 'Please insert yellow key', and the procedure advances to step 62.

In the step 62, it is judged whether or not the engine key 5 is inserted into the key cylinder 3. When it is judged that the engine key 5 is inserted, the procedure advances to step 63, and when it is judged that the engine key 5 is not inserted, the procedure returns to step 61.

Accordingly, when the control mode of "yellow key copy" starts, until the engine key 5 is inserted into the key cylinder 3, the display part 29 continues to display "yellow key copy" of "each key copy mode" and 'Please insert yellow key' to urge the insertion of the master key of the yellow key 5B into the key cylinder 3.

In the step 63, it is judged whether or not the master key of the yellow key 5B is inserted into the key cylinder 3, that is, whether or not the ID code (cryptographic code and discrimination code) of the engine key 5 inserted into the key cylinder 3 is identical with that of the master key of the yellow key 5B, and when it is judged that the master key of the yellow key 5B is inserted, the procedure advances to step 65. When it is judged that the master key of the yellow key 5B is not inserted, the procedure advances to step 64 with displaying 'Key does not coincide' on the display part 29 for a predetermined period of time (several seconds), and the procedure returns to step 61.

Accordingly, when the engine key 5 other than the master key of the yellow key 5B is inserted into the key cylinder 3, after it is notified that the erroneous key different from the master key of the yellow key 5B has been inserted into the key cylinder 3 by displaying 'Key does not coincide' on the display part 29, the insertion of the master key of the yellow key 5B into the key cylinder 3 is urged again.

When the procedure advances from step 63 to step 65, in the step 65, the cryptographic code of the master key of the yellow key 5B is written into the RAM 26 of the immobilizer control unit 17. In step 66, 'Please insert key for copy' is displayed on the display part 29 (until a new key is inserted into the key cylinder 3), and the procedure advances to step 67.

In the step 67, it is judged whether or not the inserted key is writable in this judgment, in the case where the discrimination code of the red key 5C, the discrimination code of the master key of the yellow key 5B, or the discrimination code of the master key of the green key 5D is not recorded in the memory area of the discrimination code of the inserted engine key 5, that is, where the memory areas of the cryptographic code and the discrimination code are blank (blank key), or the cryptographic code is recorded and the memory area of the discrimination code is blank, the key is judged to be registrable, and the procedure advances to step 69. In the case where the discrimination code of the red key 5C, the discrimination code of the master key of the yellow key 5B, or the discrimination code of the master key of the green key 5D is recorded as the discrimination code of the engine key 5 inserted into the key cylinder 3, the key is judged to be unregistrable, and the procedure advances to step 68. In the step 68, 'This key can not be used for copy' is displayed on the display part 29 for a predetermined period of time (several seconds), and the procedure returns to step 66. However, as to whether or not the inserted key is writable, with respect to the blue key 5A, the blue key 5A having been registered in the immobilizer control unit 17 is judged to be unwritable, while the unregistered blue key 5A is judged to be writable.

Accordingly, when the unrewritable or unwritable engine key 5 is inserted into the key cylinder 3, after it is notified that the unrewritable red key 5C, master key of the yellow key 5B, master key of the green key 5D or registered blue key 5A, has been erroneously inserted into the key cylinder 3 by displaying 'This key can not be used for copy' on the display part 29, the insertion of a key for copy into the key cylinder 3 is urged again.

In the step 67, when the inserted key is judged to be writable, the procedure advances to step 69, and in the step 69, the discrimination code of the slave key of the yellow key, and the cryptographic code identical with the cryptographic code of the master key of the yellow key 5B are written into the EEPROM 11 of the engine key 5 for copy, or data recorded in the EEPROM 11 of the engine key 5 for copy is rewritten to the discrimination code of the slave key of the yellow key and the cryptographic code identical with the cryptographic code of the master key of the yellow key 5B, whereby the ID code of the engine key 5 is rendered corresponding to the ID code of the immobilizer control unit 17 so that the engine key 5 serves as the slave key of the yellow key 5B. As a result, the master key of the yellow key 5B is copied into the engine key 5, and the slave key of the yellow key 5B is formed.

In step 70, it is judged whether or not a further copy of the yellow key is to be formed, and when it is judged that another copy of the yellow key is to be formed, the procedure returns to step 66, and the next copying procedure of the yellow key is performed. The judgment as to whether or not the copy of the next yellow key is to be formed is made according to, for example, whether or not the first switch 31 is operated to be ON within a predetermined period of time. When the first switch 31 is operated to be ON, it is judged that the copying procedure of the yellow key 5B is to be performed, and the procedure returns to step 66, and when the first switch 31 is not operated to be ON within the predetermined period of time, it is judged that the copying procedure of the yellow key is not to be performed, and the copy operation of the yellow key 5B ends. Accordingly, the copying procedure of the yellow key can be performed continuously with respect to plural engine keys 5.

Accordingly, in the case where data of the master key (origin of copy) of the yellow key 5B in which the cryptographic code of [f] and the discrimination code of [t] are recorded as shown in the upper left table of FIG. 20 is copied into the blank key (destination of copy) in which the cryptographic code and the discrimination code are not recorded as shown in the upper right table of FIG. 20, the cryptographic code of [f] and the discrimination code of [u] are recorded in the memory area of the EEPROM 11 of the engine key 5, as shown in the lower right table of FIG. 20. As a result, the slave key of the yellow key 5B is formed from the blank key, and the engine can be started by this key.

Further, for example, in the case where data of the master key (origin of copy) of the yellow key 5B in which the cryptographic code of [f] and the discrimination code of [t] are recorded as shown in the upper left table of FIG. 21 is copied into the engine key 5 (destination of copy) in which the cryptographic code of [1] is recorded and the discrimination code is not recorded as shown in the upper right table of FIG. 21, the cryptographic code is rewritten to [f] and recorded into the memory area of the cryptographic code of the EEPROM 11 of the engine key 5, and the discrimination code of [u] is written into the memory area of the discrimination code of the EEPROM 11 of the engine key 5 and is recorded, as shown in the lower right table of FIG. 21. As a result, the slave key of the yellow key 5B is formed from the engine key 5 in which the cryptographic code is recorded, and the engine can be started by this key.

Next, the operation procedure of the control mode of "green key copy" in "each key copy mode" will be described with reference to flowcharts of FIG. 22(a) and FIG. 22(b).

When the control mode of "green key copy" of "each key copy mode" starts, in step 81, the display part 29 displays "green key copy" of "each key copy mode" and 'Please insert green key', and the procedure advances to step 82.

In the step 82, it is judged whether or not the engine key 5 is inserted into the key cylinder 3. When it is judged that the engine key 5 is inserted, the procedure advances to step 83, and when it is judged that the engine key 5 is not inserted, the procedure returns to step 81.

Accordingly, when the control mode of "green key copy" starts, until the engine key 5 is inserted into the key cylinder 3, the display part 29 continues to display "green key copy" of "each key copy mode" and 'Please insert green key' to urge the insertion of the master key of the green key 5D into the key cylinder 3.

In the step 83, it is judged whether the master key of the green key 5D is inserted into the key cylinder 3, that is, whether or not the ID code (cryptographic code and discrimination code) of the engine key 5 inserted into the key cylinder 3 is identical with the master key of the green key 5D, and when it is judged that the master key of the green key 5D is inserted, the procedure advances to step 85. When it is judged that the master key of the green key 5D is not inserted, the procedure advances to step 84 with displaying 'Key does not coincide' on the display part 29 for a predetermined period of time (several seconds), and the procedure returns to step 81.

Accordingly, when the engine key 5 other than the master key of the green key 5D is inserted into the key cylinder 3, after it is notified that the erroneous key different from the master key of the green key 5D has been inserted into the key cylinder 3 by displaying 'Key does not coincide' on the display part 29, the insertion of the master key of the green key 5D into the key cylinder 3 is urged again.

When the procedure advances from step 83 to step 85, in the step 85, the cryptographic code of the master key of the green key 5D is written into the RAM 26 of the immobilizer control unit 17, and in step 86, 'Please insert key for copy' is displayed on the display part 29 (until a new key is inserted into the key cylinder 3), and the procedure advances to step 87.

In step 87, it is judged whether or not the inserted key is writable. In this judgment, in the case where the discrimination code of the red key 5C, the discrimination code of the master key of the yellow key 5B, or the discrimination code of the master key of the green key 5D is not recorded in the memory area of the discrimination code of the inserted engine key 5, that is, where the memory areas of the cryptographic code and the discrimination code are blank (blank key), or the cryptographic code is recorded and the memory area of the discrimination code is blank, the key is judged to be writable, and the procedure advances to step 89. In the case where the discrimination code of the red key 5C, the discrimination code of the master key of the yellow key 5B, or the discrimination code of the master key of the green key 5D is recorded as the discrimination code of the engine key 5 inserted into the key cylinder 3, the key is judged to be unwritable, and the procedure advances to step 88. In the step 88, 'This key can not be used for copy' is displayed on the display part 29 for a predetermined period of time (several seconds), and the procedure returns to step 86. However, as to whether or not the inserted key is writable, with respect to the blue key 5A, the blue key 5A having been registered in the immobilizer control unit 17 is judged to be unwritable, while the unregistered blue key 5A is judged to be writable.

Accordingly, when the unrewritable or unwritable engine key 5 is inserted into the key cylinder 3, after it is notified that the unrewritable red key 5C, master key of the yellow key 5B, master key of the green key 5D or registered blue key 5A has been erroneously inserted into the key cylinder 3 by displaying 'This key can not be used for copy' on the display part 29, the insertion of a key for copy into the key cylinder 3 is urged again.

In the step 87, when the inserted key is judged to be writable, the procedure advances to step 89. In the step 89, the discrimination code of the slave key of the green key 5D, and the cryptographic code identical with the cryptographic code of the master key of the green key 5D are written into the EEPROM 11 of the engine key 5 for copy, or data recorded in the EEPROM 11 of the engine key 5 for copy is rewritten to the discrimination code of the slave key of the green key 5D and the cryptographic code identical with the cryptographic code of the master key of the green key 5D, whereby the ID code of the engine key 5 is rendered corresponding to the ID code of the immobilizer control unit 17 so that the engine key 5 functions as the slave key of the green key 5D, and as a result, the master key of the green key 5D is copied into the engine key 5, and the slave key of the green key 5D is formed.

In step 90, it is judged whether or not a further copy of the green key is to be formed, and when it is judged that another copy of the green key is to be formed, the procedure returns to step 86, and the next copying procedure of the green key is performed. The judgment as to whether or not the copy of the green key is to be formed is made according to, for example, whether or not the first switch 31 is operated to be ON within a predetermined period of time. When the first switch 31 is operated to be ON, it is judged that the copying process of the green key is to be performed, and the procedure returns to step 66. When the first switch 31 is not operated to be ON within the predetermined period of time, it is judged that the copying procedure of the green key is not to be performed, and the copy operation of the green key is ends. Accordingly, the copying procedure of the green key can be performed continuously with respect to plural engine keys 5.

Figure 23:
FIG. 23 is a schematic view showing a recording state of a ROM and the like for explaining the copying operation procedure of the second allowance key of the same embodiment.

Accordingly, for example, in the case where the data of the master key (origin of copy) of the green key 5D in which the cryptographic code of [k] and the discrimination code of [w] are recorded as shown in the upper left table of FIG. 23 is copied into the blank key (destination of copy) in which the cryptographic code and the discrimination code are not recorded as shown in the upper right table of FIG. 23, the cryptographic code of [k] and the discrimination code of [x] are recorded into the EEPROM 11 of the engine key 5 as shown in the lower right table of FIG. 23. As a result, the slave key of the green key 5D is formed from the blank key, and the engine can be started by this key.

Further, for example, in the case where the data of the master key (origin of copy) of the green key 5D in which the cryptographic code of [k] and the discrimination code of [w] are recorded as shown in the upper left table of FIG. 24 is copied into the engine key 5 (destination of copy) in which the cryptographic code of [l] is recorded and the discrimination code is not recorded as shown in the upper right table of FIG. 24, the cryptographic code of [k] is rewritten and recorded into the memory area of the cryptographic code of the EEPROM 11 of the engine key 5, and the discrimination code of [x] is written and is recorded into the memory area of the discrimination code of the EEPROM 11 of the engine key 5 as shown in the lower right table of FIG. 24,. As a result, the slave key of the green key 5D is formed from the engine key 5 in which the cryptographic code is recorded, and the engine can be started by this key.

Figure 25:
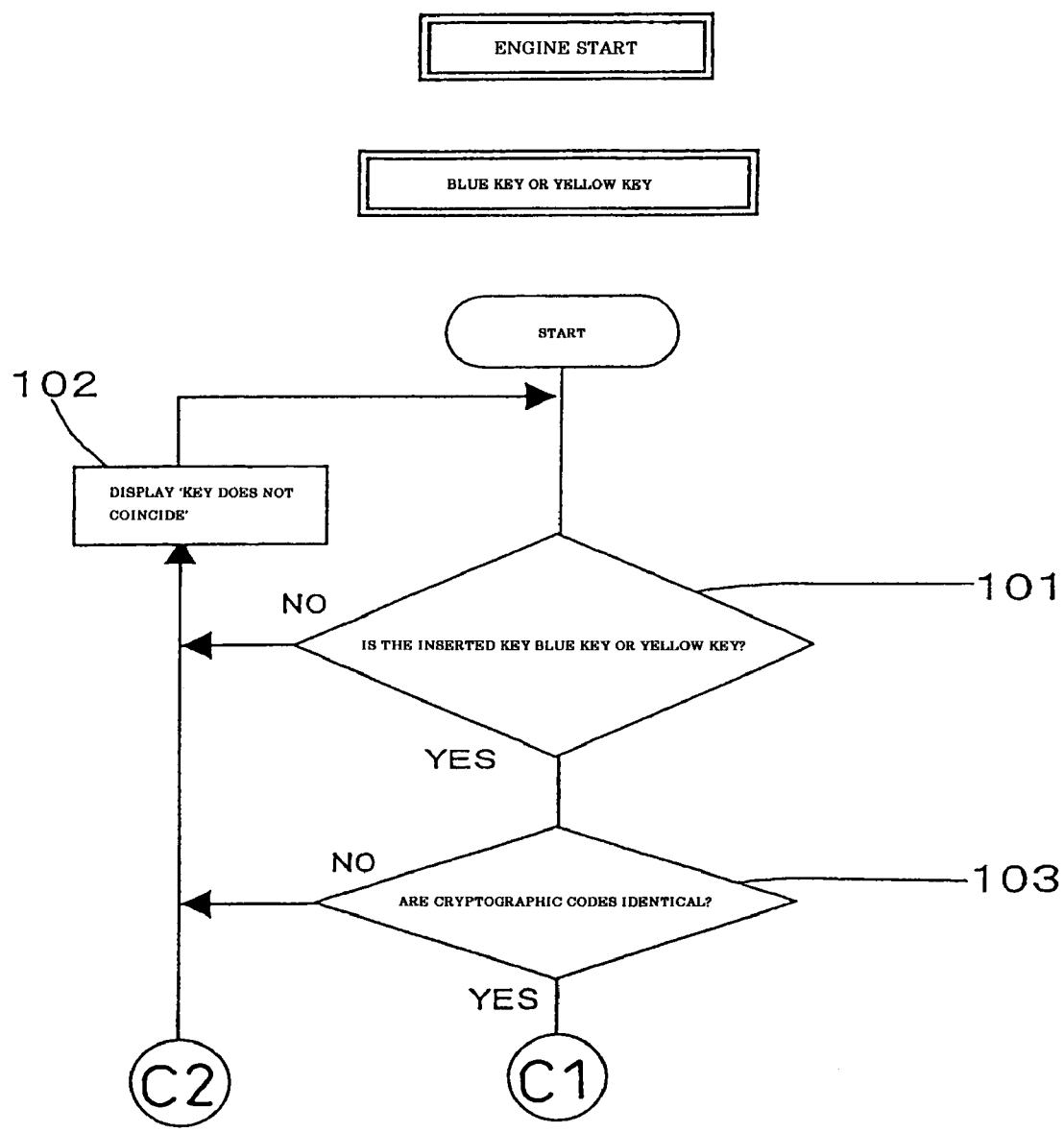
FIG. 25(a) is a flowchart showing a starting operation procedure of an engine of the same embodiment.
FIG. 25(b) is a flowchart showing the starting operation procedure of the engine of the same embodiment.
Figure 25B:
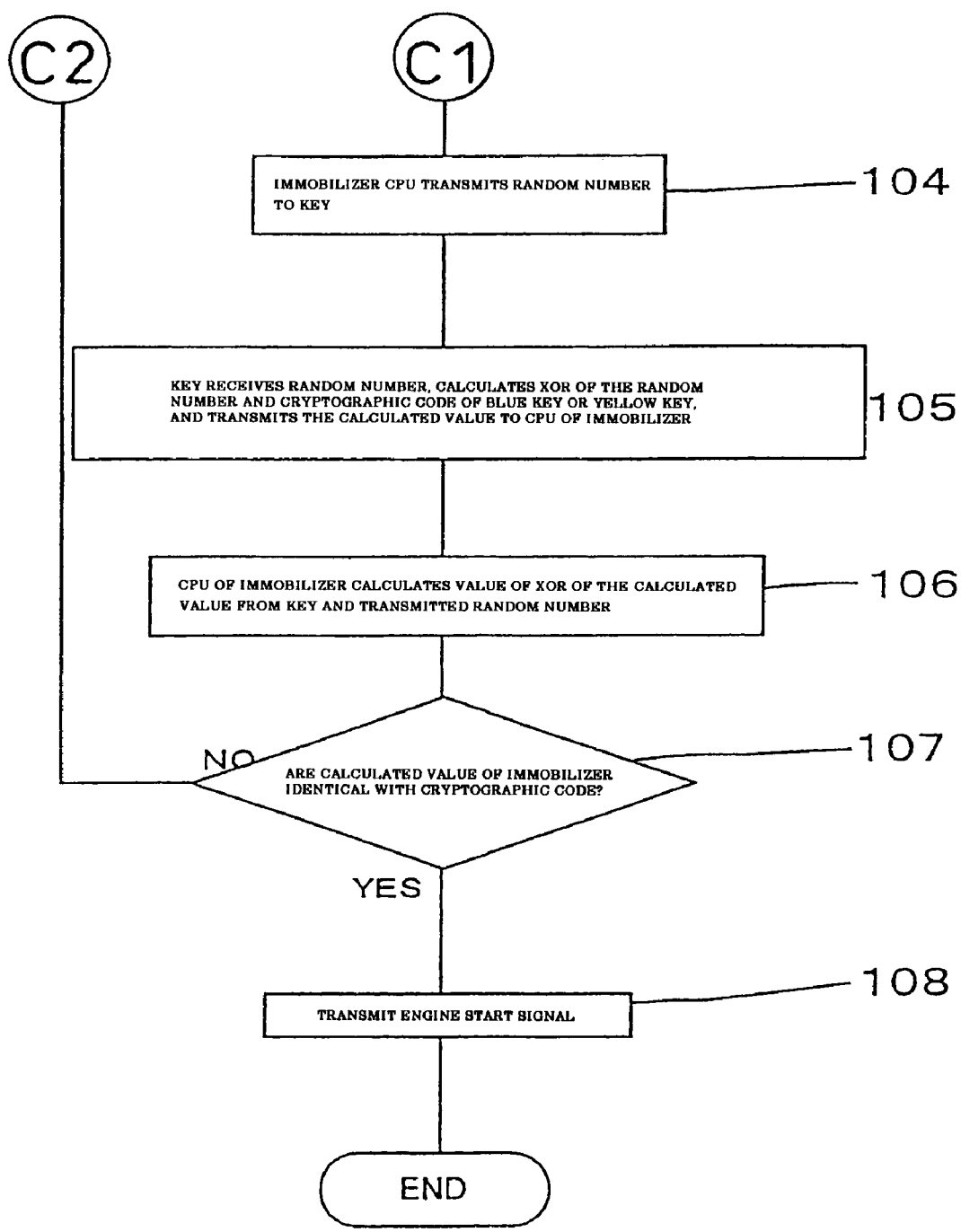

Next, the procedure of the starting operation of the engine the blue key 5A or the yellow key 5B (including both the master key and the slave key) will be described with reference to flowcharts of FIG. 25(a) and FIG. 25(b).

In step 101, it is judged whether or not the engine key 5 inserted into the key cylinder 3 is the blue key 5A or the yellow key 5B, that is, whether or not the discrimination code recorded in the engine key 5 is identical with the discrimination code of the blue key 5A or the yellow key 5B recorded in the ROM 25 of the immobilizer control unit 17. When it is judged that the blue key 5A or the yellow key 5B is inserted, the procedure advances to step 103, and when it is judged that the blue key 5A or the yellow key 5B is not inserted, the procedure advances to step 102. In the step 102, 'Key does not coincide' is displayed on the display part 29, and the procedure returns to step 101.

Accordingly, when the discrimination code of the engine key 5 inserted into the key cylinder 3 is not identical with the discrimination code of the blue key 5A or the yellow key 5B recorded in the immobilizer control unit 17, 'Key does not coincide' is displayed on the display part 29, and the starting of the engine is not allowed.

In the step 103, it is judged whether or not the cryptographic code of the engine key 5 inserted into the key cylinder 3 is identical with the cryptographic code of the immobilizer control unit 17, that is, whether or not the cryptographic code recorded in the EEPROM 11 of the engine key 5 is identical with the cryptographic code recorded in the memory area, corresponding to the discrimination code of the blue key 5A or the yellow key 5B, of the EEPROM 24 of the immobilizer control unit 17, and when they are identical, the procedure advances to step 104. When they are not identical, the procedure advances to step 102 with displaying 'Key does not coincide' on the display part 29, and the procedure returns to step 101.

Accordingly, when the cryptographic code of the engine key 5 inserted into the key cylinder 3 is not identical with the cryptographic code recorded in the immobilizer control unit 17, 'Key does not coincide' is displayed on the display part 29, and the starting of the engine is not allowed.

In step 104, a random number is transmitted to the inserted engine key 5 from the immobilizer control unit 17, and in step 105, the engine key 5 receives the random number, calculates the exclusive OR of the random number and the cryptographic code of the engine key 5, and transmits the calculated value to the immobilizer CPU 23 of the immobilizer control unit 17. For example, where the random number is 1234 (hexadecimal number) and the cryptographic code is 5678 (hexadecimal number), the exclusive OR thereof is 444C (hexadecimal number), and therefore, 444C is transmitted to the immobilizer CPU 23.

In step 106, the immobilizer CPU 23 calculates the exclusive OR of the calculated value (444C) from the engine key 5 and the transmitted random number (1234), and in step 107, it is judged whether or not the calculated value of the immobilizer CPU 23 of the immobilizer control unit 17 is identical with the cryptographic code. When they are identical, the procedure advances to step 108, and when they are not identical, the procedure returns to step 102. In the above example, since the calculated value is 444C (hexadecimal number) and the random number is 1234 (hexadecimal number), the calculated value of the exclusive OR thereof is 5678 (hexadecimal number).

In the step 108, the engine start signal S is outputted from the immobilizer control unit 17 to the engine control unit 19, thereby starting the engine. Accordingly, the ID code of the engine key 5 (the blue key 5A or the yellow key 5B) inserted into the key cylinder 3 is collated with the ID code recorded in the immobilizer control unit 17, and when the result of collation is affirmative, the starting of the engine by the engine key 5 (the blue key 5A or the yellow key 5B) is allowed. Since the calculation by the exclusive OR is interposed in this collation, it is possible to more certainly prevent an erroneous affirmative result of the collation due to a wrong operation and an erroneous start of the engine by an invalid key.

Figure 28:
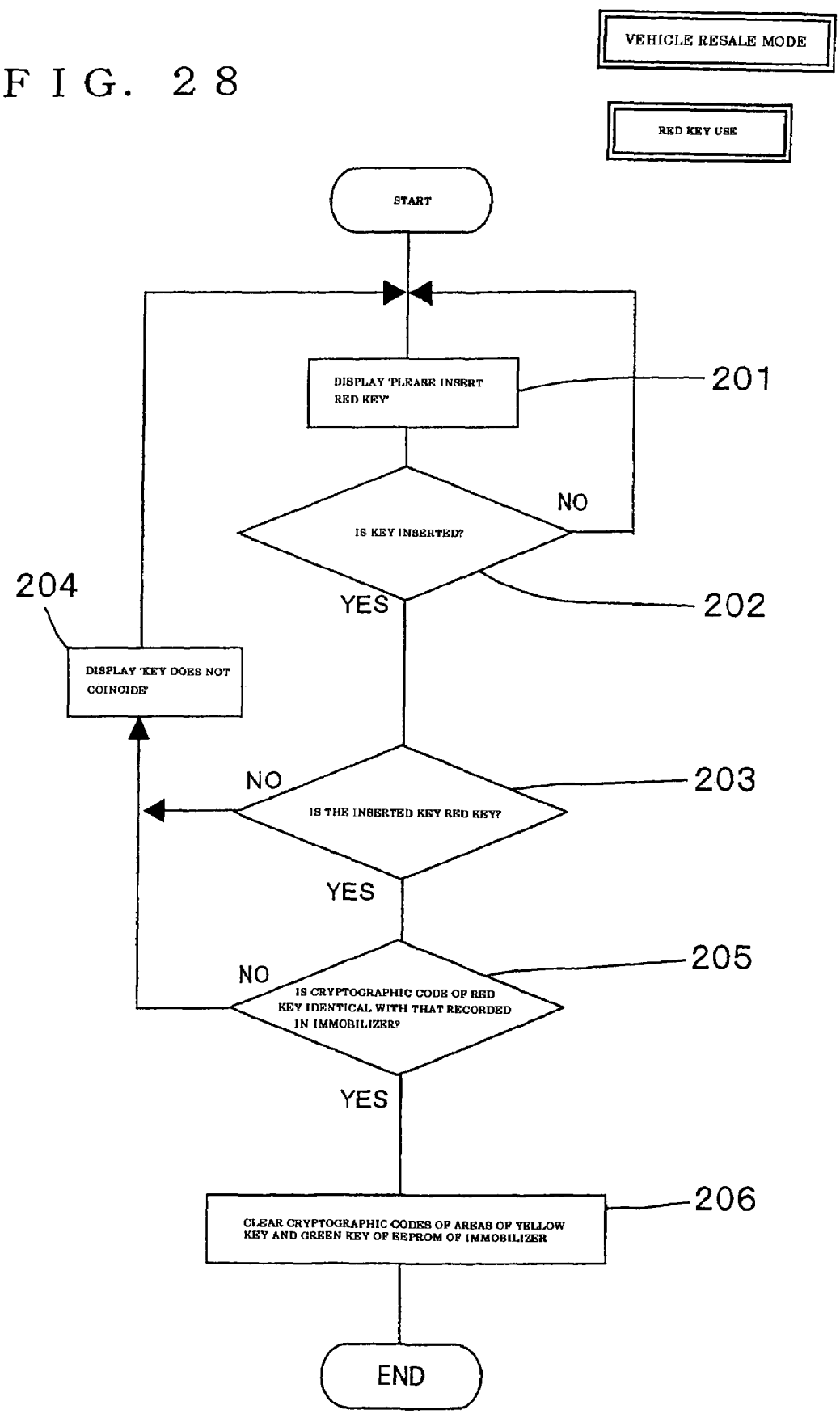
FIG. 28 is a flowchart showing an operation procedure of use of a red key in a vehicle resale mode of the same embodiment.

The operation procedure of the control mode of "red key use" in "vehicle resale mode" will be described with reference to a flowchart of FIG. 28.

When the control mode of "red key use" of "vehicle resale mode" starts, in step 201, the display part 29 displays "red key use" of "vehicle resale mode" and 'Please insert red key', and the procedure advances to step 202.

In the step 202, it is judged whether or not the engine key 5 is inserted into the key cylinder 3. When it is judged that the engine key 5 is inserted, the procedure advances to step 203, and when it is judged that the engine key 5 is not inserted, the procedure returns to step 201.

Accordingly, when the control mode of "red key use" of "vehicle resale mode" starts, until the engine key 5 is inserted into the key cylinder 3, the display part 29 continues to display "red key use" of "vehicle resale mode" and 'Please insert red key' to urge the insertion of the red key 5C into the key cylinder 3.

In the step 203, it is judged whether or not the discrimination code of the engine key 5 inserted into the key cylinder 3 is identical with the discrimination code of the red key 5C (judgment is made as to whether or not it is the red key 5C). When it is identical with the discrimination code of the red key 5C, the procedure advances to step 205, and when it is not identical with the discrimination code of the red key 5C, the procedure advances to step 204 with displaying 'Key does not coincide' on the display part 29 for a predetermined period of time (several seconds), and the procedure returns to step 201.

In the step 205, it is judged whether or not the cryptographic code of the engine key 5 (the red key 5C) inserted into the key cylinder 3 is identical with the cryptographic code corresponding to the red key 5C recorded in the immobilizer control unit 17. When the cryptographic codes are identical, the procedure advances to step 206, and when the cryptographic codes are not identical, the procedure returns to step 204 with displaying 'Key does not coincide' on the display part 29 and further returns to step 201.

Accordingly, when the engine key 5 other than the red key 5C is inserted into the key cylinder 3, after it is notified that the erroneous key different from the red key 5C has been inserted into the key cylinder 3 by displaying 'Key does not coincide' on the display part 29, the insertion of the red key 5C into the key cylinder 3 is urged again.

In the step 206, the memory area of the cryptographic code corresponding to the yellow key 5B recorded in the EEPROM 24 of the immobilizer control unit 17 is cleared, and the memory area of the cryptographic code corresponding to the green key 5D is cleared (deleted).

For example, in the case where the cryptographic code is recorded in the EEPROM 24 of the immobilizer control unit 17 as shown in FIG. 29, when this "vehicle resale mode" is executed, the ID code of the red key 5C is collated with the ID code corresponding to the red key recorded in the immobilizer control unit 17. When the result of the collation is affirmative (steps 203, 205), the memory areas ([f], [k]) of the cryptographic code of the yellow key 5B and the cryptographic code of the green key 5D recorded in the EEPROM 24 of the immobilizer control unit 17 are cleared, as shown in FIG. 30 (step 206). As a result, it is possible to prevent the engine from being started by the yellow key 5B which can start engines of plural work machines, and it is also possible to prevent the blue key 5A and the yellow key 5B from being registered by the green key 5D previously stored in the EEPROM 24 of the immobilizer control unit 17.

Figure 31:
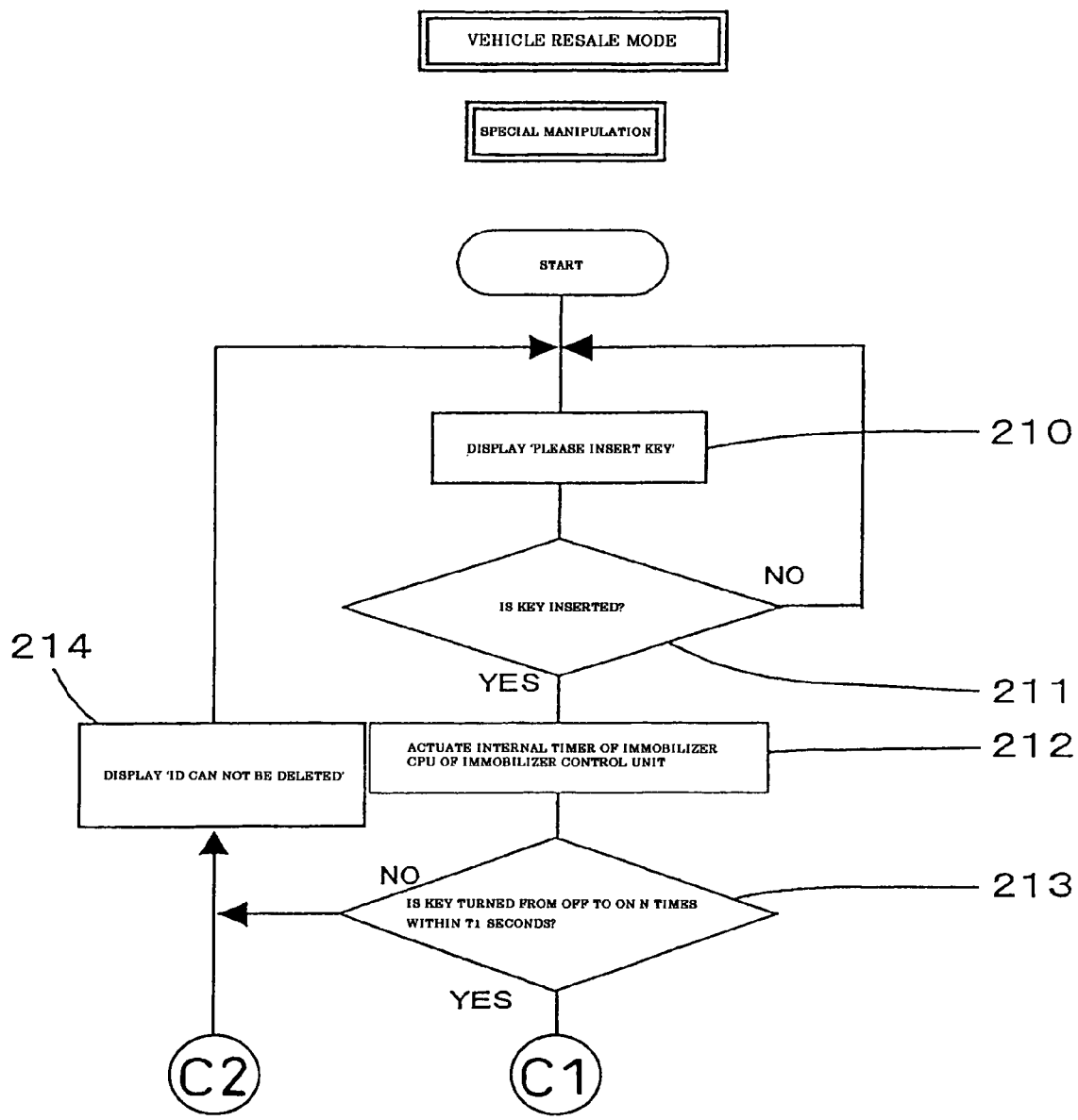
FIG. 31(a) is a flowchart showing a special manipulation operation procedure in the vehicle resale mode of the same embodiment.
FIG. 31(b) is a flowchart showing the special manipulation operation procedure in the vehicle resale mode of the same embodiment.
Figure 31:
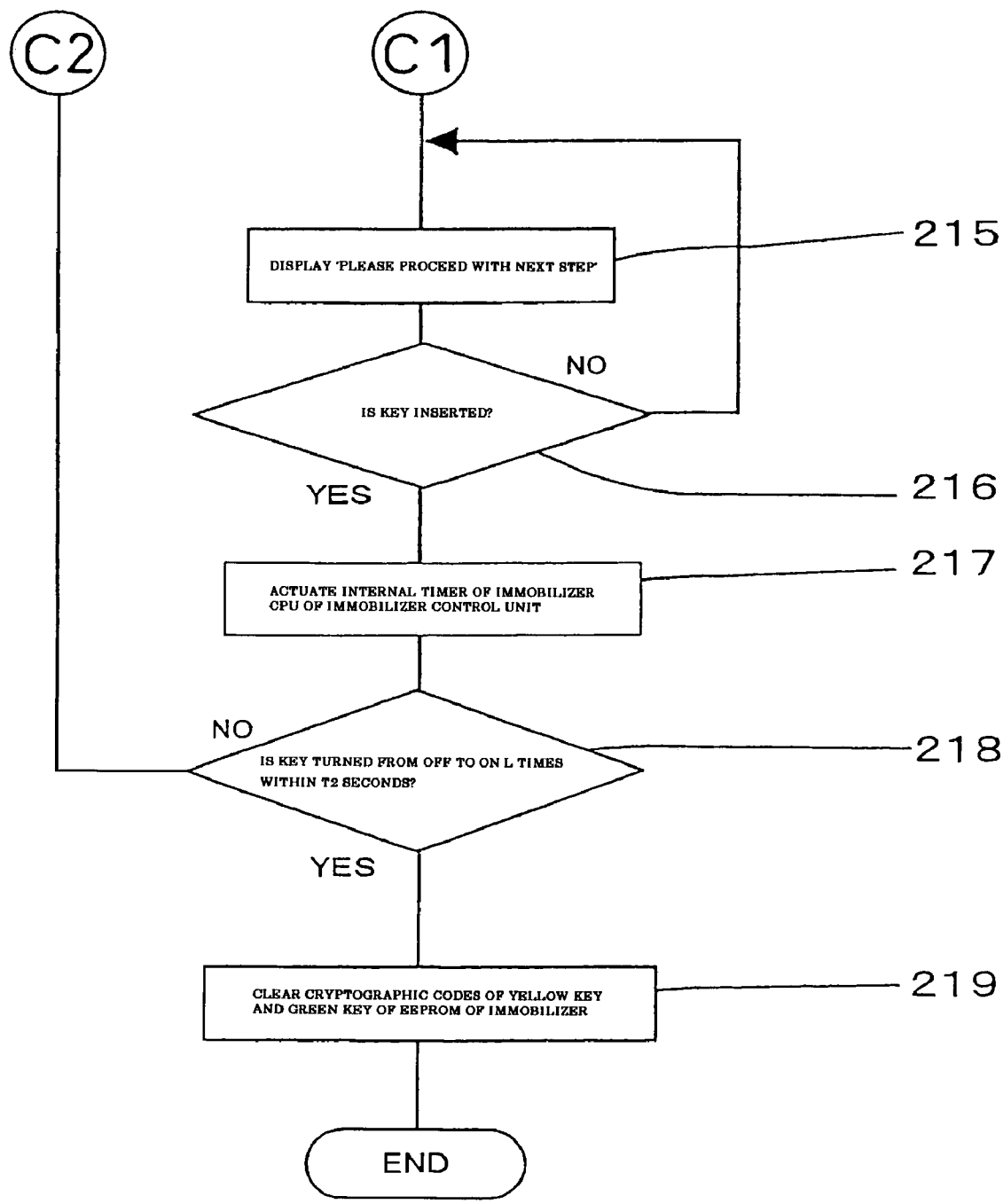

The operation procedure of the control mode of "special manipulation" in "vehicle resale mode" will be described with reference to flowcharts of FIG. 31(a) and FIG. 31(b).

When the control mode of "special manipulation" of "vehicle resale mode" starts, in step 210, the display part 29 displays "special manipulation" of "vehicle resale mode" and 'Please insert key', and the procedure advances to step 211.

In the step 211, it is judged whether or not the engine key 5 is inserted into the key cylinder 3. When it is judged that the engine key 5 is inserted, the procedure advances to step 212, and when it is judged that the engine key 5 is not inserted, the procedure returns to step 210.

Accordingly, when the control mode of "special manipulation" of "vehicle resale mode" starts, until the engine key 5 is inserted into the key cylinder 3, the display part 29 continues to display "special manipulation" of "vehicle resale mode" and 'Please insert key' to urge the insertion of the engine key 5 into the key cylinder 3 by the display part 29.

In the step 212, an internal timer incorporated in the immobilizer CPU 23 of the immobilizer control unit 17 is actuated.

In step 213, the immobilizer CPU 23 of the immobilizer control unit 17 counts, using the signal from the key cylinder 3, how many times the ignition switch 2 has been rotated from the OFF position to the ON position (number of times of ON-OFF rotation) by the engine key 5 after the internal timer of the immobilizer CPU 23 of the immobilizer control unit 17 was actuated (after the engine key 5 was inserted into the key cylinder 3), and it is judged whether or not the number of times of ON-OFF rotation of the ignition switch 2 in a predetermined period of time T1 after the internal timer of the immobilizer CPU 23 of the immobilizer control unit 17 was actuated is N times. When the number of times of ON-OFF rotation of the ignition switch 2 in the predetermined period of time T1 is N times, the internal timer of the immobilizer CPU 23 of the immobilizer control unit 17 is cleared, and the procedure advances to step 215, and otherwise, the number of times of rotation of the ignition switch 2 is judged to be an invalid number of times, and the procedure advances to step 214.

For example, assuming the predetermined period of time T1 to be 10 seconds and the number of times of ON-OFF rotation N to be ten times, in step 213, every turning motion of the ignition switch 2 from the OFF position to the ON position is counted as one, and when the number of times of ON-OFF rotation after the predetermined period of time of 10 seconds is ten times, the procedure advances to step 215. When the number of times of ON-OFF rotation after the predetermined period of time of 10 seconds is other than ten times (for example, seven or twelve times), the procedure advances to step 214.

In the step 215, 'Please proceed with the next step' is displayed on the display part.

In step 216, it is judged whether or not the engine key 5 is inserted into the key cylinder 3. When it is judged that the engine key 5 is inserted, the procedure advances to step 217, and when it is judged that the engine key 5 is not inserted, the procedure returns to step 215.

In the step 217, the internal timer incorporated in the immobilizer CPU 23 of the immobilizer control unit 17 is actuated.

In step 218, similarly to the above, the immobilizer CPU 23 of the immobilizer control unit 17 counts how many times the ignition switch 2 has been rotated by the engine key 5 from the OFF position to the ON position after the internal timer of the immobilizer CPU 23 of the immobilizer control unit 17 was actuated (after the engine key 5 was inserted into the key cylinder 3), and it is judged whether or not the number of times of ON-OFF rotation of the ignition switch 2 in a predetermined period of time T2 is L times. When the number of times of ON-OFF rotation of the ignition switch 2 in the predetermined period of time T2 is L times, the internal timer of the immobilizer CPU 23 of the immobilizer control unit 17 is cleared, and the procedure advances to step 219, and otherwise, the number of times is judged to be an invalid number of times, and the procedure advances to step 214. In the step 214, 'ID can not be deleted' is displayed on the display part 29 for a predetermined period of time, and the procedure returns to step 210.

In step 219, the memory area of the cryptographic code corresponding to the yellow key 5B recorded in the EEPROM 24 of the immobilizer control unit 17 is cleared, and the memory area of the cryptographic code corresponding to the green key 5D is cleared.

Accordingly, in the control mode of "special manipulation" of "vehicle resale mode", the cryptographic codes of the yellow key 5B and the green key 50 recorded in the immobilizer control unit 17 can be deleted by performing the special manipulation which is different from operations for starting engine (the ignition switch 2 is rotated from the OFF position to the ON position successively within a predetermined period of time) with the engine key 5 (key capable of rotating the ignition switch 2 from the OFF position to the ON position).

Since such a special manipulation is different from operations for starting engine, it is difficult that a person who intends to steal the machine carries out a similar operation, and hence, the antitheft function is not ruined.

Further, by providing two patterns of special manipulations such as the step 213 and step 218, the rotation operation of the engine key 5 is complicated, and the antitheft function is improved. Incidentally, by increasing the special manipulation as in the step 213 and step 218, the antitheft function can be improved.

Figure 32:
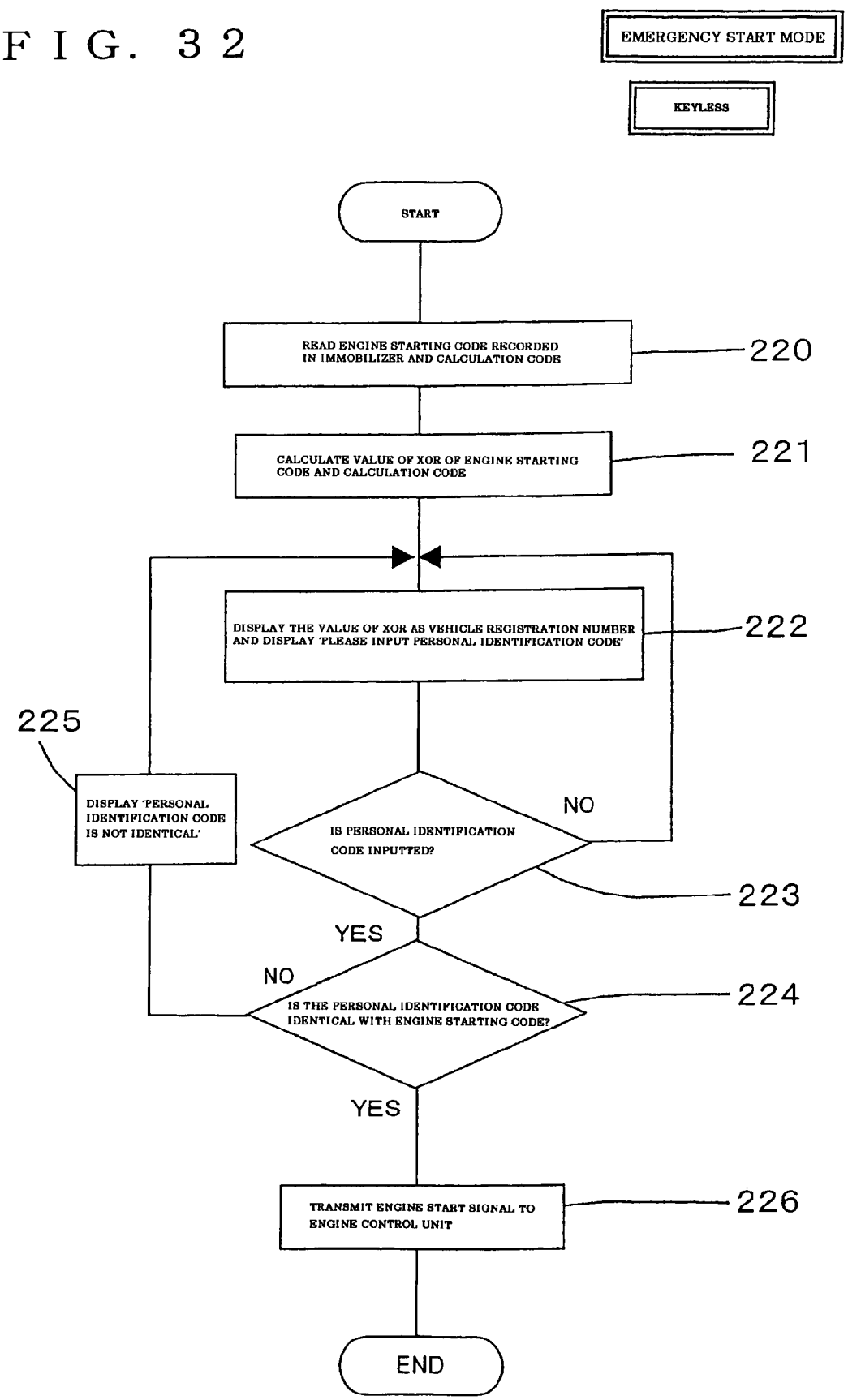
FIG. 32 is flowchart showing a keyless operation procedure in an emergency start mode of the same embodiment.

The operation procedure of the control mode of "keyless" in "emergency start mode" will be described with reference to a flowchart of FIG. 32.

When the control mode of "keyless" of "emergency start mode" starts, in step 220, the display part 29 displays "keyless" of "emergency start mode", and the immobilizer CPU 23 of the immobilizer control unit 17 reads an engine starting code recorded in the ROM 25 and a calculation code.

In step 221, the immobilizer CPU 23 of the immobilizer control unit 17 calculates the exclusive OR (XOR) of the engine starting code and the calculation code, and converts the engine starting code into a vehicle registration number.

In step 222, the vehicle registration number is displayed on the display part 29 (display means), and 'Please input personal identification code' is displayed on the display part 29, so that a code can be inputted by the input means, and the procedure advances to step 223.

In the step 223, it is judged whether or not the input of the code has been completed by the input means (the first switch 31, the second switch 32, and the third switch 33), that is, it is judged whether or not the third switch is pressed in the input state. When the input of the code is completed, the procedure advances to step 224, and otherwise, the procedure returns to step 222.

In the step 224, when the input code inputted by the input means is identical with the engine starting code, the procedure advances to step 226, and otherwise, the procedure advances to step 225.

In the step 225, 'Personal identification code is not identical' is displayed on the display part 29 for a predetermined period of time, and the procedure returns to step 222.

In the step 226, the immobilizer CPU 23 of the immobilizer control unit 17 outputs the engine start signal S to the engine control unit 19 (ECU).

Accordingly, when the engine starting code is identical with the input code, the engine starting is allowed, and when the engine starting code is not identical with the input code, the engine starting is not allowed. By knowing the engine starting code recorded in the immobilizer control unit 17, the engine can be started.

However, in the control mode of "keyless" of "emergency start mode", since the engine starting code is converted into the vehicle registration number by using the conversion function (step 220, step 221), the engine starting code can not be directly known, and instead thereof, the vehicle registration number (dummy engine starting code) can be known by the display means 29 (step 222).

When a method of calculating the engine starting code from the vehicle registration number, that is, the conversion function provided in the immobilizer control unit 17 is known, the engine starting code can be calculated from the vehicle registration number.

That is, as is understood from step 221, since the vehicle registration number is a calculated value of the exclusive OR of the engine starting code and the calculation code, when the exclusive OR of the vehicle registration number and the calculation code is calculated, the value of the engine starting code is restored.

For example, assuming the engine starting code recorded in the ROM 25 of the immobilizer control unit 17 to be 5678 (hexadecimal number) and the calculation code recorded in the ROM 25 of the immobilizer control unit 17 to be 1234 (hexadecimal number), the exclusive OR of the engine starting code and the calculation code, that is, the vehicle registration number is 444C (hexadecimal number). When the exclusive OR of the vehicle registration number 444C and the calculation code 1234 (hexadecimal number) is calculated, the value is 5678 (hexadecimal number), and this value is equal to the engine starting code 5678 (hexadecimal number).

However, since the engine starting code, the calculation code, the relation between the engine starting code and the vehicle registration number, and the like are previously recorded as a control program in the immobilizer control unit 17, in general, even if only the vehicle registration number is known, the relation to the engine starting code is not known, and the engine starting code can not be figured out from the vehicle registration number.

Accordingly, as described later, unless the user owning a work machine makes inquiries to the manufacturer of the work machine (antitheft device 1) which manages the vehicle registration number, to learn the engine starting code (personal identification code) from the manufacturer, or unless the user owning the work machine learns the method of figuring out the engine starting code from the vehicle registration number from the work machine manufacturer or the like, the engine starting code can not be found.

Next, the method of figuring out the engine starting code (personal identification code) from the vehicle registration number will be described.

Figure 26:
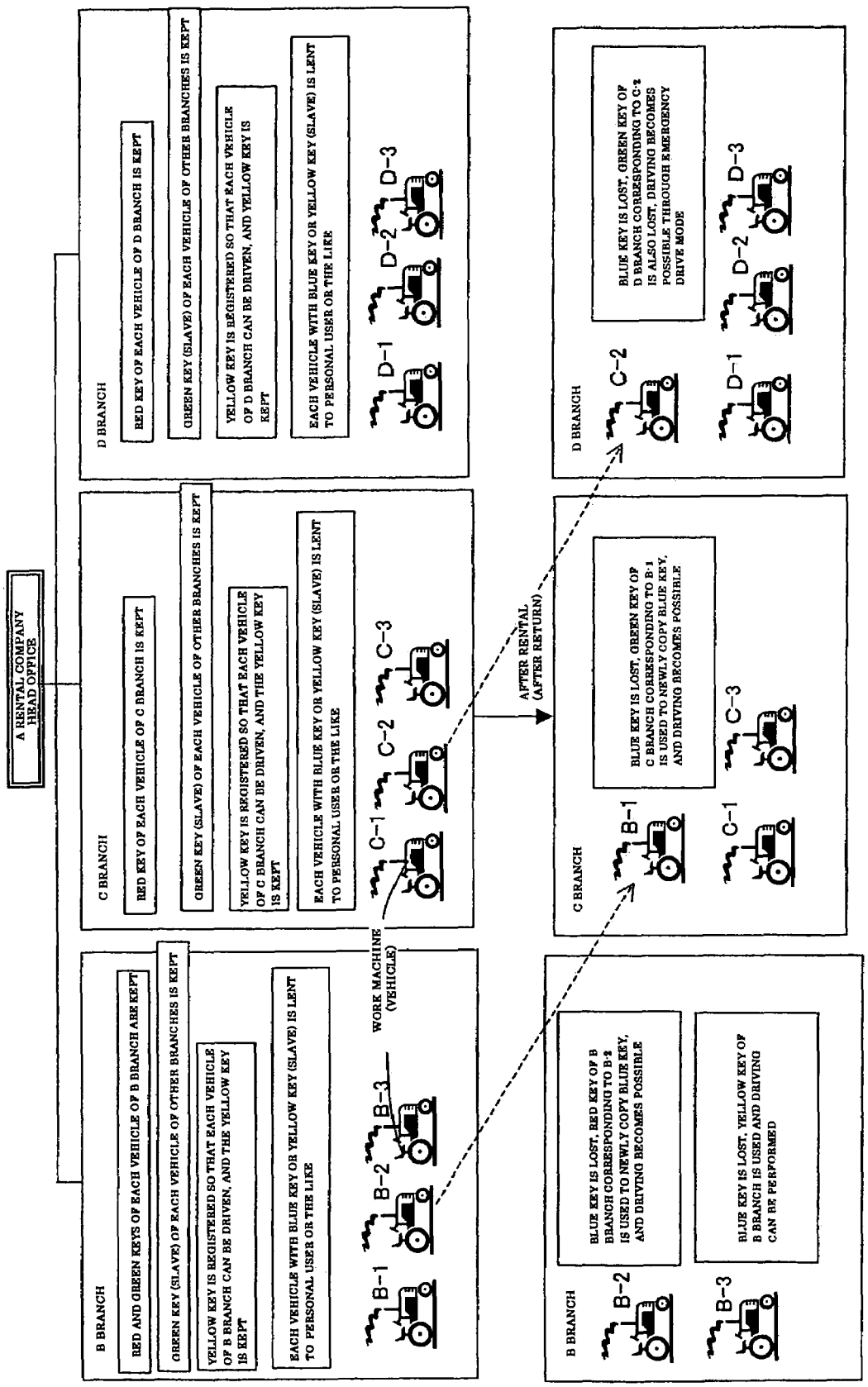
FIG. 26 is an explanatory view for explaining the operation procedure and effect of the same embodiment.

For example, work machines owned by a rental company or the like are, as shown in FIG. 26, stored in respective branches, and the vehicle registration number of each of the work machines in the respective branches is generally managed by a dealer (or manufacturer) which manufactures or sells the work machine (antitheft device 1).

Figure 34:
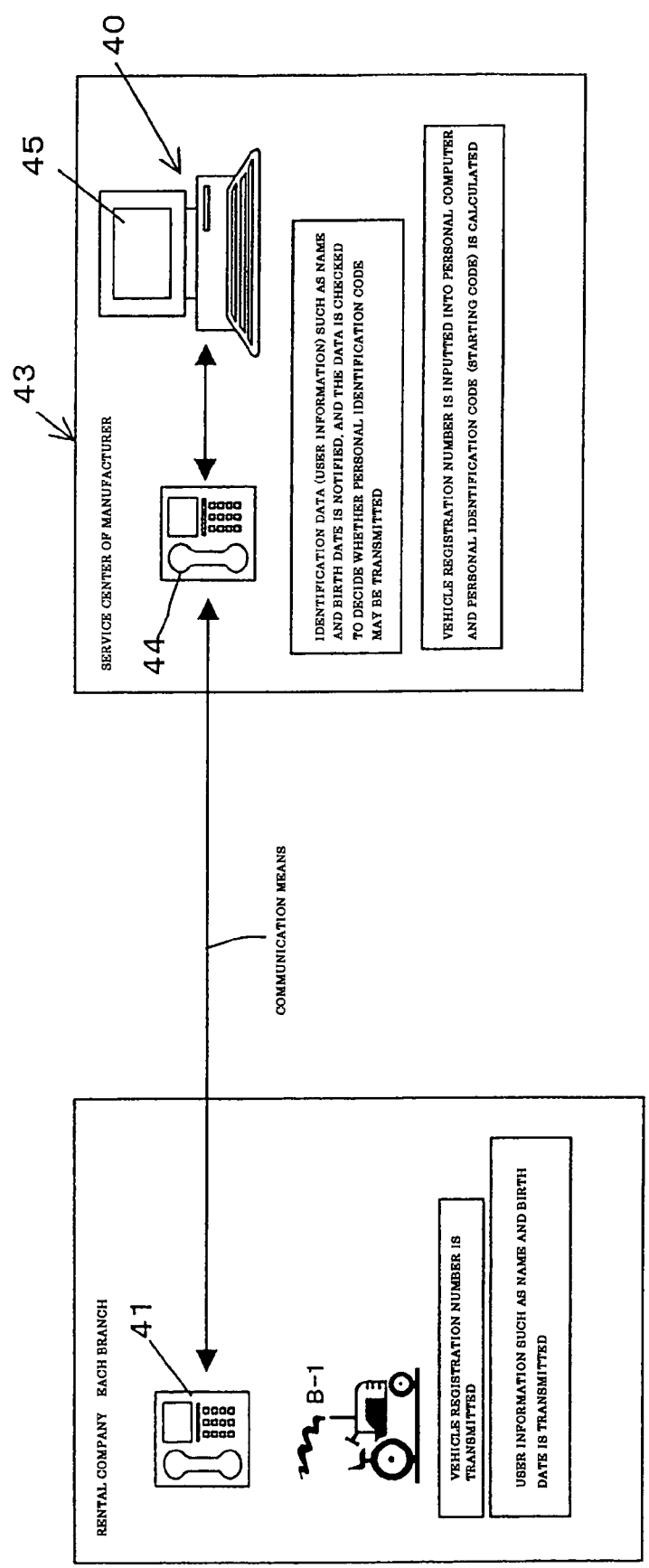
FIG. 34 is an explanatory view in which enquiries are made to a manufacturer about an engine starting code of the same embodiment.

As shown in FIG. 34, in the manufacturer, the vehicle registration numbers and the engine starting codes are recorded in a recording medium such as a personal computer 40 installed in the manufacturer, so that the engine starting code can be figured out from the vehicle registration number, and the vehicle registration numbers and the engine starting codes are managed not to be leaked from the manufacturer to outside.

When the vehicle registration number is known by the control mode of "keyless" of "emergency start mode", for example, a user using the work machines of the respective branches of the rental company uses a telephone 41 or the like (communication means) installed in each branch of the rental company to make a telephone call to a service center 43 of the manufacturer managing the vehicle registration numbers. The manufacturer receives the telephone communication from the user by a telephone 44 installed in the manufacturer, inputs the vehicle registration number transmitted from the user through the telephone line to the personal computer 40 or the like storing the vehicle registration numbers and the engine starting codes, and causes a display device 45 (monitor) of the personal computer 40 or the like to display user information of the work machine of the vehicle registration number.

At this time, the manufacturer managing the vehicle registration numbers collates information identifiying the user, such as the user's name, telephone number, and birth date, obtained from the user with the user information of the work machine of the vehicle registration number displayed on the monitor 45 of the personal computer 40 or the like. When the information obtained from the user having made a telephone call coincides with the user information displayed on the monitor 45, it is judged that the user having made the telephone call is valid.

Incidentally, when the manufacturer sells the work machine (antitheft device 1) to the rental company or the personal user (user), if the user information (information for identification, such as the user's telephone number, birth date and address, personal identification number stated to the manufacturer at the time of purchasing the work machine), which links the vehicle registration number of the sold work machine to the user, is previously registered in the personal computer 40 of the manufacturer, and the user information of the work machine is arranged to be displayed on the monitor 45 or the like by imputting the vehicle registration number, it is possible, as stated above, to judge whether or not the person having made the telephone call is a valid user by collating the user information of the vehicle registration number with the information obtained through the telephone.

When it is judged that the user is valid, the engine starting code is calculated from the vehicle registration number by the personal computer 40 of the manufacturer, and the manufacturer transmits the calculated engine starting code as the personal identification code to the user through the telephone 45 and the telephone line.

Figure 35:
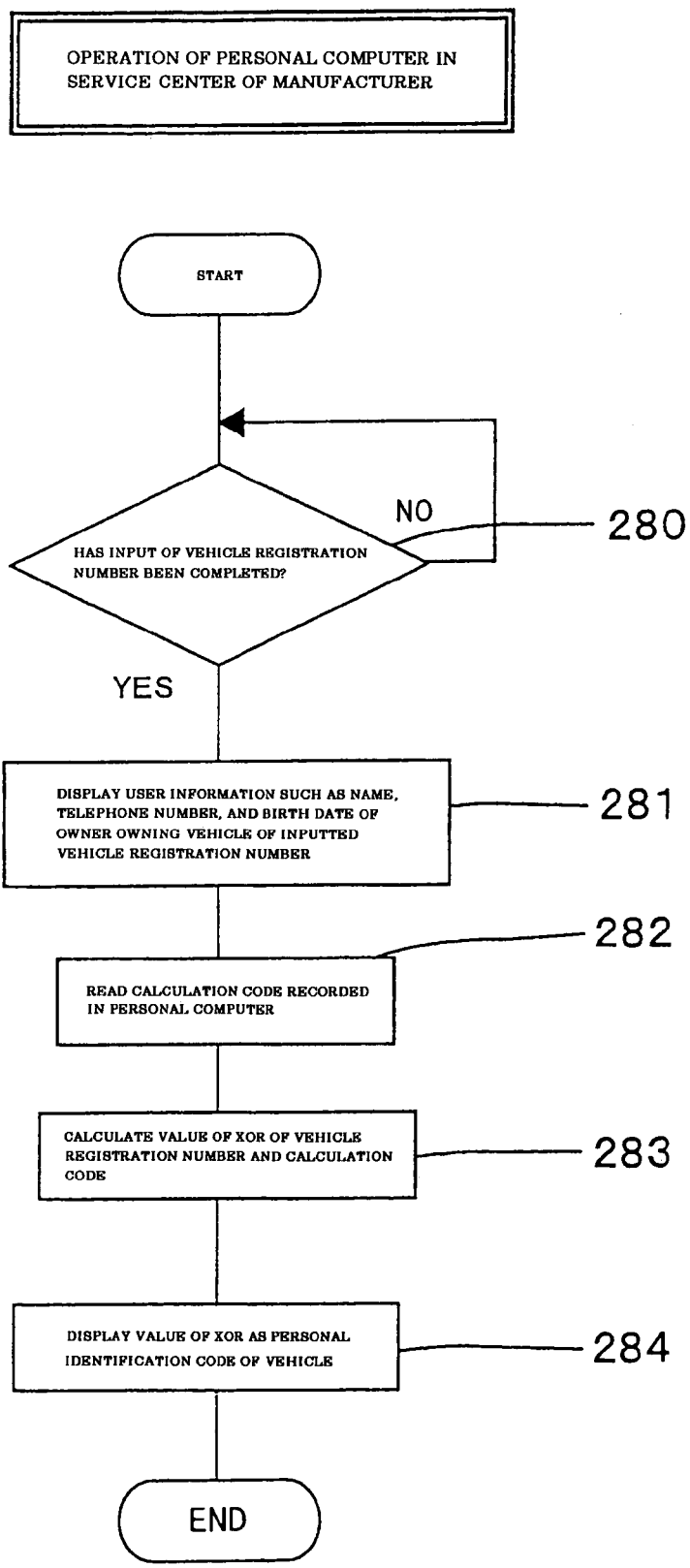
FIG. 35 is a flowchart showing an operation of a personal computer of a service center of the manufacturer of the same embodiment.

The procedure of above operation of the personal computer 40 of the manufacturer managing the vehicle registration numbers flows as follows as shown in FIG. 35.

In step 280, it is judged whether or not the input of the vehicle registration number is completed. When the input is completed, the procedure advances to step 281.

In the step 281., the user information, such as name, telephone number, birth date of user owning the work machine of the vehicle registration number, and personal identification number stated to the manufacturer or the like at the time of purchasing the work machine, is displayed.

In step 282, the calculation code recorded in the recording medium of the personal computer 40 is read. This calculation code is identical with the calculation code recorded in the immobilizer control unit 17 of the work machine of the vehicle registration number.

In step 283, the exclusive OR (XOR) of the vehicle registration number and the calculation code recorded in the recording medium of the personal computer 40 is calculated.

In step 284, the calculated value figured out in step 283 is displayed as the personal identification code.

Accordingly, since the calculation code and the calculation method recorded in the personal computer 40 or the like of the manufacturer managing the vehicle registration numbers are identical with the calculation code and the calculation method recorded in the work machine (antitheft device 1) displaying the vehicle registration number, the engine starting code can be figured out from the vehicle registration number.

For example, assuming the engine starting code recorded in the immobilizer control unit 17 to be 5678 (hexadecimal number) and the calculation code recorded in the immobilizer control unit 17 and the personal computer 40 of the manufacturer to be 1234 (hexadecimal number), the vehicle registration number displayed on the work machine is 444C (hexadecimal number). When this vehicle registration number is inputted to the personal computer 40 of the manufacturer, the personal identification code displayed on the monitor of the manufacturer is 5678 (hexadecimal number), whereby the engine starting code 5678 can be figured out from the vehicle registration number 444C.

Accordingly, unless the procedure as stated above is performed, the engine starting code can not be known. Further, it is generally known to only the user owning the work machine, the manufacturer and the like that the personal identification code can be figured our by transmitting the vehicle registration number to the manufacturer. Accordingly, for example, even if a person who intends to steal the machine can know the vehicle registration number, it is difficult to know that the personal identification code must be figured out by performing the procedure as stated above.

Even if the person trying to steal the machine can know that the personal identification code can be figured out by transmitting the vehicle registration number to the manufacturer, since the manufacturer judges whether or not the person is a valid user by the user information, it is difficult that the person trying to steal the machine obtains the personal identification code from the vehicle registration number by making a telephone call to the manufacturer.

Incidentally, in the above embodiment, the engine starting code is figured out from the conversion code (vehicle registration number) by the transmission of the vehicle registration number from the user to the manufacturer and the calculation of the vehicle registration number by the personal computer 40 of the manufacturer. Alternatively, the manufacturer may prepare a table of the engine starting code and the vehicle registration number, which shows the correspondence between the vehicle registration number and the engine starting code for figuring out the engine start code from the vehicle registration number, and provide the rental company or personal user with the table, so that the rental company or personal user can figure out the engine starting code from the table only when the engine is started by the engine starting code, and manage to make it secret that the table indicates the engine starting code when the table is not used. Alternatively, the manufacturer may prepare a device which can display the engine starting code when the vehicle registration number is inputted, and provide the rental company or personal user with the device, so that the rental company or personal user can figure out the engine starting code by the device only when the engine is started by the engine starting code, and manage to make it secret that this device displays the engine starting code when the device is not used.

With this procedure, the engine starting code can be figured out from the vehicle registration number without the inquiries to the manufacturer. It is preferable that the table of the vehicle registration numbers and the engine starting codes or the device, which can display the engine starting code when the vehicle registration number is inputted, is kept in the safe of the rental company or personal user, so that the engine starting code is strictly protected from being known easily.

Incidentally, although the engine starting code is converted into another code and the code is displayed as the vehicle registration number, this converted code may be any code as long as it can specify the work machine. That is, the engine starting code may be converted into another code which may be displayed as the user registration number or any other code numbers.

Figure 33:
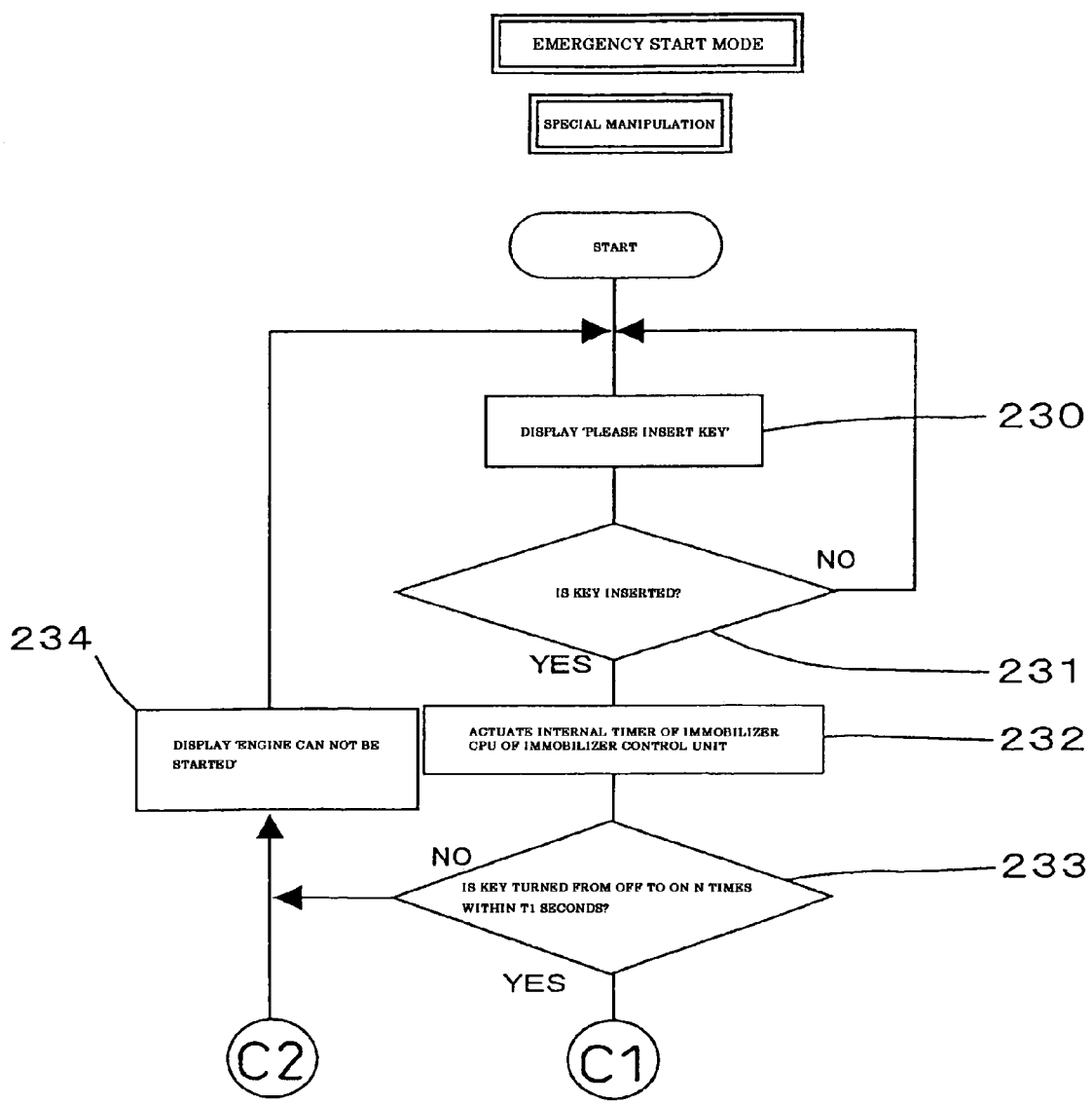
FIG. 33(a) is a flowchart showing a special manipulation operation procedure in the emergency start mode of the same embodiment.
FIG. 33(b) is a flowchart showing the special manipulation operation procedure in the emergency start mode of the same embodiment.
Figure 33:
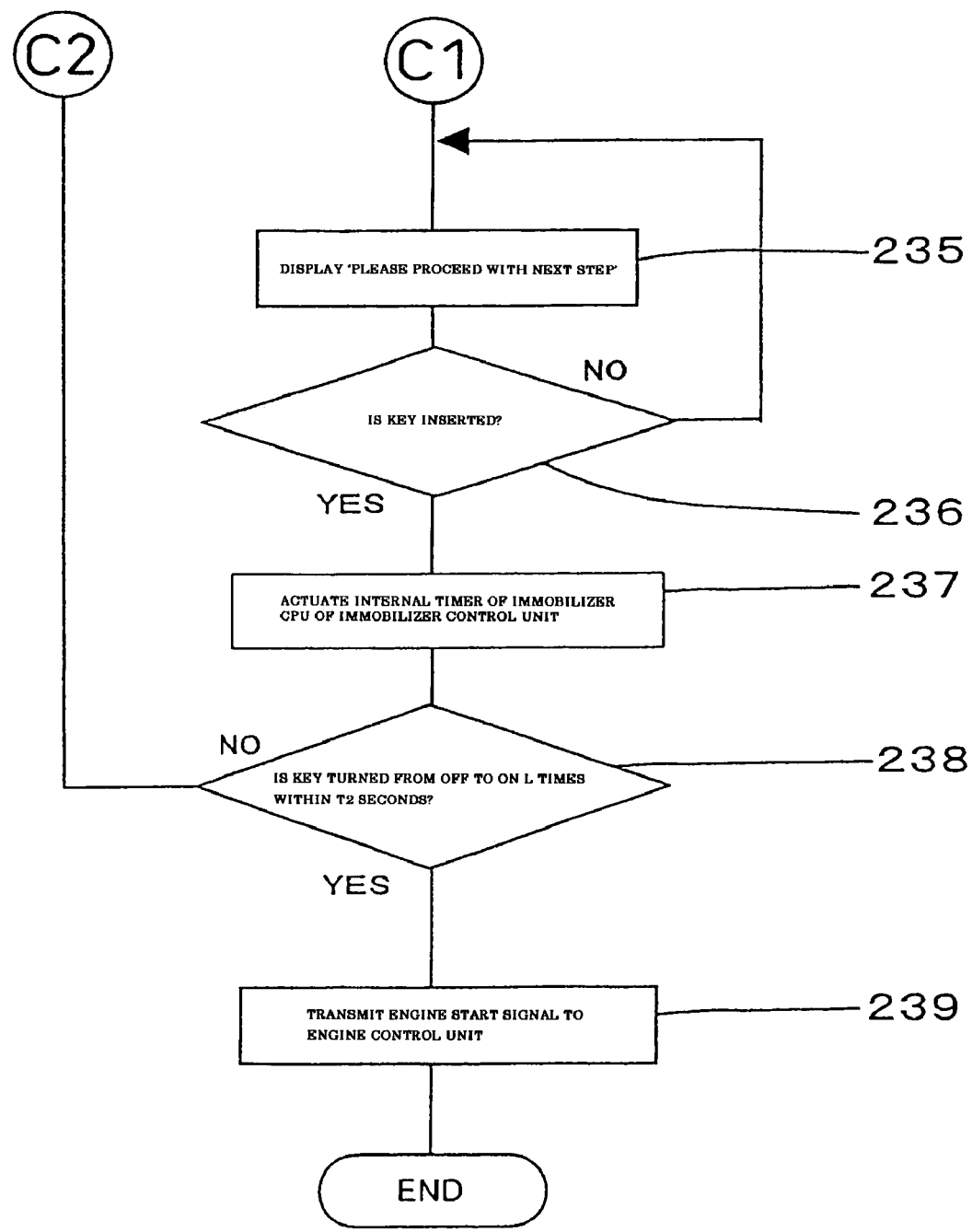

The operation procedure of the control mode of "special manipulation" of "emergency start mode" will be described with reference to FIG. 33(a) and FIG. 33(b).

The operation procedure of the control mode of "special manipulation" of "emergency start mode" will be described with reference to flowcharts of FIG. 33(a) and FIG. 33(b).

When the control mode of "special manipulation" of "emergency start mode" starts, in step 230, the display part 29 displays "special manipulation" of "emergency start mode" and 'Please insert key', and the procedure advances to step 231.

In the step 231, it is judged whether or not the engine key 5 is inserted into the key cylinder 3. When it is judged that the engine key 5 is inserted, the procedure advances to step 232, and when it is judged that the engine key 5 is not inserted, the procedure returns to step 230.

Accordingly, when the control mode of "special manipulation" of "emergency start mode" starts, until the engine key 5 is inserted into the key cylinder 3, the display part 29 continues to display "special manipulation" of "emergency start mode" and 'Please insert key' to urge the insertion of the engine key 5 into the key cylinder 3.

In the step 232, the internal timer incorporated in the immobilizer CPU 23 of the immobilizer control unit 17 is actuated.

In step 233, the immobilizer CPU 23 of the immobilizer control unit 17 counts, using the signal from the key cylinder 3, how many times the ignition switch 2 has been rotated from the OFF position to the ON position (the number of times of ON-OFF rotation) by the engine key 5 after the internal timer of the immobilizer CPU 23 of the immobilizer control unit 17 was actuated (after the engine key 5 was inserted into the key cylinder 3), and it is judged whether or not the number of times of ON-OFF rotation of the ignition switch in a predetermined period of time T1 after the internal timer of the immobilizer CPU 23 of the immobilizer control unit 17 was actuated is N times. When the number of times of ON-OFF rotation of the ignition switch 2 in the predetermined period of time T1 is N times, the internal timer of the immobilizer CPU 23 of the immobilizer control unit 17 is cleared, and the procedure advances to next step 235, and otherwise, the number of times of rotation of the ignition switch 2 is judges to be an invalid number of times, and the procedure advances to step 234.

For example, assuming the predetermined time T1 to be made 10 seconds and the number of times of ON-OFF rotation to be ten times, in the step 233, every turning motion of the ignition switch 2 from the OFF position to the ON position is counted as one, and when the number of times of ON-OFF rotation in the predetermined period of time of ten seconds is ten times, the procedure advances to step 235, and when the number of times of ON-OFF rotation in the predetermined period of time of ten seconds is other than ten times (for example, seven or twelve times), the procedure advances to step 234.

In the step 235, 'Please proceed with next step' is displayed on the display part, and the procedure advances to step 236.

In the step 236, it is judged whether or not the engine key 5 is inserted into the key cylinder 3. When it is judged that the engine key 5 is inserted, the procedure advances to step 237. When it is judged that the engine key 5 is not inserted, the procedure returns to step 235.

In the step 237, the internal timer incorporated in the immobilizer CPU 23 of the immobilizer control unit 17 is actuated.

In step 238, similarly to the above, the immobilizer CPU 23 of the immobilizer control unit 17 counts how many times the ignition switch 2 has been rotated by the engine key 5 from the OFF position to the ON position after the internal timer of the immobilizer CPU 23 of the immobilizer control unit 17 was actuated (after the engine key 5 was inserted into the key cylinder 3), and it is judged whether or not the number of times of ON-OFF rotation of the ignition switch 2 in a predetermined period of time T2 is L times. When the number of times of ON-OFF rotation of the ignition switch 2 in the predetermined period of time T2 is L times, the internal timer of the immobilizer CPU 23 of the immobilizer control unit 17 is cleared, and the procedure advances to step 239, and otherwise, the number of times is judged to be an invalid number of times, and the procedure advances to step 234. In the step 234, 'Engine can not be started' is displayed on the display part 29 for a predetermined period of time, and the procedure returns to step 230.

In the step 239, the immobilizer CPU 23 of the immobilizer control unit 17 outputs the engine start signal S to the engine control unit 19.

Accordingly, in the control mode of "special manipulation" of "emergency start mode", the engine can be started by performing the special manipulation which is different from operations for starting engine (the ignition switch 2 is successively rotated from the OFF position to the ON position within the predetermined period of time) with the engine key 5 (key capable of rotating the ignition switch 2 from the OFF position to the ON position).

The number of times N, L of ON-OFF rotation of the engine key 5 within the predetermined period of time is recorded in the immobilizer CPU 23 of the immobilizer control unit 17, and the predetermined period of time T1, T2 is also recorded in the immobilizer CPU 23 of the immobilizer control unit 17. Thus, in general, the number of times N, L of ON-OFF rotation, and the predetermined period of time T1, T2 are not known to even the user owning the work machine, and unless the user owning the work machine makes inquiries to the manufacturer to learn the number of times N, L of ON-OFF rotation and the predetermined period of time T1, T2, or unless the user previously leans the special manipulation method or the like from the manufacturer at the time of purchasing the work machine or the like, the engine starting can not be performed.

For example, in the case where the user does not know the number of times N, L of ON-OFF rotation and the predetermined period of time T1, T2, similarly to the case where inquiries are made about the engine starting key, the user of the work machine makes a telephone call to the manufacturer, notifies the user information (name, telephone number, birth date of the user owning the work machine, personal identification number stated to the manufacturer at the time of purchasing the work machine, and the like) to the manufacturer to prove that the user is a correct user, and learns the special manipulation method for the work machine from the manufacturer, so that the user is informed of the number of times N, L of ON-OFF rotation and the predetermined period of time T1, T2, thereby allowing only the valid user to start the engine.

Further, since the user of the work machine can learn the number of times N, L of ON-OFF rotation and the predetermined period of time T1, T2 from the manufacturer at the time of purchasing the work machine or the like, this special manipulation method can be known by only the user.

Incidentally, although the number of times N, L of ON-OFF rotation and the predetermined period of time T1, T2 are known by making inquiries to the manufacturer, the manufacturer may prepare a diagram or the like showing the special manipulation method for the work machine, and provide the rental company or personal user with the diagram, so that the rental company or personal user can perform the special manipulation to start the engine referring to the diagram showing the special manipulation only when the engine should be started by the special manipulation.

As described above, since the special manipulation is different from operations for starting engine and is complicated, it is difficult for a person who intends to steal the machine to carry out the same manipulation, and even in the case where the engine start key 5A, 5B is lost, only the user can start the engine without ruining the antitheft function.

Further, by providing the two patterns of special manipulations such as the step 233 and step 238, the antitheft function is improved. Incidentally, by increasing the special manipulation as in the step 233 and step 238, the special manipulation becomes complicated, so that the antitheft function can be improved.

Further, even in the case where the antenna 15 provided in the key cylinder 3 fails and the ID code collation can not be performed between the engine key 5 and the immobilizer control unit 17, the engine can be started by this special manipulation.

Figure 36:
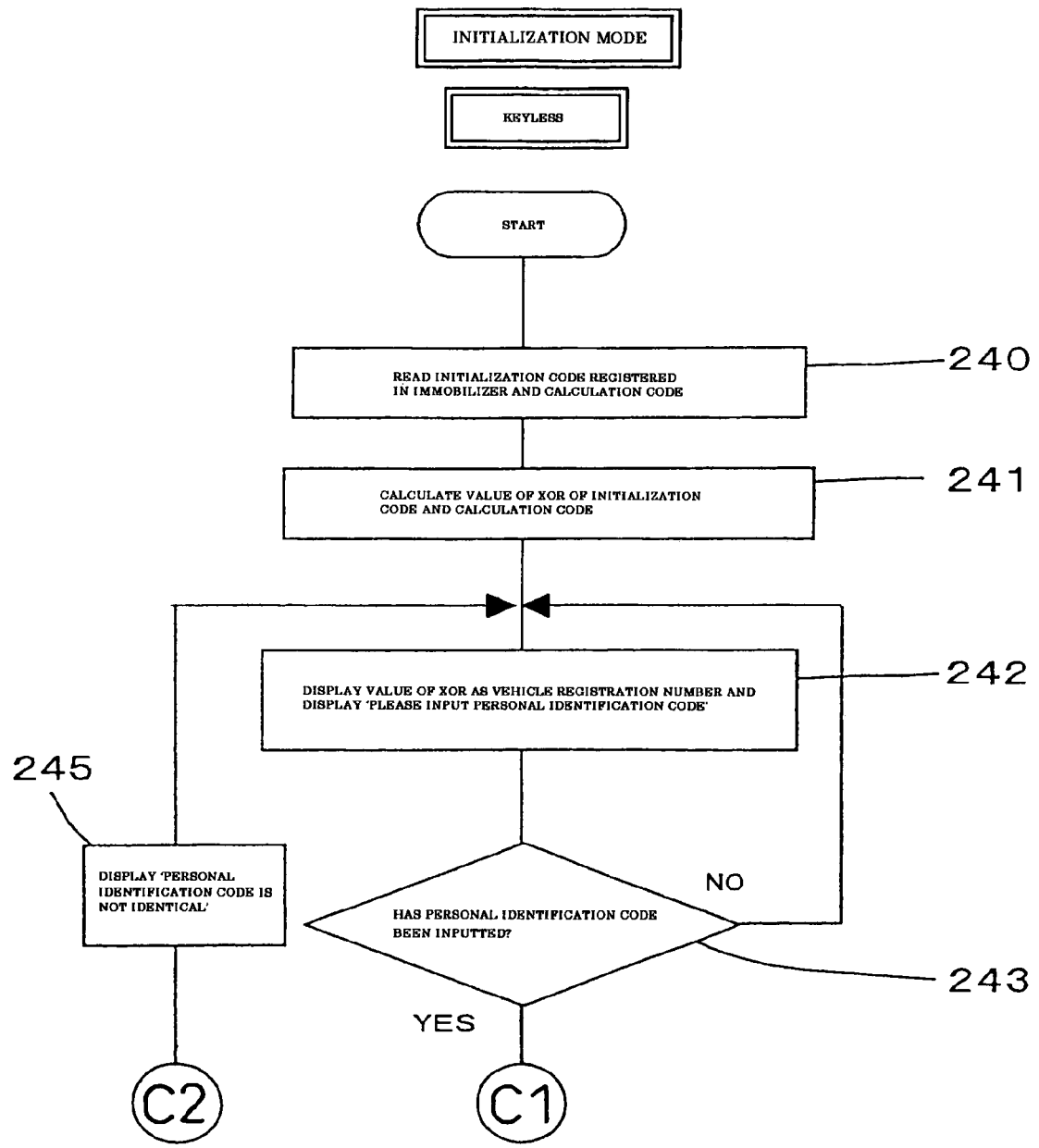
FIG. 36(a) is a flowchart showing a keyless operation procedure in an initialization mode of the same embodiment.
FIG. 36(b) is a flowchart showing the keyless operation procedure in the initialization mode of the same embodiment.
Figure 36B:
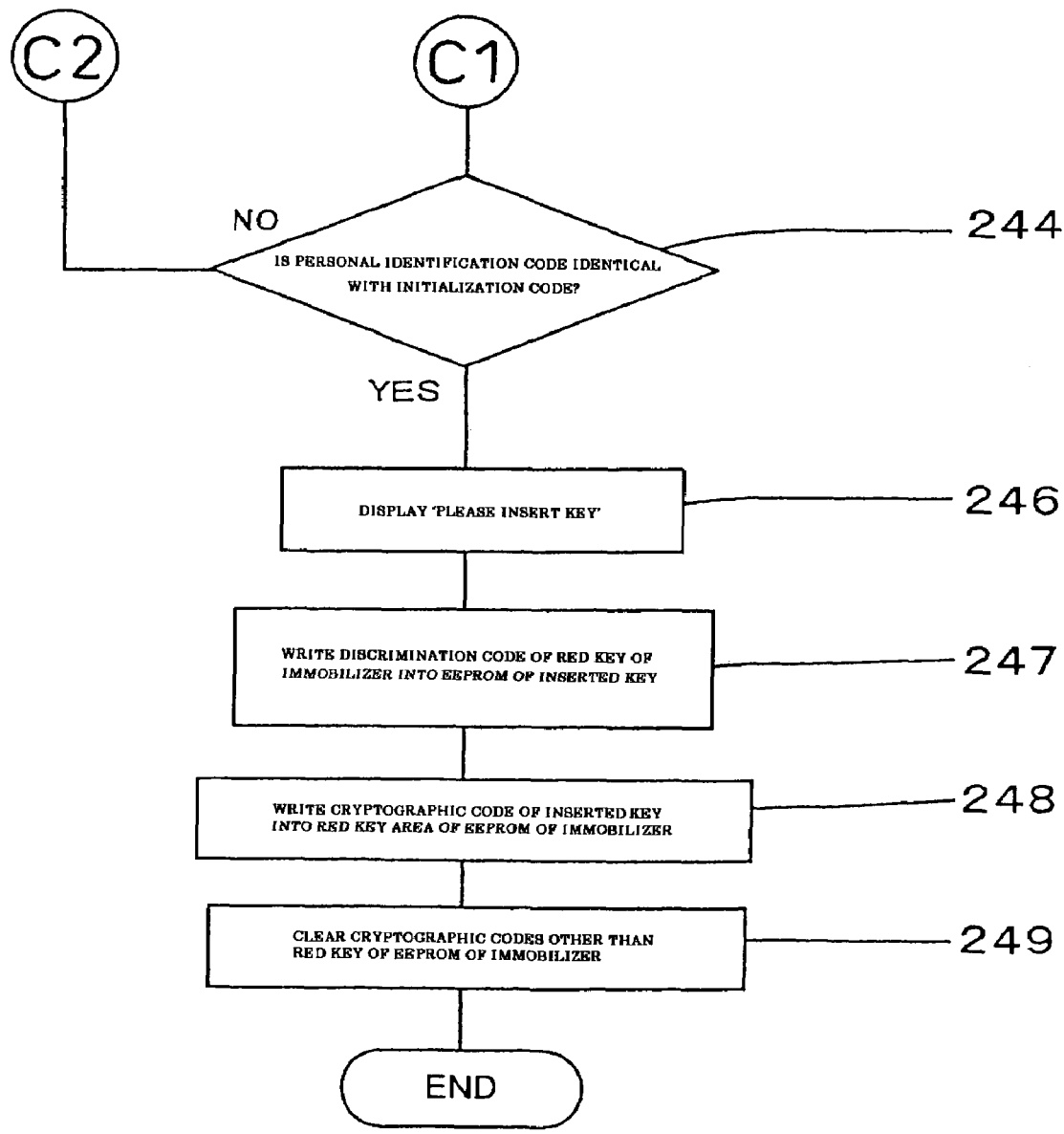
Figure 39:
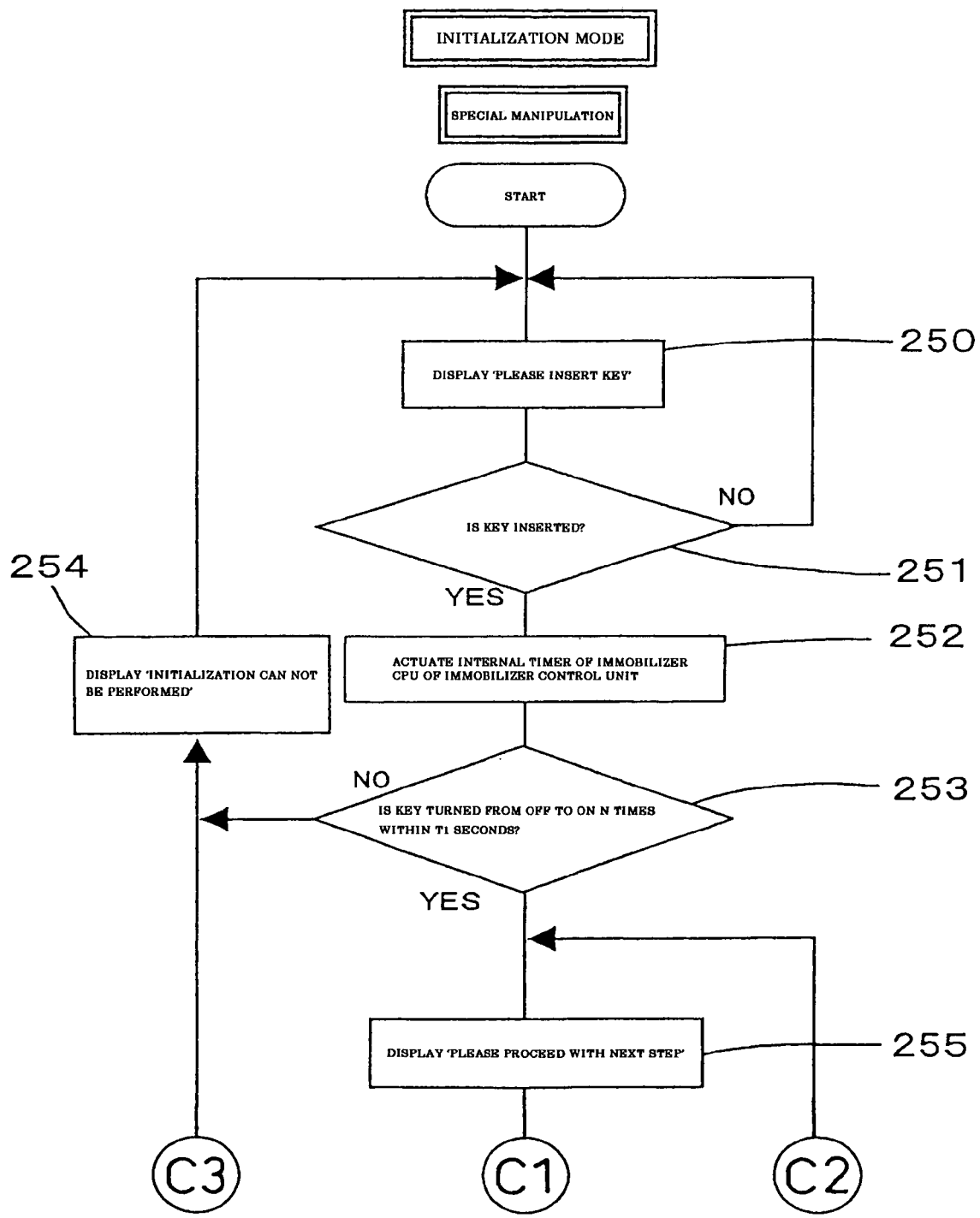
FIG. 39(a) is a flowchart showing a special manipulation operation procedure in the initialization mode of the same embodiment.
FIG. 39(b) is a flowchart showing the special manipulation operation procedure in the initialization mode of the same embodiment.
Figure 39:
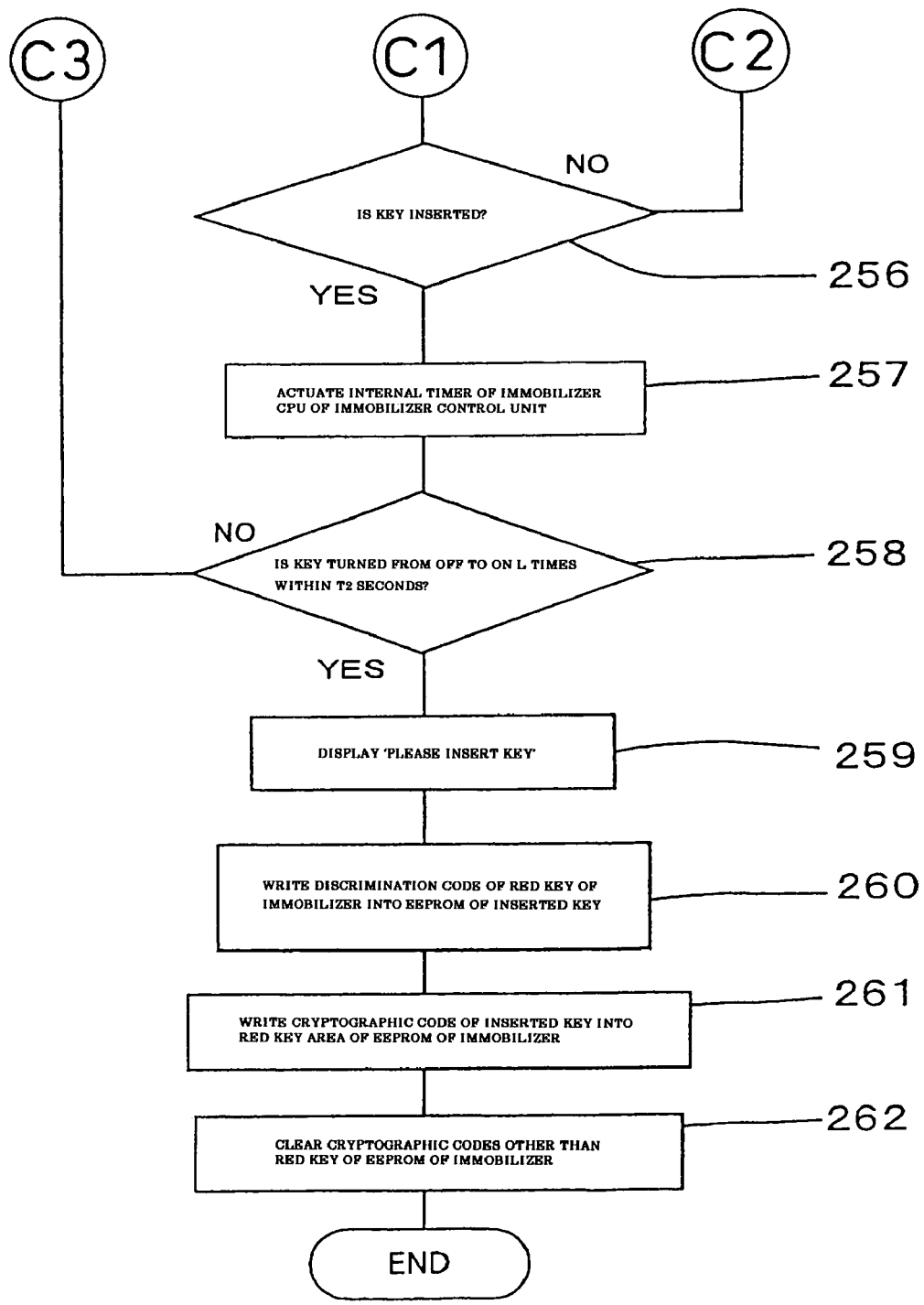

The operation procedure of the control mode of "keyless" in "initialization mode" will be described with reference to flowcharts of FIG. 36(*a*) and FIG. 36(*b*).

When the control mode of "keyless" of "initialization mode" starts, in step 240, the display part 29 displays "keyless" of "initialization mode", and the immobilizer CPU 23 of the immobilizer control unit 17 reads the initialization code recorded in the ROM 25 and the calculation code.

In step 241, the exclusive OR (XOR) of the initialization code and the calculation code is calculated, and the initialization code is converted into a vehicle registration number.

In step 242, the vehicle registration number is displayed on the display part 29 (display means), and further, 'Please input personal identification code' is displayed on the display part 29, so that a code can be inputted by the input means, and the procedure advances to step 243.

In the step 243, it is judged whether or not the input of the code is completed by the input means (the first switch 31, the second switch 32 and the third switch 33), that is, it is judged whether or not the third switch is pressed in the input state. When the input of the code is completed, the procedure advances to step 244, and otherwise, the procedure returns to step 242.

In the step 244, when the input code inputted by the input means is identical with the initialization code, the procedure advances to step 246, and otherwise, the procedure advances to step 245.

In the step 245, 'Personal identification code is not identical' is displayed on the display part 29 for a predetermined period of time, and the procedure returns to step 242.

In the step 246, 'Please input personal identification code' is displayed on the display part 29 for a predetermined period of time, and the procedure advances to step 247.

In the step 247, when the engine key 5 having the cryptographic code is inserted into the key cylinder 3, the discrimination code of the immobilizer control unit 17 corresponding to the red key 5C is written into the EEPROM 11 of the engine key 5 (for example, the blue key 5A), and the procedure advances to step 248.

In the step 248, the cryptographic code of the engine key 5 is written into the cryptographic code of the memory area of the red key 5C of the immobilizer control unit 17.

Accordingly, among the engine keys 5, with respect to the engine key 5 in which only the cryptographic code is recorded and the discrimination code is not recorded, or the engine key 5 in which the cryptographic code is recorded and the discrimination code of the red key 5C is recorded, the ID code of the engine key 5 corresponds to the ID code of the immobilizer control unit 17, whereby the registration of the red key is performed so that the key serves as the allowance key to form the new red key 5C, thereby allowing the rewriting or writing of the ID code by this red key 5C.

In step 249, the cryptographic codes of the cryptographic codes (blue key, yellow key, green key) other than the red key memory area of the immobilizer control unit are cleared.

Accordingly, in the control mode of "keyless" of "initialization mode", the engine key 5 having the ID code (cryptographic code) can be registered as the red key 5C, and the cryptographic codes of the blue key, the yellow key, and the green key recorded in the immobilizer control unit 17 are cleared. Thus, it is possible to obtain the initialized state similar to FIG. 5 in which the cryptographic code of only the red key 5C is written in the EEPROM 24 of the immobilizer control unit 17, and when the yellow key 5B or the blue key is newly registered in the immobilizer control unit 17 with using the new red key 5C, the engine start key 5A, 5B is rendered corresponding to the work machine, thereby enabling the engine start key 5A, 5B to start the engine.

For example, in the case where the cryptographic codes are recorded in the EEPROM 24 of the immobilizer control unit 17 as shown in FIG. 37, when the initialization code is identical with the code inputted by the input means, the engine key 5 can be registered as the red key 5C. When engine key 5 in which the cryptographic code is [m] and the discrimination code is blank as shown in the right table of FIG. 37 is inserted into the key cylinder 3, the cryptographic code of [m] of the engine key 5 is recorded (rewritten) in the memory area of the EEPROM 24 of the immobilizer control unit 17 corresponding to the red key 5C as shown in the left table of FIG. 38, and the discrimination code of [v] of the red key 5C recorded in the ROM 25 of the immobilizer control unit 17 is recorded in the EEPROM 11 of the inserted engine key 5 as shown in the right table of FIG. 38. Thereafter, the cryptographic codes of the other keys other than the cryptographic code of [m] of the red key 5C newly recorded in the EEPROM 11 of the immobilizer control unit 17 are cleared as shown in the left table of FIG. 38.

Further, in the control mode of "keyless" of "initialization mode", when the initialization code is identical with the input code, the initialization is performed, and when the initialization code is not identical with the input code, the initialization is rendered impossible. Therefore, the initialization can be performed by knowing the initialization code (personal identification code) recorded in the immobilizer control unit 17.

However, in the control mode of "keyless" of "initialization mode", since the initialization code is converted into the vehicle registration number through the conversion function (step 240, step 241), the initialization code for performing the initialization can not be directly known. Instead thereof, the vehicle registration number (dummy initialization code) can be known by the display means 29 (step 242).

When the method of calculating the initialization code from the vehicle registration number, that is, the conversion function provided in the immobilizer control unit 17 is known, the initialization code can be calculated from the vehicle registration number.

That is, as is understood from step 241, since the vehicle registration number is the value obtained by calculating the exclusive OR of the initialization code and the calculation code, when the exclusive OR of the vehicle registration number and the calculation code is calculated, the value is restored to the initialization code.

For example, assuming the initialization code recorded in the ROM 25 of the immobilizer control unit 17 to be 5678 (hexadecimal number) and the calculation code recorded in the ROM 25 of the immobilizer control unit 17 to be 1234 (hexadecimal number), the exclusive OR of the initialization code and the calculation code, that is, the vehicle registration number is 444C (hexadecimal number), and the exclusive OR of the vehicle registration number 444C and the calculation code 1234 (hexadecimal number) is 5678 (hexadecimal number), and this value is equal to the initialization code 5678 (hexadecimal number).

However, since the initialization code, the calculation code, the relation between the initialization code and the vehicle registration number, and the like are previously recorded as the control program in the immobilizer control unit 17, in general, even if only the vehicle registration number is known, the initialization code (personal identification code) can not be figured out from the vehicle registration number.

Accordingly, similarly to the case of the engine starting code, the initialization code can not be found, unless the user owning the work machine makes inquiries to the manufacturer of the work machine (antitheft device 1) managing the vehicle registration numbers to learn the initialization code (personal identification code) from the manufacturer, or unless the user learns the method of figuring out the initialization code from the vehicle registration number from the work machine manufacturer.

The method of figuring out the initialization code from the vehicle registration number is similar to the foregoing method of figuring out the engine starting code from the vehicle registration number (see FIG. 34 and FIG. 35) except that the engine starting code is replaced by the initialization code, and the description of the method of figuring out the initialization code from the vehicle registration number will be omitted. Incidentally, in order to render the operation mode capable of figuring out both the engine starting code and the initialization code from the vehicle registration number, a manipulation to discriminate which of the engine starting code and the initialization code is to be figured out is incorporated in the procedure.

Next, the operation procedure of the control mode of "special manipulation" of "initialization mode" will be described by the use of FIG. 41(a) and FIG. 41(b).

When the control mode of "special manipulation" of "initialization mode" starts, in step 250, the display part 29 displays "special manipulation" of "initialization mode" and 'Please insert key', and the procedure advances to step 251.

In the 251, when the ignition switch 2 is rotated from the OFF position to the ON position, it is judged that the engine key 3 is inserted, and the procedure advances to step 252. When it is judged that the engine key 3 is not inserted, the procedure returns to step 250.

Accordingly, when the control mode of "special manipulation" of "initialization mode" starts, until the engine key 5 is inserted into the key cylinder 3, the display part 29 continues to display "special manipulation" of "initialization mode" and 'Please insert key' to urge the insertion of the engine key 5 into the key cylinder 3.

In the step 252, the internal timer incorporated in the immobilizer CPU 23 of the immobilizer control unit 17 is actuated.

In step 253, the immobilizer CPU 23 of the immobilizer control unit 17 counts, using the signal form the key cylinder 3, how many times the ignition switch 2 has been rotated from the OFF position to the ON position (the number of times of ON-OFF rotation) after the internal timer of the immobilizer CPU 23 of the immobilizer control unit 17 was actuated (after the engine key 5 was inserted into the key cylinder 3), and it is judged whether or not the number of times of ON-OFF rotation of the ignition switch in the predetermined period of time T1 is N times. When the number of times of ON-OFF rotation of the ignition switch 2 in the predetermined period of time T1 is N times, the internal timer of the immobilizer CPU 23 of the immobilizer control unit 17 is cleared, and the procedure advances to next step 255, and otherwise, the number of times of rotation of the key is judged to be an invalid number of times, and the procedure advances to step 254.

For example, assuming the predetermined period of time T1 to be ten seconds and the number of times of ON-OFF rotation to be ten times, in the step 253, every turning motion of the ignition switch 2 from the OFF position to the ON position is counted as one, and when the number of times of ON-OFF rotation in the predetermined period of time of ten seconds is ten times, the procedure advances to step 255, and when the number of times of ON-OFF rotation in the predetermined period of time of ten seconds is other than ten times (for example, seven or twelve times), the procedure advances to step 254.

In the step 255, 'Please proceed with next step' is displayed on the display part 29 for a predetermined period of time (several seconds).

In step 256, when the ignition switch 2 is rotated from the OFF position to the ON position, it is judged that the engine key 3 is inserted, and the procedure advances to step 257.

When it is judged that the engine key 3 is not inserted, the procedure returns to step 255.

In the step 257, the internal timer incorporated in the immobilizer CPU 23 of the immobilizer control unit 17 is actuated.

In step 258, similarly to the above, the immobilizer CPU 23 of the immobilizer control unit 17 counts how many times the ignition switch 2 has been rotated by the key from the OFF position to the ON position (the number of times of ON-OFF rotation), and it is judged whether or not the number of times of ON-OFF rotation of the key in a predetermined period of time T2 is L times. When the number of times of ON-OFF rotation of the key in the predetermined period of time T2 is L times, the internal timer of the immobilizer CPU 23 of the immobilizer control unit 17 is cleared, and the procedure advances to step 259, and otherwise, the number of times is judged to be an invalid number of times, and the procedure advances to step 254. In the step 254, 'Initialization can not be performed' is displayed on the display part 29 for a predetermined period of time, and the procedure returns to step 250.

In the step 259, 'Please insert key' is displayed on the display part 29 for a predetermined period of time, and the procedure advances to step 260.

In the step 260, the discrimination code of the red key 5C of the immobilizer control unit 17 is written into the EEPROM 11 of the inserted engine key 5 (for example, the rewritable engine key 5 having the cryptographic code).

In step 261, the cryptographic code of the engine key 5 is written into the cryptographic code area of the corresponding area of the red key 5C of the immobilizer control unit 17, thereby registering the engine key 5 as the red key 5C.

In step 262, the cryptographic codes (the cryptographic codes of blue key, yellow key, and green key) in the area other than the area corresponding to the red key 5C of the immobilizer control unit 17 are cleared.

Accordingly, in the control mode of "special manipulation" of "initialization mode", similarly to the control mode of "keyless" of "initialization mode", since the engine key 5 having the ID code can be registered as the red key 5C, and the cryptographic codes of the blue key, the yellow key and the green key recorded in the immobilizer control unit 17 are cleared, the initialized state similar to FIG. 5 can be obtained. When the yellow key 5B or the blue key 5A (engine start key) is newly registered into the immobilizer control unit 17 with using the new red key 5C, the engine start key 5A, 5B is rendered corresponding to the work machine, thereby enabling the engine start key 5A, 5B to start the engine.

Further, in the control mode of "special manipulation" of "initialization mode", the ID code recorded in the immobilizer control unit 17 can be initialized by the special manipulation which is different from operations for starting the engine (the ignition switch is successively rotated from the OFF position to the ON position within the predetermined period of time) with the engine key 5 (key capable of rotating the ignition switch 2 from the OFF position to the ON position).

The number of times N, L of ON-OFF rotation of the engine key 5 within the predetermined period of time is recorded in the immobilizer CPU 23 of the immobilizer control unit 17, and the predetermined period of time T1, T2 is also recorded in the immobilizer CPU 23 of the immobilizer control unit 17. Thus, in general, the number of times N, L of ON-OFF rotation and the predetermined period of time T1, T2 are not known even to the user owning the work machine. Unless the user owning the work machine makes inquiries to the manufacturer to learn the number of times N, L of ON-OFF rotation and the predetermined period of time T1, T2, or unless the user previously learns them from the manufacturer at the time of purchasing the work machine or the like, the initialization can not be performed.

For example, in the case where the user does not know the number of times N, L of ON-OFF rotation and the predetermined period of time T1, T2, the user owning the work machine makes a telephone call to the manufacturer, and notifies the user information (name, telephone number, birth date of the user owning the work machine, personal identification number stated to the manufacturer at the time of purchasing the work machine, and the like) to the manufacturer to prove that the user is a correct user, so that the user is informed of the number of times N, L of ON-OFF rotation and the predetermined period of time T1, T2, thereby allowing only the valid user to perform the initialization.

Further, since the user of the work machine can learn the number of times N, L of ON-OFF rotation and the predetermined period of time T1, T2 from the manufacturer also at the time of purchasing the work machine, this special manipulation method can be known to only the user.

Incidentally, although the number of times N, L of ON-OFF rotation and the predetermined period of time T1, T2 are known by making inquiries to the manufacturer, the manufacturer may prepare a diagram showing the special manipulation method for the work machine and provide the rental company or the personal user with the diagram, so that the initialization can be performed with using the diagram showing the special manipulation only when the rental company or the personal user performs the initialization by the special manipulation.

Since the special manipulation as described above is different from operations for starting engine and is complicated, it is difficult for a person who intends to steal the machine to carry out the same manipulation, and the initialization can be performed without ruining the antitheft function.

Further, by providing the two patterns of special manipulations such as the step 253 and step 258, the antitheft function is further improved. Incidentally, the antitheft function can be improved by increasing the special manipulation as in the step 253 and step 258.

According to the above embodiment, through the operation procedure of the control mode of "blue key registration" in "each key registration mode", the new blue key 5A or the yellow key 5B can be formed from a commercially available engine key 5 or the like by the red key 5C or the green key (including both the master key and the slave key). Thus, in the case where the user has lost the blue key 5A, replacement of the whole antitheft device 1 is not required, since the blue key 5A capable of starting the engine of the work machine (vehicle) can be easily and newly formed with using a commercially available engine key, and the engine can be started economically and conveniently while the antitheft device 1 is used as it is. Further, since the red key 5C or the green key 5D is required in order to form the new blue key 5A or the yellow key 5B, it is difficult for a person other than the owner of the work machine to form the blue key 5A for starting the engine, and the antitheft function of this antitheft system is not unexpectedly lost.

Further, since the blue key 5A or the yellow key 5B for starting the engine is a different key from the red key 5C or the green key 5D for allowing the rewriting or writing of the ID code, the keys can be easily and conveniently managed.

Further, since the registered blue key 5A can not be registered as the blue key in the immobilizer control unit 17 of other work machines, the registered blue key 5A can be used exclusively for starting the engine of one corresponding work machine. Accordingly, the blue key 5A can be conveniently used as the engine start key corresponding to only one work machine. Since this blue key 5A can not be copied, stealing of the machine using a copy of the blue key 5A can also be prevented.

Through the operation of the control mode of "yellow key registration" in "each key registration mode", the yellow key 5B (including both the master key and the slave key) can be registered as the engine start key into the immobilizer control unit 17 of the work machine by the red key 5C or the green key 5D (including both the master key and the slave key). Further, since this registered yellow key 5B can also be registered as the engine start key into the immobilizer control unit 17 of other work machines, when the yellow key 5B is registered also into the immobilizer control units 17 of other work machines, the engines of plural work machines can be started by the master key or the slave key of the one yellow key 5B.

Accordingly, for example, in the case where the owner of the rental company having plural work machines checks those plural work machines, if the owner does not have the yellow key 5B, plural different engine keys 5 (blue keys 5A) are required to start the engines of the work machines, and at the time of check or the like, a key fitting to each work machine is required to be found from the plural keys, resulting in complicated checking work or the like. However, as stated above, when the yellow key 5B is registered into the immobilizer control units 17 of the plural work machines, the engines of the plural work machines can be started by the master key or the slave key of the one yellow key 5B. Thus, the owner of the rental company has to have only one master key (or slave key) of the yellow key 5B as a spare key, and it is very convenient for the checking work or the like.

Through the operation procedure of the control mode of "green key registration" in "each key registration mode", the green key 5D (including both the master key and the slave key) can be registered as the allowance key into the immobilizer control unit 17 of the work machine by the red key 5C. Further, since this registered green key 5D can also be registered as the allowance key into the immobilizer control units 17 of other work machines, when the green key 5D is registered also into the immobilizer control units 17 of other work machines, the rewriting or writing of the ID code can be allowed in plural work machines by the master key or the slave key of the one green key 5D.

Accordingly, for example, in the case where the owner of the rental company having plural work machines has lost the blue keys 5A of those work machines, if the owner does not have the green key 5D, since a new blue key 5A for starting the engine of each work machine is required to be formed with using the red key 5C corresponding to each work machine, it is necessary to find out one red key 5C corresponding to each work machine from plural keys for forming the new blue key 5A, which is a very complicated work. However, as stated above, where the green key 5D is registered into the immobilizer control units 17 of plural work machines, the blue keys 5A for starting the engines of the plural work machines can be formed by the master key or the slave key of the one green key 5D. Thus, the owner of the rental company has to have only one master key (or slave key) of the green key 5D as the key for forming the blue key 5A, and this is very convenient for the work of forming blue keys 5A or the like.

Through the operation procedure of the control mode of "yellow key copy" in "each key copy mode", the slave key of the yellow key 5B can be formed by copying the master key of the yellow key 5B. Thus, for example, as shown in FIG. 26, when the rental company of the work machine lends the work machine, they keep the master key of the yellow key 5B and lend the work machine with the slave key of the yellow key 5B to a user, so that the rental company can start the engine of the work machine by the master key of the yellow key 5B when the work machine is parked in the rental company, even if the user does not return the slave key of the blue key 5A or the yellow key 5B, and this is convenient. Further, even if the rental company has plural parking places for their work machines, the engines of the work machines can be started by the slave key of the yellow key 5B in each of the parking places by providing each parking place with the slave key of the copied yellow key 5B, and this is convenient.

Through the operation procedure of the control mode of "green key copy" in "each key copy mode", since the slave key of the green key 5D can be formed by copying the master key of the green key 5D, plural green keys 5D (one master key and one or plural slave keys) to allow the rewriting or writing of the ID code can be formed for one work machine.

Accordingly, for example, in a nationwide rental company having plural branches each holding plural work machines, a work machine of a certain branch is transferred to another branch. Thus, if the new blue key 5A can only be formed by the red key 5C, in the case where the blue key 5A of a work machine transferred to the another branch is lost, since only one red key 5C of work machine corresponds to that one work machine, and since the red key 5C is generally kept in the branch which originally held the work machine, it is necessary to obtain the red key 5C from the branch which originally held the work machine, and this is inconvenient. However, as shown in FIG. 26, if the master key of the green key 5D is kept in the branch which originally held the work machine and the slave of the green key 5D is kept in another branch, when the blue key 5A of the work machine is lost in the another branch, the new blue key 5A can be formed similarly to the red key 5C by the slave key of the green key 5D of the branch without taking the trouble to obtain the red key 5C from the branch which originally held the work machine, and the engine of the work machine can be started by this blue key 5A, which is very convenient.

Additional effects by the registration of the blue key 5A, the copy of the yellow key 5B, the copy of green key 5D, and the like are as shown in FIG. 26.

The display part 29 variably displaying the manipulation for preventing theft is controlled by the immobilizer control unit 17 so that the manipulation to register the start key (the blue key 5A, the yellow key 5B), the manipulation to register the allowance key (green key 5D), and the manipulation to copy the key (the yellow key 5B, the green key 5D) are sequentially variably displayed. Thus, when the blue key 5A, the yellow key 5B and the green key 5D are registered, or when the yellow key 5B and green key 5D are copied, since those manipulations are sequentially displayed on the display part 29, the manipulation of the registration of the key and the manipulation of the key copy can be smoothly and certainly performed without mistakes.

Further, since each time a manipulation is performed, the display part 29 sequentially variably displays a manipulation to be performed next, a manipulation, as a manipulation to prevent theft, to be performed next can be easily and certainly known without errors, and the manipulation to prevent theft can be performed more smoothly and easily. Furthermore, since the display part 29 sequentially variably displays the control mode of the immobilizer control unit 17, it is possible to certainly know in which control mode the current manipulation is being performed, and the manipulations in the respective control modes to prevent theft can be smoothly performed.

Through the operation procedure of the control mode of "red key use" or "special manipulation" in "vehicle resale mode", the cryptographic code of the yellow key 5B or the green key 5D recorded in the EEPROM 24 of the immobilizer control unit 17 of the work machine can be deleted (cleared). For example, in the case where a rental company E distributes plural green keys 5D of a work machine G to plural branches and each of the branches keeps the green key 5D, when the work machine G is resold to a rental company F, the rental company E (seller) deletes the ID code of the green key 5D recorded in the immobilizer control unit 17 of the work machine G through "red key use mode" or "special manipulation" mode before the work machine G is resold to the rental company F. As a result, after the work machine G is resold to the rental company F, a new blue key 5A or yellow key 5B cannot be recorded into the work machine G with using the green key 5D of the work machine G owned by the rental company E before the resale.

Accordingly, even if the owner of the work machine G changes, the antitheft system can be used as it is, and it is not necessary to replace the antitheft system for the resale.

With the operation procedure of the control mode of "keyless" or "special manipulation" in "emergency start mode", even in the case where the engine start key 5A, 5B is lost, or the allowance key 5C, 5D is lost, the engine can be started without ruining the antitheft function. Thus, for example, as shown in FIG. 26, when a work machine (C-2) of a C branch of a rental company A is lent and is transferred to a D branch, if the blue key 5A of the work machine (C-2) has been lost and the green key 5D corresponding to the work machine (C-2) in the D branch has been lost, that is, in the case where the new blue key 5A can not be formed by the green key 5D, the work machine (C-2) can be driven without obtaining the red key 5C of the work machine (C-2) from the C branch, which is convenient.

Further, even in the case where the antenna 15 provided in the key cylinder 3 fails, and the ID code collation can not be performed between the engine key 5 and the immobilizer control unit 17, the engine can be started without ruining the antitheft function.

Through the operation procedure of the control mode of "keyless" or "special manipulation" in "initialization mode", the cryptographic codes of the blue key 5A, the yellow key 5B and the green key 5D recorded in the EEPROM 24 of the immobilizer control unit 17 can be cleared, and the red key 5C is newly registered. Thus, for example, since the blue key 5A, the yellow key 5B and the green key 5D can be newly registered with using the new red key 5C, the correspondence relation of the blue key 5A, the yellow key 5B, the red key 5C, and the green key 5D newly registered in the immobilizer control unit 17 (antitheft device 1) with respect to the antitheft device 1 is organized, and without searching the engine key 5 corresponding to the work machine, the engine can be started by the newly registered engine start key 5A, 5B, and copies of the engine start key 5A, 5B can be formed by the newly registered allowance key 5C, 5D.

Further, in the case where the red key 5C is lost, it is possible that the engine start key 5A, 5B is formed with using the lost red key 5C. However, since the ID code of the red key 5C recorded in the immobilizer control unit 17 is rewritten by the ID code of the newly recorded red key 5C through the operation procedure of the control mode of "initialization mode", registration of another key with using the lost red key 5C is prevented, and even in the case where the red key 5C is lost, it is not necessary to replace the antitheft device 1 with a new one, and the antitheft function can be ensured.

Figure 40:
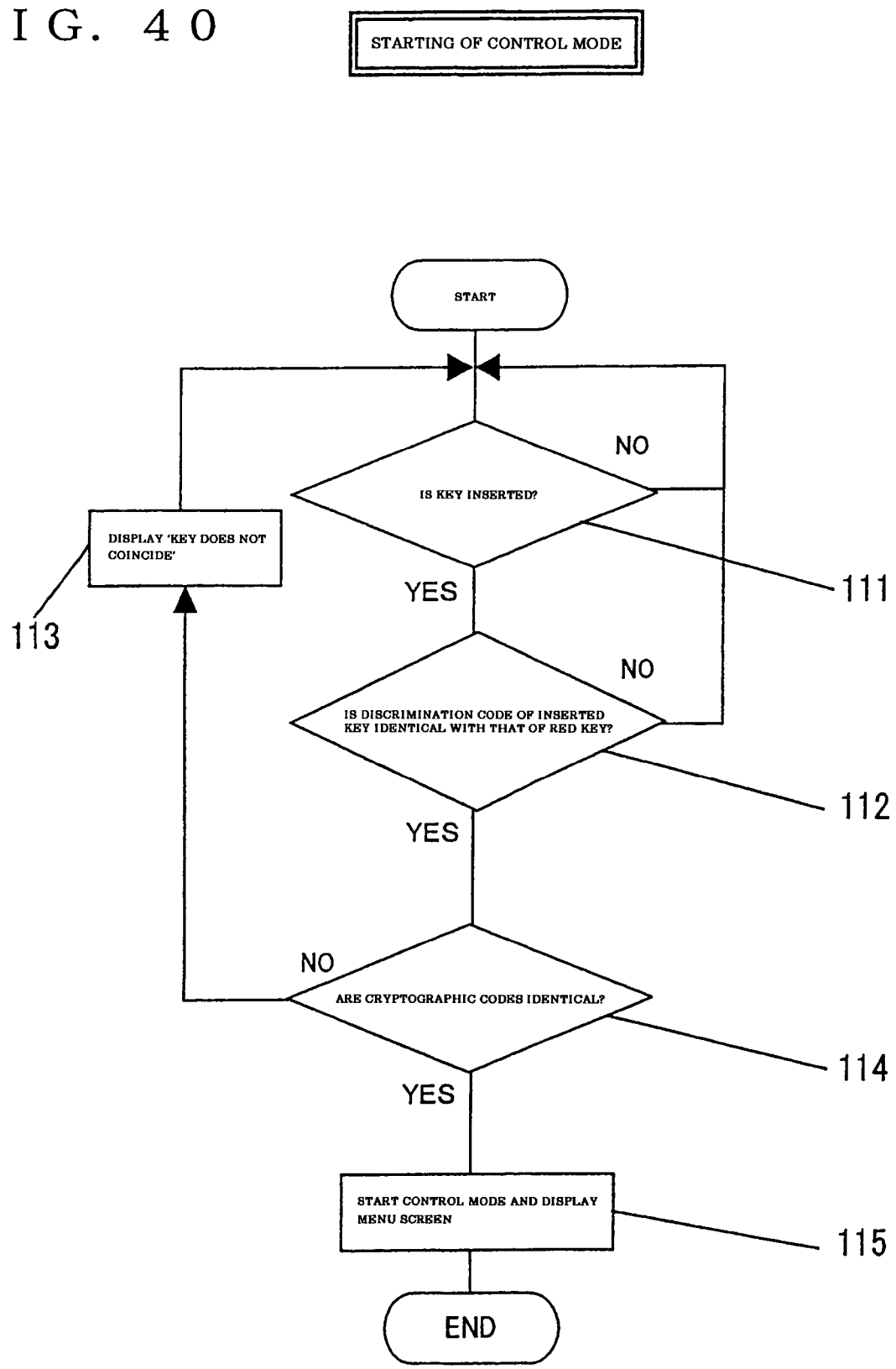
FIG. 40 is a flowchart showing another embodiment.

FIG. 40 shows another embodiment, in which conditions under which the control mode shown in FIG. 8 is started are changed. When the red key 5C is inserted into the key cylinder 3, the ID code of the red key 5C is collated with the ID code recorded in the immobilizer control unit 17, and when the result of the collation is affirmative, the control mode which allows the start key registration function provided in the immobilizer control unit 17 to perform is started. Other constructions are the same as those of the foregoing embodiment.

Next, the procedure for starting the control mode will be described with reference to a flowchart of FIG. 40. In step 111, it is judged whether or not the engine key 5 is inserted into the key cylinder 3, and when it is judged that the engine key 5 is inserted, the procedure advances to step 112, and when it is judged that the engine key 5 is not inserted, the procedure returns to step 111.

Accordingly, in the step 111, the judgment of whether or not the engine key 5 is inserted into the key cylinder 3 is repeated until the engine key 5 (the red key 5C) is inserted into the key cylinder 3.

In the step 112, it is judged whether or not the discrimination code of the engine key 5 inserted into the key cylinder 3 is identical with the discrimination code of the red key 5C. When it is identical with the discrimination code of the red key 5C, the procedure advances to step 114, and when it is not identical with the discrimination code of the red key 5C, the procedure returns to step 111.

In the step 114, it is judged whether or not the cryptographic code of the engine key 5 inserted into the key cylinder 3 is identical with the cryptographic code recorded in the immobilizer control unit 17. When the cryptographic codes are identical, the procedure advances to step 115, and when the cryptographic codes are not identical, 'Key does not coincide' is displayed on the display part 29, and the procedure returns to step 111.

Accordingly, when the red key 5C other than the registered red key 5C is inserted into the key cylinder 3, after it is notified that the unregistered erroneous red key 5C has been inserted into the key cylinder 3 by displaying 'Key does not coincide' on the display part 29, the judgment of whether or not the engine key 5 is inserted into the key cylinder 3 is repeated.

When the cryptographic codes are judged to be identical in the step 114, the control mode for preventing theft, as shown in FIG. 8, starts with displaying "each key registration mode" of the main menu in the step 115. The subsequent operation procedure is the same as the case of the former embodiment, and each time the third switch 33 is pressed, the control mode of the main menu is sequentially changed from "each registration mode" to "each key copy mode", "vehicle resale mode", "emergency start mode", and "initialization mode". When the third switch 33 is further pressed, the control mode returns to "each key registration mode", and hereinafter, each time the third switch 33 is pressed, the changeover of the control mode of the main menu is repeated. Further operations for changing control modes of submenu in each control mode, the operation procedure of the each key registration mode, the operation procedure of the each key copy mode, the operation procedure of the wheel resale mode, the operation procedure of the emergency start mode, and the operation procedure of the initialization mode are also the same as those of the former embodiment.

According to this embodiment, for operating the control mode for preventing theft as shown in FIG. 8, a complicated manipulation in which while pressing the third switch 33 of the display device 18, the engine key 5 is inserted into the key cylinder 3, and the main switch 2 is manipulated from the OFF position (OFF) to the ON position (ON), as in the case of the foregoing embodiment, is not required. When the red key 5C recorded in the immobilizer control unit 17 is simply inserted into the key cylinder 3, the control mode for preventing theft is started, and the troublesomeness of the manipulation for starting the control mode is eliminated.

Incidentally, in the embodiment of FIG. 40, the control mode starts when the red key 5C recorded in the immobilizer control unit 17 is inserted into the key cylinder 3. Alternatively, the control mode may be arranged to start when the green key 5D (both the master key and the slave key or one of them) recorded in the immobilizer control unit 17 is inserted into the key cylinder 3, or the control mode may be arranged to start when one of the red key 5C recorded in the immobilizer control unit 17 and the green key 5D (both the master key and the slave key or one of them) recorded in the immobilizer control unit 17 is inserted into the key cylinder 3.

Figure 41:
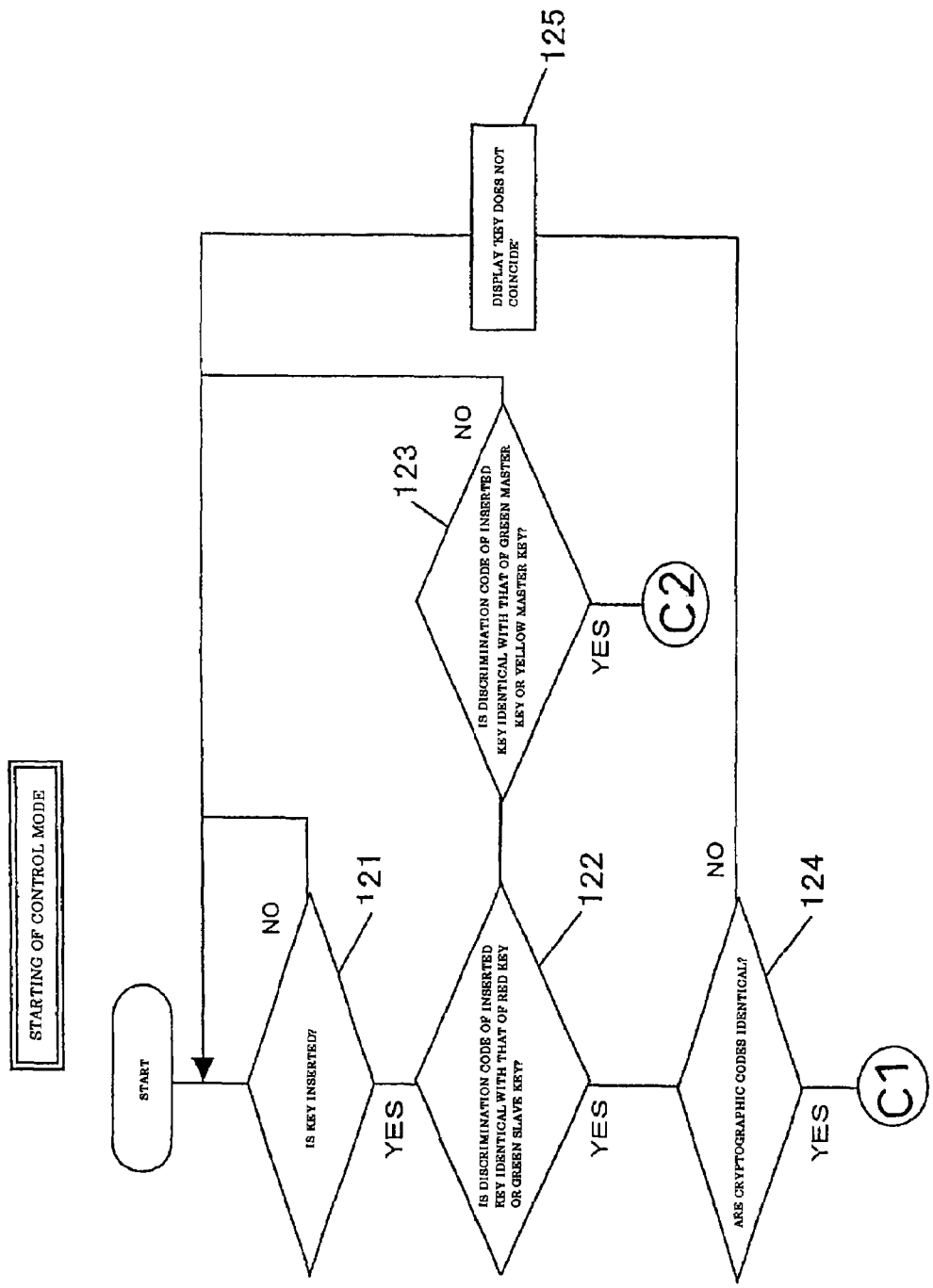
FIG. 41(a) is a flowchart showing another embodiment.
FIG. 41(b) is a flowchart showing the embodiment.
Figure 41B:
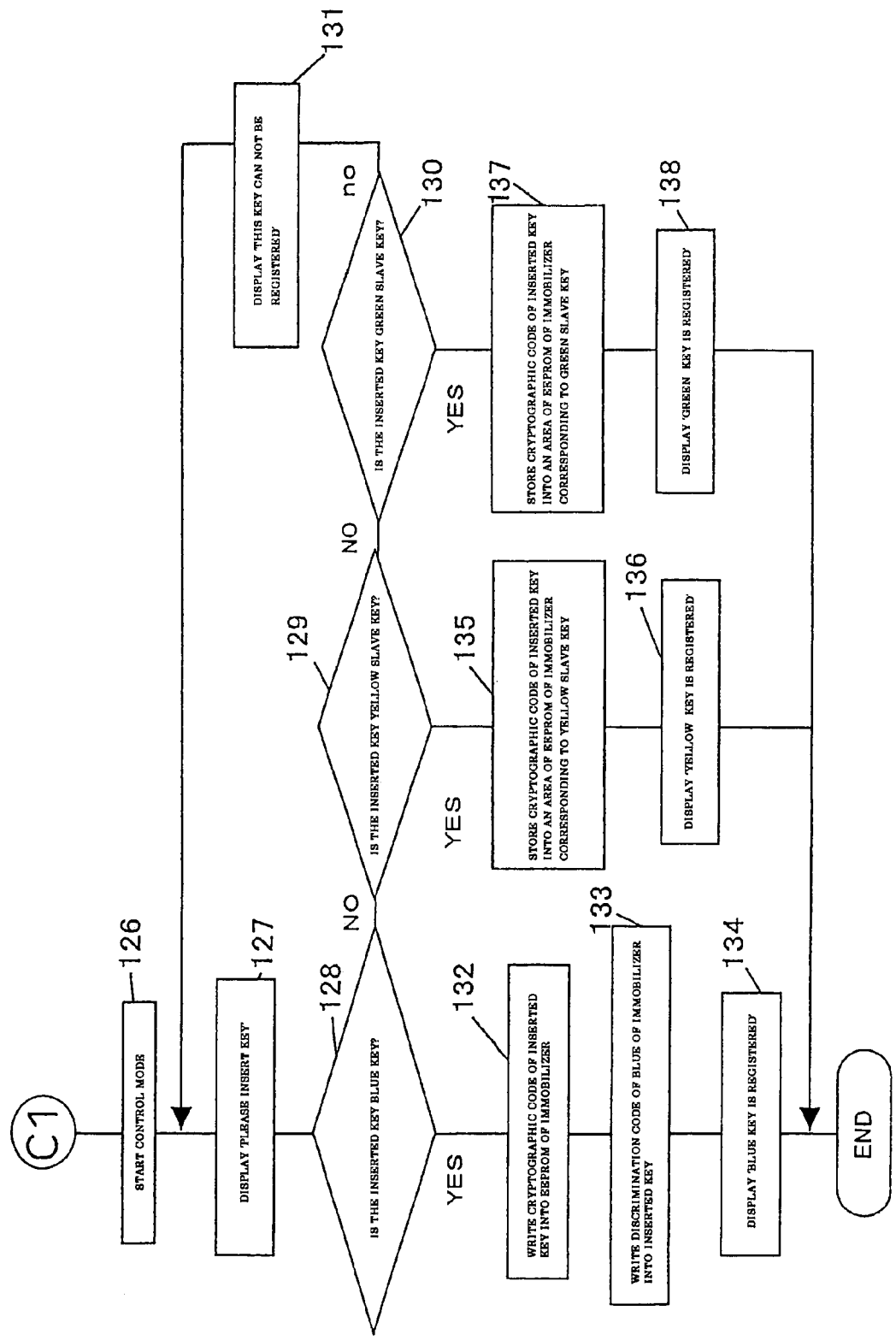
Figure 42:
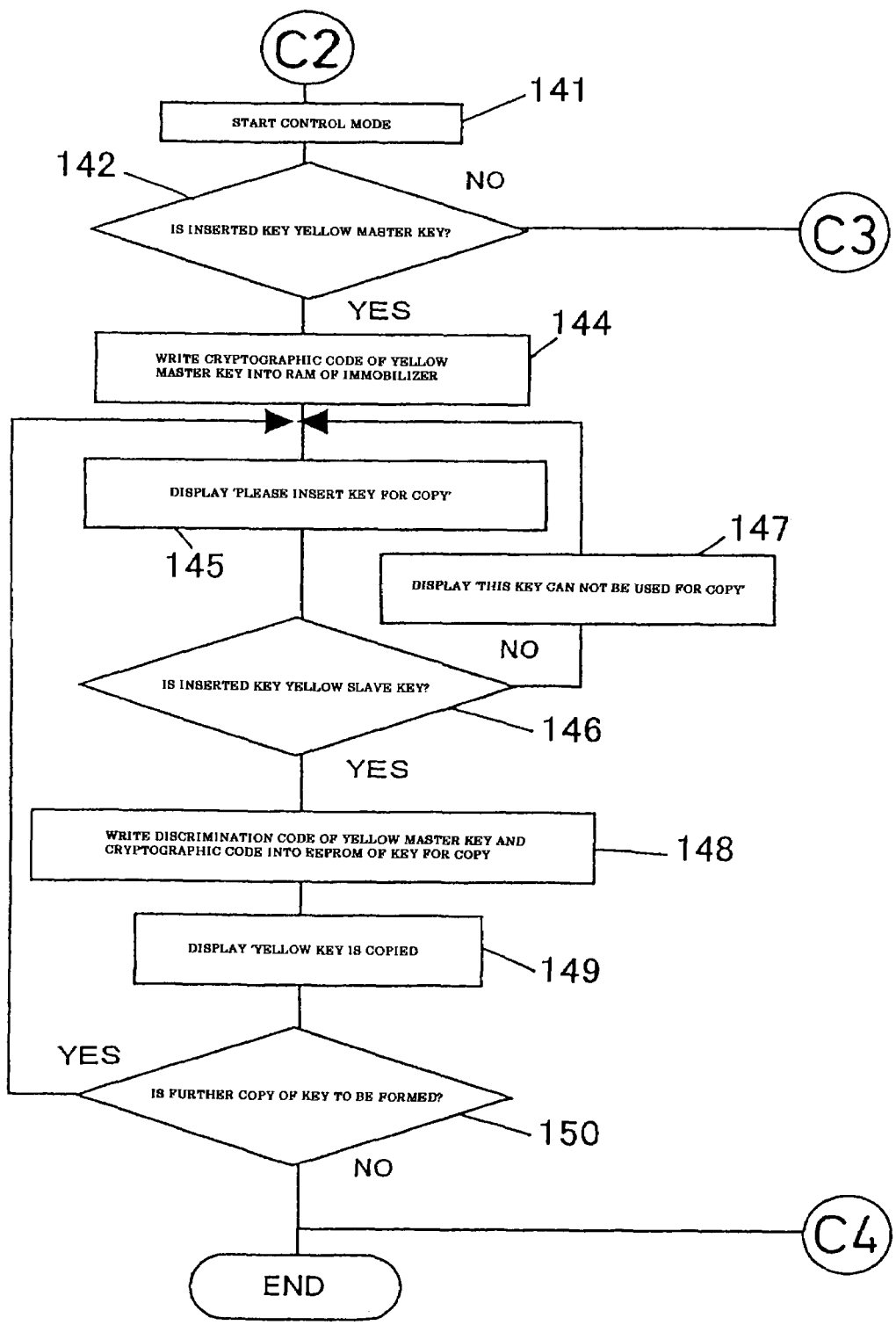
FIG. 42(a) is a flowchart of the same embodiment.
FIG. 42(b) is the flowchart of the same embodiment.
Figure 42B:
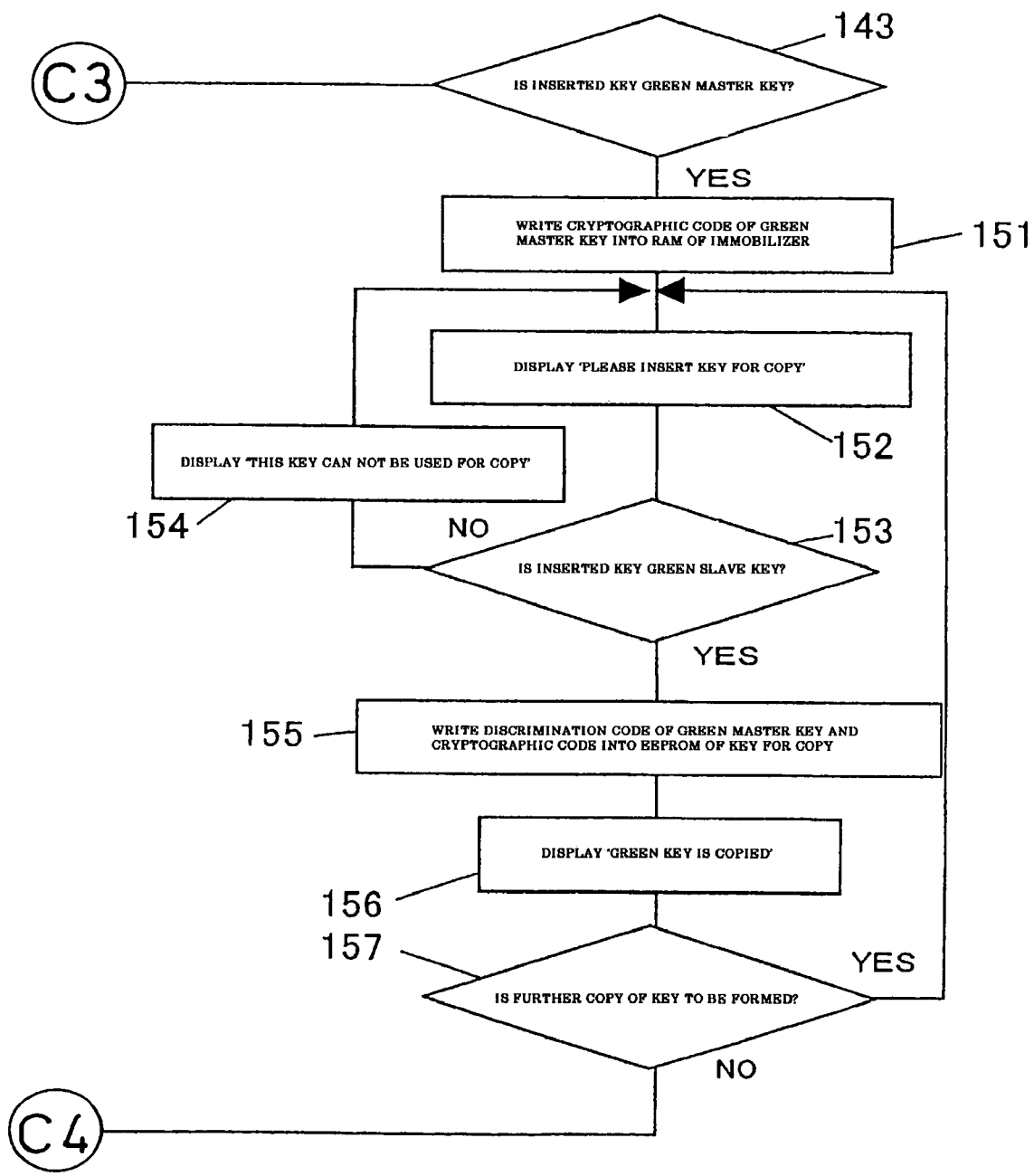

FIG. 41(*a*), FIG. 41(*b*), FIG. 42(*a*) and FIG. 42(*b*) show yet another embodiment, in which conditions for starting the control mode shown in FIG. 8 are changed, and conditions for starting the each key registration mode and the each key copy mode in the control mode are changed. In this embodiment, the master key of the yellow key 5B is used only for forming (copying) the slave key of the yellow key 5B, and is not registered in the immobilizer control unit 17, and the engine can not be started by the master key of the yellow key 5B. Further, the master key of the green key 5D is used only for forming (copying) the slave key of the green key 5D, and is not registered in the immobilizer control unit 17, and registration of the blue key 5A and registration of the yellow key 5B can not be performed by the master key of the green key 5D.

That is, when the red key 5C or the slave key of the green key 5D is inserted into the key cylinder 3, the ID code of the red key 5C or slave key of the green key 5D is collated with the ID code recorded in the immobilizer control unit 17. When the result of the collation is affirmative, the control mode which allows the start key registration function to be operated is actuated. When the blue key 5A (the engine key 5 other than the red key 5C, the yellow key 5B and the green key 5D) is inserted into the key cylinder 3 without interruption after the red key 5C or the slave of the green key 5D is inserted into the key cylinder 3, the control mode of "blue key registration" of "each key registration mode" starts. Then, the ID code of the engine key 5 is rendered corresponding to the ID code of the immobilizer control unit 17 by the start key registration function provided in the immobilizer control unit 17 so that the engine key 5 serves as the blue key 5A. More specifically, the memory area, corresponding to the discrimination code of the blue key 5A, of the EEPROM 24 of the immobilizer control unit 17 is cleared, and the cryptographic code of the engine key 5 is written into this area, while the discrimination code of the blue key recorded in the ROM 25 of the immobilizer control unit 17 is written into the engine key 5, so that identical pairs of cryptographic code and discrimination code are recorded in the engine key 5 and the immobilizer control unit 17. As a result, the ID code of the engine key 5 is rendered corresponding to the ID code of the immobilizer control unit 17 so that the engine key 5 serves as the blue key 5A. Further, at this time, overwriting of the discrimination code of the registered blue key 5A is rendered impossible, and registration of the cryptographic code of the blue key 5A is rendered impossible so that this blue key 5A can not be registered as the blue key into the immobilizer control unit of another work machine.

When the slave key of the yellow key 5B (slave key of the yellow key 5B in which the cryptographic code and the discrimination code are recorded and which does not serve as the engine start key) is inserted into the key cylinder 3 without interruption after the red key 5C or the slave key of the green key 5D is inserted into the key cylinder 3, the immobilizer control unit 17 enters into the control mode of "yellow key registration" of "each key registration". Then, the ID code of the slave key of the yellow key 5B is rendered corresponding to the ID code of the immobilizer control unit 17 by the start key registration function provided in the immobilizer control unit 17 so that the slave key of the yellow key 5B serves as the yellow key 5B. More specifically, the cryptographic code of the slave key of the yellow key 5B which does not function as the engine start key is written into the memory area, corresponding to the discrimination code of the yellow key 5B, of the EEPROM 24 of the immobilizer control unit 17, so that identical pairs of cryptographic code and discrimination code are recorded in the slave key of the yellow key 5B and the immobilizer control unit 17. As a result, the ID code of the slave key of the yellow key 5B is rendered corresponding to the ID code of the immobilizer control unit 17, so that the engine key 5 serves as the yellow key 5B. Further, at this time, in order that the slave key of the registered yellow key 5B can be registered as the yellow key into the immobilizer control unit 17 of another work machine, registration of the cryptographic code of the yellow key 5B is not rendered impossible, but is made to remain possible.

When the slave key of the green key 5D (the slave key of the green key 5D in which the cryptographic code and the discrimination code are recorded and which does not serve as the allowance key) is inserted into the key cylinder 3 without interruption after the red key 5C or the slave of the green key 5D is inserted into the key cylinder 3, the control mode of "green key registration" of "each key registration mode" starts. Then, the ID code of the slave key of the green key 5D is rendered corresponding to the ID code of the immobilizer control unit 17 by the allowance key registration function provided in the immobilizer control unit 17 so that the engine key 5 serves as the green key 5D. More specifically, the cryptographic code of the slave key of the green key 5D is written into the memory area, corresponding to the discrimination code of the green key 5D, of the EEPROM 24 of the immobilizer control unit 17, so that identical pairs of cryptographic code and discrimination code are recorded in the slave key of the green key 5D and the immobilizer control unit 17. As a result, the ID code of the slave key of the green key 5D is rendered corresponding to the ID code of the immobilizer control unit 17, so that the engine key 5 serves as the green key 5D. Further, at this time, in order that the slave key of the registered green key 5D can be registered as the green key into the immobilizer control unit of another work machine, registration of the cryptographic code of the green key 5D is not rendered impossible, but is made to remain possible.

When the master key of the green key 5D is inserted into the key cylinder 3, the control mode which allows the allowance key copy function to be operated is actuated, and the control mode of "green key copy" of "each key copy mode" starts. Then, the ID code of the master key of the green key 5D is allowed to be written into another engine key 5 by the allowance key copy function provided in the immobilizer control unit 17 so that the engine key serves as the allowance key. More specifically, the ID code (only the cryptographic code) of the master key of the green key 5D is written into the RAM 26 of the immobilizer control unit 17, and then, when another engine key 5 is inserted into the key cylinder 3, the cryptographic code of the master key written in the immobilizer control unit 17 and the discrimination code denoting the slave key of the green key 5D are written into the EEPROM 11 of the engine key 5. As a result, identical pairs of cryptographic code and discrimination code are recorded in the engine key 5 and the immobilizer control unit 17, so that the ID code of the engine key 5 is rendered corresponding to the ID code of the immobilizer control unit 17, and the master key of the green key 5D is copied into the engine key 5 as the slave key of the green key 5D.

When the master key of the yellow key 5B is inserted into the key cylinder 3, the control mode which allows the start key copy function to be operated is actuated, and the control mode of "yellow key copy" of "each key copy mode" starts. Then, the ID code of the master key of the yellow key 5B is allowed to be written into the another engine key 5 by the start key copy function provided in the immobilizer control unit 17 so that the engine key serves as the engine start key. More specifically, the ID code (only the cryptographic code) of the master key of the yellow key 5B is written into the RAM 26 of the immobilizer control unit 17, and then, when another engine key 5 is inserted into the key cylinder 3, the cryptographic code of the master key written in the immobilizer control unit 17 and the discrimination code denoting the slave key of the yellow key 5B are written into the EEPROM 11. As a result, identical pairs of cryptographic code and discrimination code are recorded in the engine key 5 and the immobilizer control unit 17, so that the ID code of the engine key 5 is rendered corresponding to the ID code of the immobilizer control unit 17, and the master key of the yellow key 5B is copied into the engine key 5 as the slave key of the yellow key 5B.

The other constructions are the same as those of the foregoing embodiment.

Next, the operation procedure of the control mode will be described with reference to flowcharts of FIG. 41(*a*), FIG. 41(*b*), FIG. 42(*a*) and FIG. 42(*b*).

In step 121, it is judged whether or not the engine key 5 is inserted into the key cylinder 3, and when it is judged that the engine key 5 is inserted, the procedure advances to step 122, and when it is judged that the engine key 5 is not inserted, the procedure returns to step 121.

In the step 122, it is judged whether or not the discrimination code of the engine key 5 inserted into the key cylinder 3 is identical with the discrimination code of the red key 5C or the slave key of the green key 5D. When it is identical with the discrimination code of the red key 5C or the slave key of the green key 5D, the procedure advances to step 124, and when it is not identical with the discrimination code of the red key 5C or the slave key of the green key 5D, the procedure advances to step 123.

In the step 124, it is judged whether or not the cryptographic code of the red key 5C or the slave key of the green key 5D inserted into the key cylinder 3 is identical with the cryptographic code recorded in the immobilizer control unit 17. When the cryptographic codes are identical, the procedure advances to step 126, and when the discrimination codes are not identical, the procedure advances to step 125 with displaying 'Key does not coincide' on the display part 29, and the procedure returns to step 121.

Accordingly, when the unregistered red key 5C or the slave key of the green key 5D is inserted into the key cylinder 3, it is notified that the unregistered erroneous red key 5C or the slave key of the green key 5D has been inserted into the key cylinder 3 by displaying 'Key does not coincide' on the display part 29.

In the step 124, when the cryptographic codes are judged to be identical, the control mode is actuated in step 126. Then, in step 127, 'Please insert key' is displayed on the display part 29 (until a new key is inserted into the key cylinder 3) and when the new key is inserted into the key cylinder 3, the procedure advances to step 128.

In the step 128, it is judged whether or not the engine key 5 inserted into the key cylinder 3 is the blue key 5A (the engine key 5 other than the red key 5C, the yellow key 5B and the green key 5D) which can be registered. In this judgment, only when the cryptographic code is recorded in the inserted engine key 5, and the memory area of the discrimination code of the engine key 5 is blank or the discrimination code of the blue key is recorded in the memory area of the discrimination code, the engine key is judged to be the blue key 5A which can be registered, and the procedure advances to step 132. When the discrimination code of the engine key 5 inserted into the key cylinder 3 is other than that of the blue key 5A, namely, the discrimination code of the master key of the yellow key 5B, the discrimination code of the slave key of the yellow key 5B, the discrimination code of the master key of the green key 5D, and the discrimination code of the slave of the green key 5D, or the engine key is the blank key (the engine key 5 in which the cryptographic code is not recorded), the engine key is judged not to be the blue key 5A which can be registered, and the procedure advances to step 129.

Accordingly, only the engine key 5 in which the cryptographic code is recorded and the discrimination code other than the blue key 5A is not recorded is judged to be registrable as the blue key, and the engine key 5 other than this is not registered.

In the step 129, it is judged whether or not the engine key 5 inserted into the key cylinder 3 is the slave key of the yellow key 5B. When the cryptographic code is recorded in the inserted engine key 5 and the discrimination code of the slave key of the yellow key 5B is recorded in the memory area of the discrimination code of the engine key 5, the engine key is judged to be the slave key of the yellow key 5B, and the procedure advances to step 135, and otherwise, the engine key is judged not to be the slave key of the yellow key 5B, and the procedure advances to step 130.

Accordingly, only the slave key of the yellow key 5B is registered as the yellow key 5B, and the master key of the yellow key 5B and the other keys are not registered.

In the step 130, it is judged whether or not the engine key 5 inserted into the key cylinder 3 is the slave key of the green key 5D. In this judgment, when the cryptographic code is recorded in the inserted engine key 5 and the discrimination code of the slave key of the green key 5D is recorded in the memory area of the discrimination code of the engine key 5, the engine key is judged to be the slave key of the green key 5D, and the procedure advances to step 137. When the discrimination code of the engine key 5 inserted into the key cylinder 3 is other than that of the slave key of the green key, the discrimination code is not recorded, or the cryptographic code is not recorded, the engine key is judged not to be the slave key of the green key 5D, and the procedure advances to step 131.

Accordingly, only the slave key of the green key 5D is registered as the green key 5D, and the master key of the green key 5D and the other keys are not registered.

When the procedure advances from step 130 to step 131, in the step 131, 'This key can not be registered' is displayed on the display part 29, and the procedure returns to step 127. Thereafter, the operation is repeated for a predetermined period of time through the loop of step 127, step 128, step 129, step 130 and step 131, and if none of the blue key 5A, the slave key of the yellow key 5B and the slave key of the green key 5D is inserted into the key cylinder 3 during the predetermined period of time, the procedure returns to step 121 or advances to END.

Accordingly, in the case where the engine key 5 inserted into the key cylinder 3 is not the blue key 5A, the slave key of the yellow key 5B, or the slave key of the green key 5D, the display of 'Please insert key' and the display of 'This key can not be registered' are alternately repeated, and when the blue key 5A, the slave key of the yellow key 5B, or the slave key of the green key 5D is inserted during the above display, the registration of the blue key 5A, the slave key of the yellow key 5B, or the slave key of the green key 5D that will be described below is performed.

In step 132, after the memory area of the cryptographic code, corresponding to the blue key 5A, of the EEPROM 24 of the immobilizer control unit 17 is cleared (see FIG. 11), the cryptographic code of the engine key 5 inserted into the key cylinder 3 is written into the memory area, corresponding to the blue key, of the EEPROM 24. Instep 133, the discrimination code of the blue key is written into the EEPROM 11 of the inserted engine key 5, overwriting of the discrimination code of the registered engine key 5 (the blue key 5A) is rendered impossible, and registration of the cryptographic code is rendered impossible. Instep 134, "Blue key is registered" is displayed on the display part 29, and the registration operation of the blue key 5A ends.

Accordingly, among engine keys 5, with respect to the engine key 5 in which only the cryptographic code is recorded and the discrimination code is not recorded, or the engine key 5 (unregistered blue key 5A) in which the cryptographic code is recorded and the discrimination code of the blue key is recorded, the ID code of the engine key 5 corresponds to the ID code of the immobilizer control unit 17, so that the blue key is registered to serve as the engine start key, a new blue key 5A is formed, and the engine can be started by this blue key 5A. In this operation, since the overwriting of the discrimination code of the blue key 5A is rendered impossible, this blue key 5A can not be changed to the yellow key 5B or the other key after this operation. Further, since the registration of the cryptographic code of the blue key 5A is impossible, this blue key 5A can not be registered as the blue key into the immobilizer control unit 17 of another work machine after this operation, and accordingly, this blue key 5A can be used only for starting the engine of the work machine corresponding to this key.

In step 135, the cryptographic code of the engine key 5 inserted into the key cylinder 3 is written into the memory area, corresponding to the slave key of the yellow key 5B, in the EEPROM 24 of the immobilizer control unit 17, and in step 136, 'Yellow key has been registered' is displayed on the display part 29, and the registration operation of the slave key of the yellow key 5B ends.

Accordingly, among engine keys 5, with respect to the key in which the cryptographic code is recorded and the discrimination code of the slave key of the yellow key is recorded, the ID code of the engine key 5 corresponds to the ID code of the immobilizer control unit 17, so that the slave key of the yellow key is registered to serve as the engine start key, and the engine can be started by this slave key of the yellow key 5B.

In step 137, the cryptographic code of the engine key 5 inserted into the key cylinder 3 is written into the memory area, corresponding to the master key of the green key 5D, in the EEPROM 24 of the immobilizer control unit 17, and at this time, the same cryptographic code is simultaneously written into the memory area, corresponding to the slave key of the green key 5D, in the EEPROM 24, and the registration operation of the green key 5D ends.

Accordingly, among engine keys 5, with respect to the key in which the cryptographic code is recorded and the discrimination code of the slave key of the green key is recorded, the ID code of the engine key 5 corresponds to the ID code of the immobilizer control unit 17, so that the green key is registered to serve as the allowance key, thereby enabling this slave key of the green key 5D to allow rewriting or writing of the ID code.

In step 123, it is judged whether or not the discrimination code of the engine key 5 inserted into the key cylinder 3 is identical with the discrimination code of the master key of the green key 5D or the master key of the yellow key 5B. When it is identical with the discrimination code of the master key of the green key 5D or the master key of the yellow key 5B, the procedure advances to step 141 of FIG. 44, and when it is not identical with the discrimination code of the master key of the green key 5D or the master key of the yellow key 5B, the procedure returns to step 121.

In the step 141, the control mode is started, and in step 142, it is judged whether or not the engine key 5 inserted into the key cylinder 3 is the master key of the yellow key 5B. When it is the master key of the yellow key 5B, the procedure advances to step 142, and when it is not the master key of the yellow key 5B, the procedure advances to step 143. In the step 143, it is judged whether or not the engine key 5 inserted into the key cylinder 3 is the master key of the green key 5D, and when it is the master key of the green key 5D, the procedure advances to step 151.

Accordingly, when the master key of the yellow key 5B is inserted into the key cylinder 3, the control mode is immediately actuated, and the control mode of "green key copy" of "each key copy mode" starts. When the master key of the green key 5D is inserted into the key cylinder 3, the control mode is immediately actuated, and the control mode of "yellow key copy" of "each key copy mode" starts.

When the procedure advances from step 142 to step 144, in the step 144, the cryptographic code of the master key of the yellow key 5B is written into the RAM 26 of the immobilizer control unit 17, and in step 145, 'Please insert key for copy' is displayed on the display part 29 (until a new key is inserted into the key cylinder 3), and the procedure advances to step 146.

In the step 146, it is judged whether or not the inserted key is writable. In this judgment, in the case where the discrimination code of the red key 5C, the discrimination code of the master key of the yellow key 5B or the discrimination code of the master key of the green key 5D is not recorded in the memory area of the discrimination code of the inserted engine key 5, that is, when the memory areas of the cryptographic code and the discrimination code are blank (blank key), or the cryptographic code is recorded and the memory area of the discrimination code is blank, the key is judged to be registrable, and the procedure advances to step 148. In the case where the discrimination code of the red key 5C, the discrimination code of the master key of the yellow key 5B, or the discrimination code of the master key of the green key 5D is recorded as the discrimination code of the engine key 5 inserted into the key cylinder 3, the key is judged to be unregistrable, and the procedure advances to step 147. In the step 147, 'This key can not be used for copy' is displayed on the display part 29 for a predetermined period of time (several seconds), and the procedure returns to step 145. However, as to whether or not the inserted key is writable, with respect to the blue key 5A, the blue key 5A having been registered in the immobilizer control unit 17 is judged to be unwritable, while the unregistered blue key 5A is judged to be writable.

Accordingly, when the unrewritable or unwritable engine key 5 is inserted into the key cylinder 3, after it is notified that the unrewritable red key 5C, master key of the yellow key 5B, master key of the green key 5D, or registered blue key 5A has been erroneously inserted into the key cylinder 3 by displaying 'This key can not be used for copy' on the display part 29, the insertion of a key for copy into the key cylinder 3 is urged again.

In the step 146, when the inserted key is judged to be writable, the procedure advances to step 148. In the step 148, the discrimination code of the slave key of the yellow key and the cryptographic code identical with the cryptographic code of the master key of the yellow key 5B are written into the EEPROM 11 of the engine key 5 for copy, or the data recorded in the EEPROM 11 of the engine key 5 for copy is rewritten to the discrimination code of the slave key of the yellow key and the cryptographic code identical with the cryptographic code of the master key of the yellow key 5B, whereby the ID code of the engine key 5 is rendered corresponding to the ID code of the immobilizer control unit 17 so that the engine key 5 serves as the slave key of the yellow key 5B, and as a result, the master key of the yellow key 5B is copied into the engine key 5, and the slave key of the yellow key 5B is formed.

In step 150, it is judged whether or not a further copy of the yellow key is to be formed, and when it is judged that another copy of the yellow key is to be formed, the procedure returns to step 145, and the next coping procedure of the yellow key is performed. The judgment as to whether or not the yellow key is to be copied is made according to, for example, whether or not the first switch 31 is operated to be ON within a predetermined period of time. When the first switch 31 is operated to be ON, it is judged that the copying procedure of the yellow key 5B is to be performed, and the procedure returns to step 145. When the first switch 31 is not operated to be ON within the predetermined period of time, it is judged that the copying procedure of the yellow key is not to be performed, and the copy operation of the yellow key 5B ends. Accordingly, the yellow key can be continuously copied with respect to plural engine keys 5.

Figure 19:
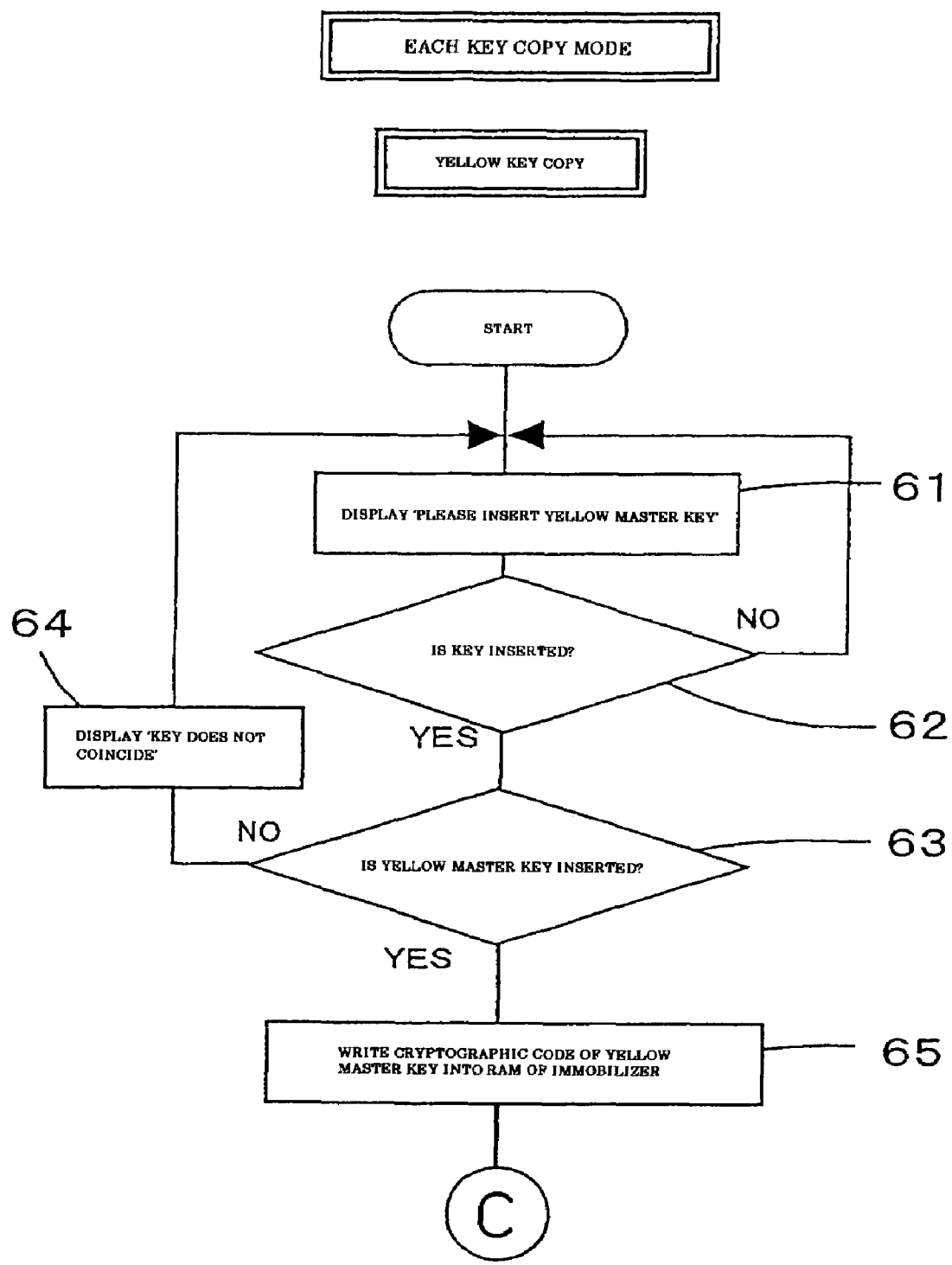
FIG. 19(a) is a flowchart showing a copying operation procedure of a second start key of the same embodiment.
FIG. 19(b) is a flowchart showing the copying operation process of the second start key of the same embodiment.
Figure 19:
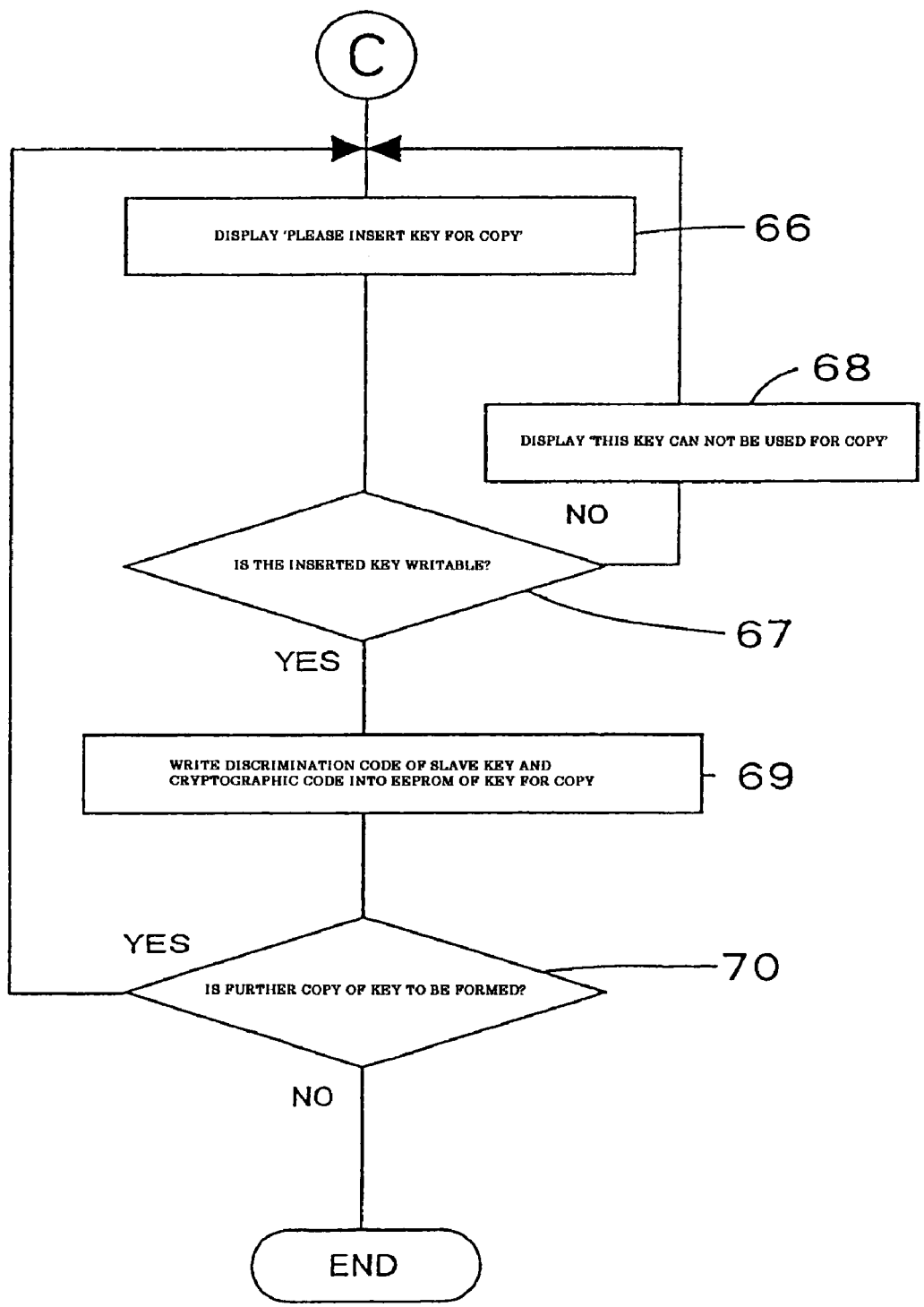

Incidentally, the operations in the steps 144 to 150 are similar to the operations in the steps 65 to 70 of FIG. 19(*a*) and FIG. 19(*b*) of the foregoing embodiment.

When the procedure advances from step 143 to step 151, in the step 151, the cryptographic code of the master key of the green key 5D is written into the RAM 26 of the immobilizer control unit 17. In step 152, 'Please insert key for copy' is displayed on the display part 29 (until a new key is inserted into the key cylinder 3), and the procedure advances to step 153.

In the step 87, it is judged whether or not the inserted key is writable. In this judgment, in the case where the discrimination code of the red key 5C, the discrimination code of the master key of the yellow key 5B, or the discrimination code of the master key of the green key 5D is not recorded in the memory area of the discrimination code of the inserted engine key 5, that is, where the memory areas of the cryptographic code and the discrimination code are blank (blank key), or the cryptographic code is recorded and the memory area of the discrimination code is blank, the key is judged to be writable, and the procedure advances to step 155. In the case where the discrimination code of the red key 5C, the discrimination code of the master key of the yellow key 5B, or the discrimination code of the master key of the green key 5D is recorded as the discrimination code of the engine key 5 inserted into the key cylinder 3, the key is judged to be unwritable, and the procedure advances to step 154. In the step 154, 'This key can not be used for copy' is displayed on the display part 29 for a predetermined period of time (several seconds), and the procedure returns to step 152. However, as to whether or not the inserted key is writable, with respect to the blue key 5A, the blue key 5A having been registered in the immobilizer control unit 17 is judged to be unwritable, while the unregistered blue key 5A is judged to be writable.

Accordingly, when the unrewritable or unwritable engine key 5 is inserted into the key cylinder 3, after it is notified that the unrewritable red key 5C, master key of the yellow key 5B, master key of the green key 5D, or registered blue key 5A has been erroneously inserted into the key cylinder 3 by displaying 'This key can not be used for copy' on the display part 29, the insertion of a key for copy into the key cylinder 3 is urged again.

In the step 153, when the inserted key is judged to be writable, the procedure advances to step 155. In the step 155, the discrimination code of the slave key of the green key 5D and the cryptographic code identical with the cryptographic code of the master key of the green key 5D are written into the EEPROM 11 of the engine key 5 for copy, or the data recorded in the EEPROM 11 of the engine key 5 for copy is rewritten to the discrimination code of the slave key of the green key 5D and the cryptographic code identical with the cryptographic code of the master key of the green key 5D, whereby the ID code of the engine key 5 is rendered corresponding to the ID code of the immobilizer control unit 17 so that the engine key 5 serves as the slave key of the green key 5D, and as a result, the master key of the green key 5D is copied into the engine key 5, and the slave key of the green key 5D is formed.

In step 157, it is judged whether or not a further copy of the green key is to be formed, and when it is judged that another copy of the green key is to be formed, the procedure returns to step 152, and the next coping procedure of the green key is performed. The judgment as to whether or not the copy of the green key is to be formed is made according to, for example, whether or not the first switch 31 is operated to be ON within a predetermined period of time. When the first switch 31 is operated to be ON, it is judged that the copying procedure of the green key 5D is to be performed, and the procedure returns to step 152. When the first switch 31 is not operated to be ON within the predetermined period of time, it is judged that the copying procedure of the green key is not to be performed, and the copy operation of the green key ends. Accordingly, the green key can be continuously copied with respect to plural engine keys 5.

Figure 22:
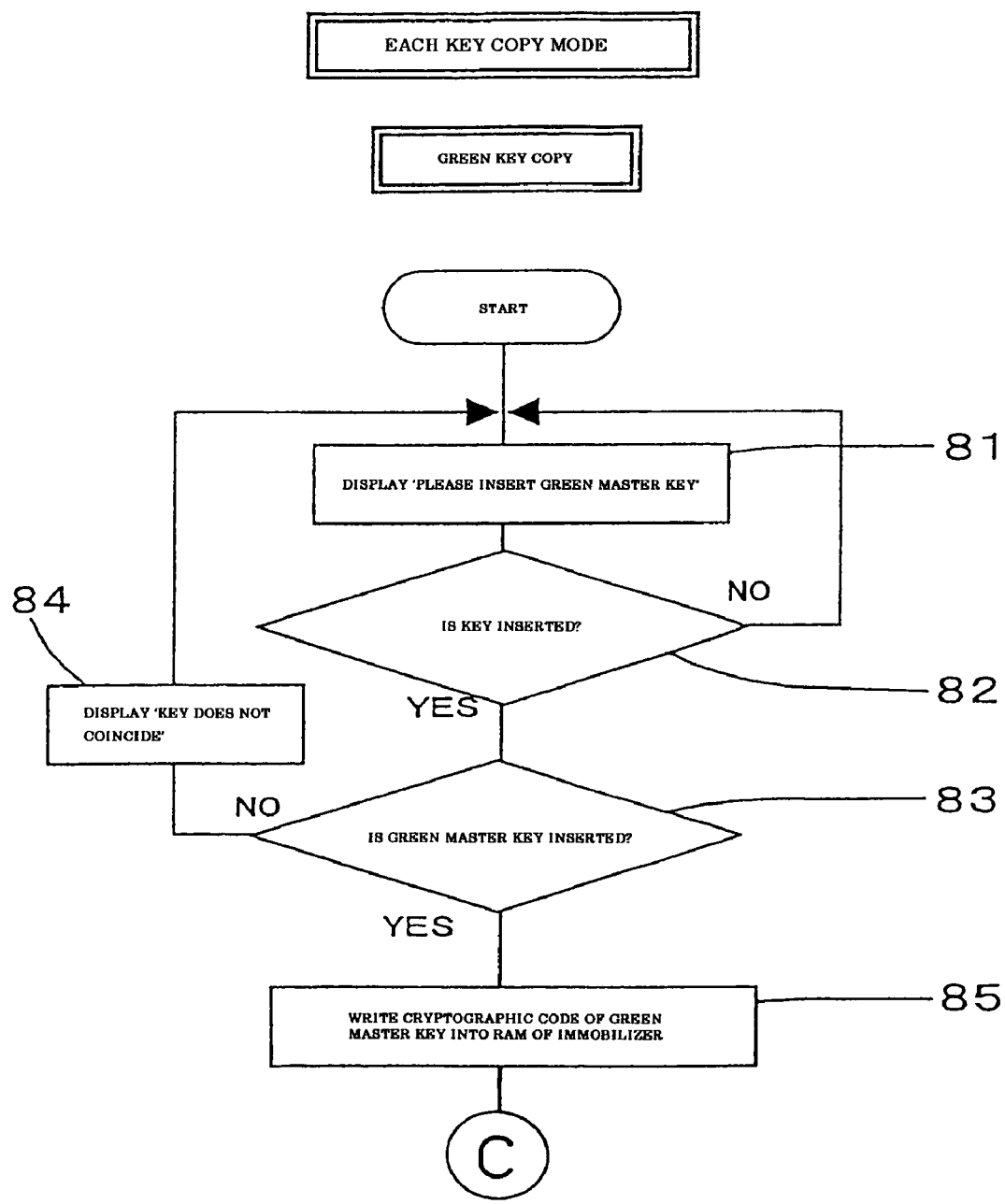
FIG. 22(a) is a flowchart showing a copying operation procedure of a second allowance key of the same embodiment.
FIG. 22(b) is a flowchart showing the copying operation procedure of the second allowance key of the same embodiment.
Figure 22B:
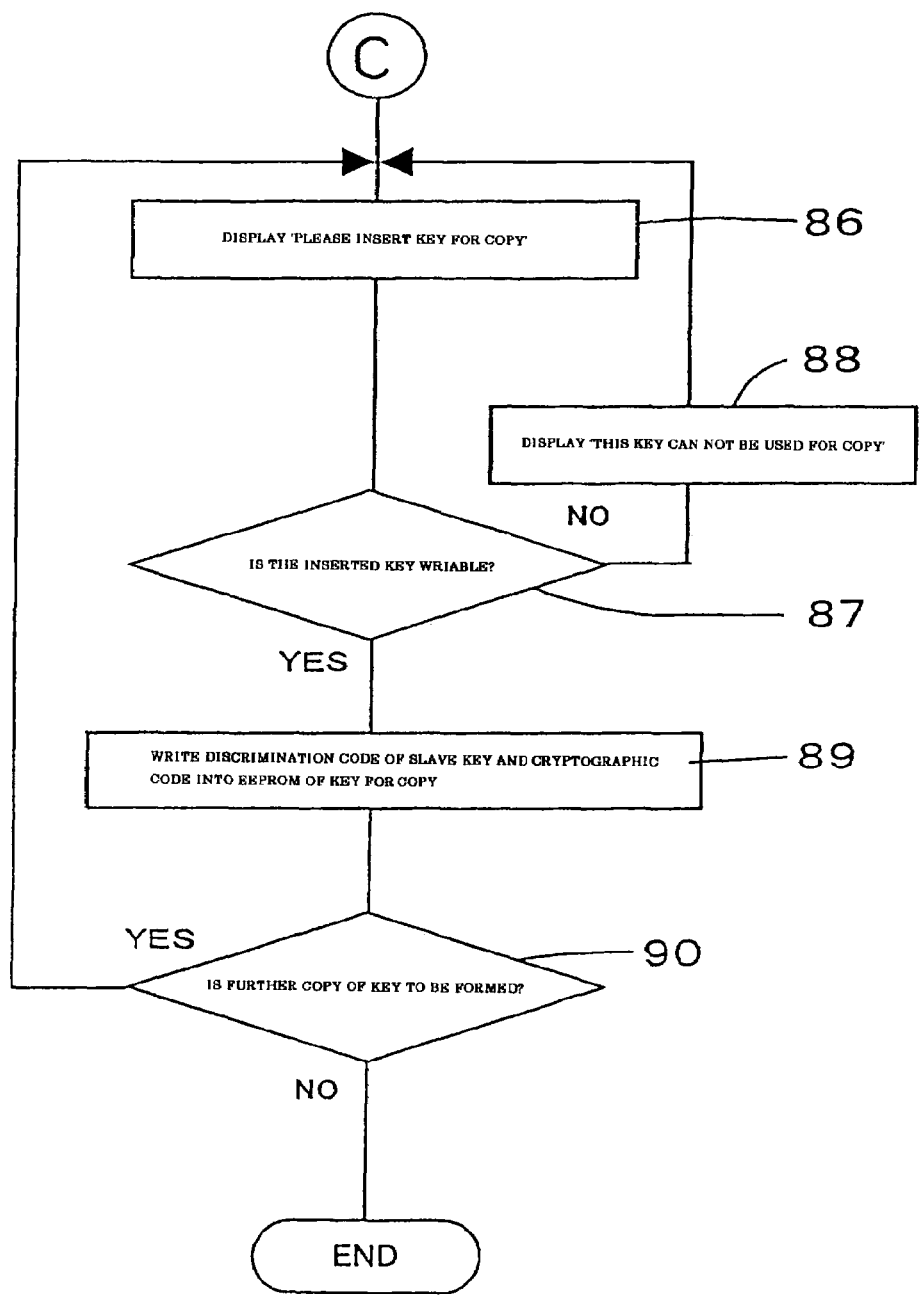

Incidentally, the operations in the steps 151 to 157 are similar to the operations in the step 85 to 90 of FIG. 22(*a*) and FIG. 22(*b*) of the foregoing embodiment.

Incidentally, in the embodiment of FIG. 41(*a*), FIG. 41(*b*), FIG. 42(*a*) and FIG. 42(*b*), although the description of the operations of the control modes of "vehicle resale mode", "emergency start mode" and "initialization mode" are omitted, the respective operations of these control modes of "vehicle resale mode", "emergency start mode" and "initialization mode" can be arranged to start by special specific manipulations or the like, so that the respective operations may be performed through the same steps as the foregoing embodiment.

Further, in the embodiment of FIG. 41(*a*), FIG. 41(*b*), FIG. 42(*a*) and FIG. 42(*b*), the starting of the engine is performed with using the blue key 5A or the slave key of the yellow key 5B. Although the description of the engine starting operation is omitted, it is performed by the same operation as the engine starting operation shown in the flowcharts of FIG. 25(*a*) and FIG. 25(*b*).

According to the above embodiment, the effects similar to the embodiment of FIGS. 1 to 39(*b*) are obtained. Further, since the control mode in which the start key registration function is actuated, the control mode in which the allowance key copy function is actuated, or the control mode in which the start key copy function actuated is started by inserting the red key 5C, the slave key of the green key 5D, the master key of the green key 5D, or the master key of the yellow key 5B into the key cylinder 3, similarly to the embodiment of FIG. 40, the troublesome manipulations to start the control mode is eliminated. Furthermore, since a desired one of the control mode of "blue key registration", the control mode of "yellow key registration", the control mode of "green key registration", the control mode of "yellow key copy", and the control mode of "green key copy" is started according to the kind of the key (the red key 5C, the slave key of the green key 5D, the master key of the green key 5D, or the master key of the yellow key 5B) inserted into the key cylinder 3, the manipulations to change the mode (menu selection) in the control mode is not required, thereby considerably simplifying the manipulations, so that the key registration and key copy can be performed in a short period of time.

Incidentally, in the above embodiments, although two kinds of engine start keys of the blue key 5A and the yellow key 5B are provided as the engine start key, the blue key 5A may be solely provided as the engine start key without the yellow key 5B, or the yellow key 5B may be solely provided as the engine start key without the blue key 5A.

Further, in the above embodiments, although two kinds of allowance keys of the red key 5C and the green key 5D are provided as the allowance key to allow the rewriting or writing of the ID code, the red key 5C may be solely provided as the allowance key without the green key 5D, or the green key 5D may be solely provided as the allowance key without the red key 5C.

Further, in the above embodiments, as the allowance tool to allow the rewriting or writing of the ID code, the allowance key 5C, 5D constructed of the engine key 5 which can be inserted into the key cylinder 3 is used. However, since the allowance tool can not start the engine, it is not required to be constructed of the engine key 5 which can be inserted into the key cylinder 3. Accordingly, the allowance tool to allow the rewriting or writing of the ID code may be constructed of, for example, a member which has only a portion corresponding to the head portion of the engine key in which the transponder chip 9 is embedded, but does not have a key portion to be inserted into the key cylinder 3.

Further, in the above embodiments, although the cryptographic code and the discrimination code are separately used as the ID codes of the engine key and the immobilizer control unit 17, the ID code may consist of only one kind of cryptographic code or the like.

Further, in the above embodiments, although the yellow key 5B and the green key 5D each consists of the master key and the slave key which are distinguished by the discrimination code, the distinction between the master key and the slave key of the yellow key 5B may be eliminated by allotting an identical discrimination code, or the distinction between the master key and the slave key of the green key 5D may be eliminated by allotting an identical discrimination code.

Further, in the control mode of "vehicle resale mode" of the above embodiment, although the ID codes of the yellow key 5B and the green key 5D recorded in the immobilizer control unit 17 are cleared, the ID code of the blue key 5A recorded in the immobilizer control unit 17 may be arranged to be cleared by the delete function, or the ID codes of the blue key A, the yellow key 5B and the green key 5D recorded in the immobilizer control unit 17 may be arranged to be selectively cleared. For example, only the ID code in the immobilizer 17 corresponding to the yellow key 5B may be arranged to be deleted, or only the ID code in the immobilizer 17 corresponding to the green key 5D may be arranged to be deleted by the delete function.

Further, in the initialization mode of the above embodiment, although the red key 5C can be formed from the commercially available engine key 5, the cryptographic code other than the red key 5C recorded in the EEPROM 24 of the immobilizer control unit 17 may be arranged to be cleared without forming the red key 5C in the control mode of the initialization.

Further, in the initialization mode of the above embodiment, when the "initialization mode" is executed, the cryptographic codes other than the red key 5C recorded in the EEPROM 24 of the immobilizer control unit 17 are finally cleared. However, in the case where the cryptographic code of the blue key 5A is recorded in the EEPROM 24 of the immobilizer control unit 17 in "each key registration mode", the immobilizer control unit 17 may be arranged to be returned to the state before the cryptographic code of the blue key 5A of the EEPROM 24 recorded in the EEPROM 24 of the immobilizer control unit was registered when "initialization mode" is executed.

Further, in the case where the cryptographic code of the yellow key 5B is recorded in the EEPROM 24 of the immobilizer control unit 17 in "each key registration mode", the immobilizer control unit 17 may be arranged to be returned to the state before the cryptographic code of the yellow key 5A of the EEPROM 24 recorded in the EEPROM 24 of the immobilizer control unit was registered when "initialization mode" is executed.

Further, in the case where the cryptographic code of the green key 5D is recorded in the EEPROM 24 of the immobilizer control unit 17 in "each key registration mode", the immobilizer control unit 17 may be arranged to be returned to the state before the cryptographic code of the green key 5D of the EEPROM 24 recorded in the EEPROM 24 of the immobilizer control unit was registered when "initialization mode" is executed.

Further, the initialization may be arranged to be performed as stated above when the ID code of the red key 5C is collated with the ID code recorded in the immobilizer control unit 17 corresponding thereto upon the insertion of the red key 5C into the key cylinder 3 and the result of the collation is affirmative.

Further, in the above embodiment, although the antitheft system of the invention is applied to the work machine such as the backhoe, the vehicle to which the antitheft system of the invention is applied is not limited to the work machine such as the backhoe, and it can also be applied to an automobile and other vehicles.

According to the invention, since a new engine start key can be formed from a commercially available engine key through the start key registration function, in the case where the engine start key is lost, the new engine start key is formed without replacing the whole antitheft device, and the engine can be started by this new engine start key, which is economical and convenient. Further, since the allowance tool or the allowance key to allow the rewriting or writing of the discrimination code is required separately from the engine start key in order to form the new engine start key, it is difficult for a person other than a user who purchased the vehicle to form the engine start key, and the antitheft function of the antitheft system is not ruined.

INDUSTRIAL APPLICABILITY

The invention can be used for a work machine such as a backhoe and other vehicles.

The invention claimed is:

1. An antitheft system for a vehicle configured to collate an ID code of an engine start key (5A, 5B) with an ID code recorded in an immobilizer control unit (17), and to allow the engine start key (5A, 5B) to start an engine when a result of a collation is affirmative, the system comprising:
   an allowance tool (5C, 5D) for allowing rewriting or writing of an ID code, the allowance tool being provided separately from the engine start key (5A, 5B), the allowance tool (5C, 5D) being incapable of starting an engine while the engine start key (5A, 5B) being incapable of allowing rewriting or writing of an ID code; and
   a start key registration function of collating an ID code of the allowance tool (5C, 5D) with the ID code recorded in the immobilizer control unit (17) without starting engine and without requiring any special manipulation with the key, and rendering an ID code of an engine key (5) corresponding to the ID code of the immobilizer control unit (17) when the result of the collation is affirmative, so that when the engine key (5) is inserted into a key cylinder (3), the inserted engine key (5) serves as the engine start key (5A, 5B).

2. An antitheft system for a vehicle according to claim 1, further comprising a copy function of writing the ID code of the allowance tool (5D) recorded in the immobilizer control unit (17) into another member to cause the member to serve as an allowance tool.

3. An antitheft system for a vehicle according to claim 1, wherein the ID code of the engine start key (5B) registered by the start key registration function can be recorded as an engine start key into an immobilizer control unit of another vehicle.

4. An antitheft system for a vehicle according to claim 3, further comprising a start key copy function of writing the ID code of the engine start key (5) into another engine key (5) to cause the engine key to serve as the engine start key.

5. An antitheft system for a vehicle according to claim 4, wherein the start key copy function of the immobilizer control unit (17) writes the ID code of the engine start key (5B) into another engine key (5) to cause the engine key to serve as the engine start key, when the engine key (5) is inserted into a key cylinder (3) after the engine start key (5B) is inserted into the key cylinder (3).

6. An antitheft system for a vehicle according to claim 4, wherein when a master key of the engine start key (5B) is inserted into a key cylinder (3), a control mode for rendering the start key copy function operable is actuated.

7. An antitheft system for a vehicle according to claim 1, further comprising a delete function of deleting the ID code of the engine start key (5A, 5B) recorded in the immobilizer control unit (17) from the immobilizer control unit (17).

8. An antitheft system for a vehicle according to claim 1, further comprising an engine start function with a special manipulation in which the engine is allowed to start when the engine key (5) is inserted into a key cylinder (3) and a special manipulation is performed.

9. An antitheft system for a vehicle according to claim 1, further comprising an initialization function in which an ID code recording portion of the immobilizer control unit (17) is initialized.

10. An antitheft system for a vehicle according to claim 1, wherein a vehicle to which the antitheft system is applied is a work machine such as a backhoe.

11. An antitheft system for a vehicle configured to collate an ID code of an engine start key (5A, 5B) with an ID code recorded in an immobilizer control unit (17), and to allow the engine start key (5A, 5B) to start an engine when a result of a collation is affirmative, or to prevent the engine start key (5A, 5B) from starting the engine when the result of the collation is negative, the system comprising:
   an allowance key (5C, 5D) for allowing rewriting or writing of an ID code, the allowance key being provided separately from the engine start key (5A, 5B), the allowance key (5C, 5D) being incapable of starting an engine while the engine start key (5A, 5B) being incapable of allowing rewriting or writing of an ID code; and
   a start key registration function of collating an ID code of the allowance key (5C, 5D) with the ID code recorded in the immobilizer control unit (17) without starting engine and without requiring any special manipulation with the key, and rendering an ID code of an engine key (5) corresponding to the ID code of the immobilizer control unit (17) when the result of the collation is affirmative, so that when the engine key (5) is inserted into a key cylinder (3), the inserted engine key (5) serves as the engine start key (5A, 5B).

12. An antitheft system for a vehicle according to claim 11, wherein the start key registration function renders the ID code of the engine key (5) corresponding to the ID code of the immobilizer control unit (17), when the engine key (5) is inserted into a key cylinder (3) after the allowance key (5C, 5D) is inserted into the key cylinder (3), so that the engine key (5) serves as the engine start key (5A, 5B).

13. An antitheft system for a vehicle according to claim 11, further comprising an allowance key copy function of writing the ID code of the allowance key (5D) into another engine key (5) to cause the engine key to serve as an allowance key.

14. An antitheft system for a vehicle according to claim 13, wherein the allowance key copy function of the immobilizer control unit (17) writes the ID code of the allowance key (5D) into another engine key (5) to cause the engine key to serve as the allowance key, when the engine key (5) is inserted into a key cylinder (3) after the allowance key (5D) is inserted into the key cylinder (3).

15. An antitheft system for a vehicle according to claim 13, wherein when a master key of the allowance key (5D) is inserted into a key cylinder (3), a control mode for rendering the allowance key copy function operable is actuated.

16. An antitheft system for a vehicle according to claim 11, wherein after the allowance key (5C, 5D) is inserted into a key cylinder (3), the ID code of the allowance key (5C, 5D) is collated with the ID code recorded in the immobilizer control unit (17), and when the result of the collation is affirmative, a control mode for rendering the start key registration function operable is actuated.

17. An antitheft system for a vehicle configured to collate an ID code of an engine start key (5A, 5B) with an ID code recorded in an immobilizer control unit (17), and to allow the engine start key (5A, 5B) to start an engine when a result of a collation is affirmative, or to prevent the engine start key (5A, 5B) from starting the engine when the result of the collation is negative, the system comprising:

an allowance key (5C, 5D) for allowing rewriting or writing of an 11) code, the allowance key being provided separately from the engine start key (5A, 5B), the allowance key (5C, 5D) being incapable of starting an engine while the engine start key (5A, 5B) being incapable of allowing rewriting or writing of an ID code;

a start key registration function of collating an ID code of the allowance key (5C, 5D) with the ID code recorded in the immobilizer control unit (17) without starting engine and without requiring any special manipulation with the key, and rendering an ID code of an engine key (5) corresponding to the ID code of the immobilizer control unit (17) when the result of the collation is affirmative, so that when the engine key (5) is inserted into a key cylinder (3), the inserted engine key (5) serves as the engine start key (5A, 5B); and a cryptographic code for specifying the engine key (5) and an discrimination code for distinguishing kind of the engine key (5) recorded as ID codes in the engine key (5) and the immobilizer control unit (17), the discrimination code enabling the system to distinguish the engine start key (5A, 5B) for starting the engine and the allowance key (5C, 5D) for allowing the rewriting or writing of the ID codes.

* * * * *